(12) United States Patent
Sato et al.

(10) Patent No.: US 7,255,721 B1
(45) Date of Patent: Aug. 14, 2007

(54) DEVICE FORMING FUEL GAS FOR FUEL CELL AND COMPOSITE MATERIAL FOR HYDROGEN SEPARATION

(75) Inventors: Hiromichi Sato, Atsugi (JP); Satoshi Iguchi, Mishima (JP); Toshihide Nakata, Susono (JP); Satoshi Aoyama, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 675 days.

(21) Appl. No.: 10/130,063

(22) PCT Filed: Nov. 9, 2000

(86) PCT No.: PCT/JP00/07915

§ 371 (c)(1),
(2), (4) Date: May 15, 2002

(87) PCT Pub. No.: WO01/36077

PCT Pub. Date: May 25, 2001

(30) Foreign Application Priority Data

| Nov. 18, 1999 | (JP) | 11-328480 |
| May 10, 2000 | (JP) | 2000-137637 |
| Aug. 4, 2000 | (JP) | 2000-237297 |

(51) Int. Cl.
*C10L 5/00* (2006.01)
*B01D 53/22* (2006.01)

(52) U.S. Cl. ............ 44/629; 95/56; 96/11; 55/DIG. 5
(58) Field of Classification Search ............ 95/56; 96/11; 55/DIG. 5; 44/629
See application file for complete search history.

(56) References Cited

U.S. PATENT DOCUMENTS

| 5,498,278 A | 3/1996 | Edlund |
| 5,614,001 A | 3/1997 | Kosaka et al. |
| 5,645,626 A | 7/1997 | Edlund et al. |
| 5,782,959 A * | 7/1998 | Yang et al. .......... 96/11 |
| 6,350,297 B1 * | 2/2002 | Doyle et al. .......... 95/55 |

FOREIGN PATENT DOCUMENTS

| EP | 0 818 233 A2 | 1/1998 |
| JP | 38-17806 | 9/1963 |
| JP | 42-5642 | 3/1967 |
| JP | 60190570 | 9/1985 |
| JP | A 62-143801 | 6/1987 |
| JP | 63079701 | 4/1988 |
| JP | A 63-171617 | 7/1988 |
| JP | A 63-295402 | 12/1988 |
| JP | A 1-266833 | 10/1989 |
| JP | A 2-271901 | 11/1990 |
| JP | A 2-311301 | 12/1990 |
| JP | A 4-325402 | 11/1992 |
| JP | A 5-105407 | 4/1993 |
| JP | A 5-147902 | 6/1993 |
| JP | A 6-40701 | 2/1994 |
| JP | A 6-277472 | 10/1994 |
| JP | A 6-345408 | 12/1994 |
| JP | A 7-8766 | 1/1995 |
| JP | A 8-40703 | 2/1996 |
| JP | A 9-24233 | 1/1997 |
| JP | 10310403 | * 11/1998 |
| JP | A 10-310403 | 11/1998 |
| WO | WO89/04556 | 5/1989 |
| WO | WO97/46482 | 12/1997 |

OTHER PUBLICATIONS

Xomeritakis et al., "Fabrication of a thin palladium membrane supported in a porous ceramic substrate by chemical vapor deposition", Journal of Membrane Science, pp. 261-272, 1996.

* cited by examiner

Primary Examiner—Cephia D. Toomer
(74) Attorney, Agent, or Firm—Oliff & Berridge, PLC

(57) ABSTRACT

For a reforming device that generates fuel gas for fuel cells by decomposing hydrocarbon compounds such as natural gas and then using a hydrogen separation composite to selectively transmit hydrogen, a hydrogen separation composite having the following structure is used. A porous support medium made of ceramics, etc. is formed, and a hydrogen separation metal is supported in the pores so as to fill the inside of the support medium. It is also possible to support a reforming catalyst. By doing this, it is possible to increase the area at which the hydrogen separation metal contacts gas, so the hydrogen transmission performance is increased. Furthermore, to prevent raw material gas leaks due to pin holes, high pressure gas is supplied to the hydrogen extraction side, and the total pressure is made higher than the pressure on the raw material gas supply side without making the hydrogen partial pressure higher. By using these means, it is possible to increase the hydrogen separation performance for the reforming device and to make the device more compact.

11 Claims, 46 Drawing Sheets

12  13  14

Fig.8
(a)
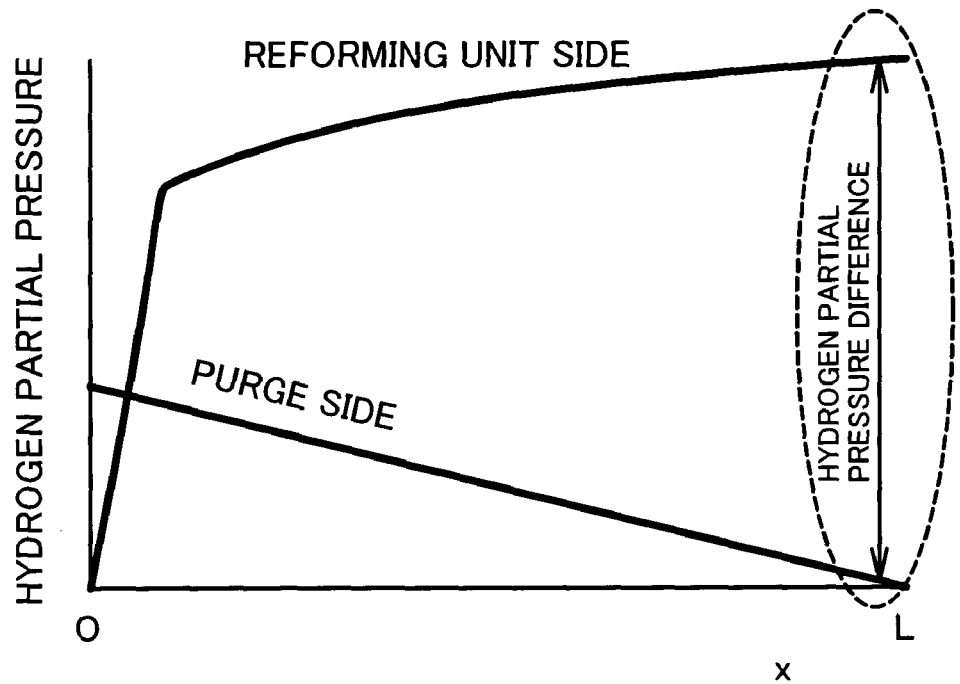
(b)
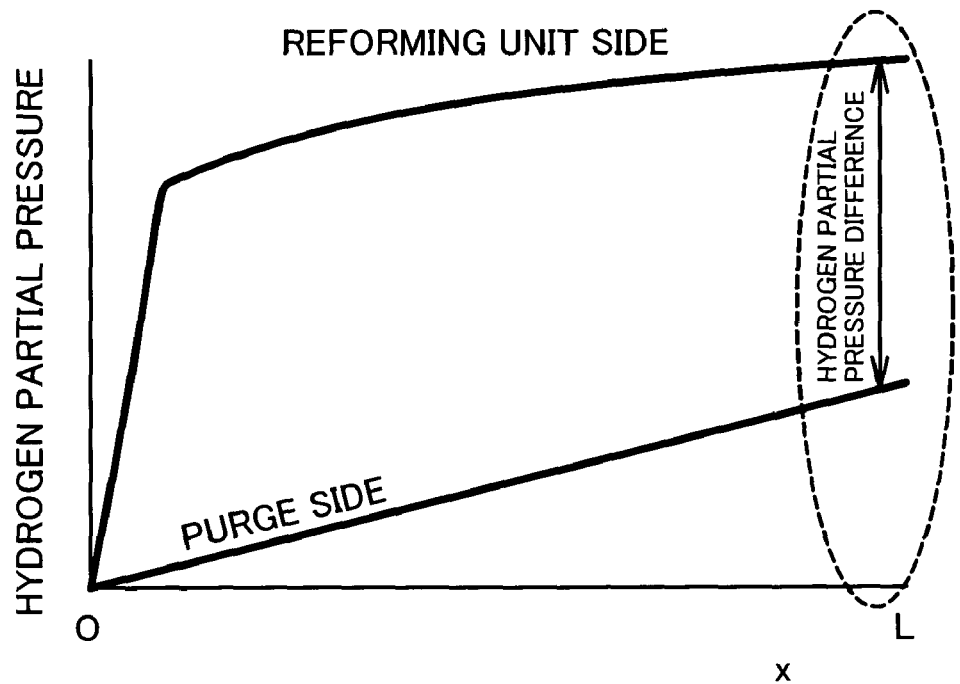

| Gas that Flows in the Flow Path | | | Purge Gas | Raw Material |
|---|---|---|---|---|
| Flow path structure | Single pipe | Straight pipe | Structure 1 | Structure 2 |
| | | Curved pipe | Structures 3, 5, 6, and 7 | Structure 4 |
| | Double pipe | Straight pipe | Structure 8 | Structures 9 and 10 |
| | | Curved pipe | | |
| | Porous monolith interior | Straight pipe | Structure 11 | |
| | | Curved pipe | | |

| Additional mechanisms | Partition | | | Structure 12 |
|---|---|---|---|---|
| | | | Structure 13 | |
| | Stirring device | | Structure 14 | |
| | Removable part | | | Structure 15 |
| | Heat stress suppression mechanism | | Structures 16 through 18 | |
| | Flow volume averaging mechanism | | Structures 16 and 19 | |

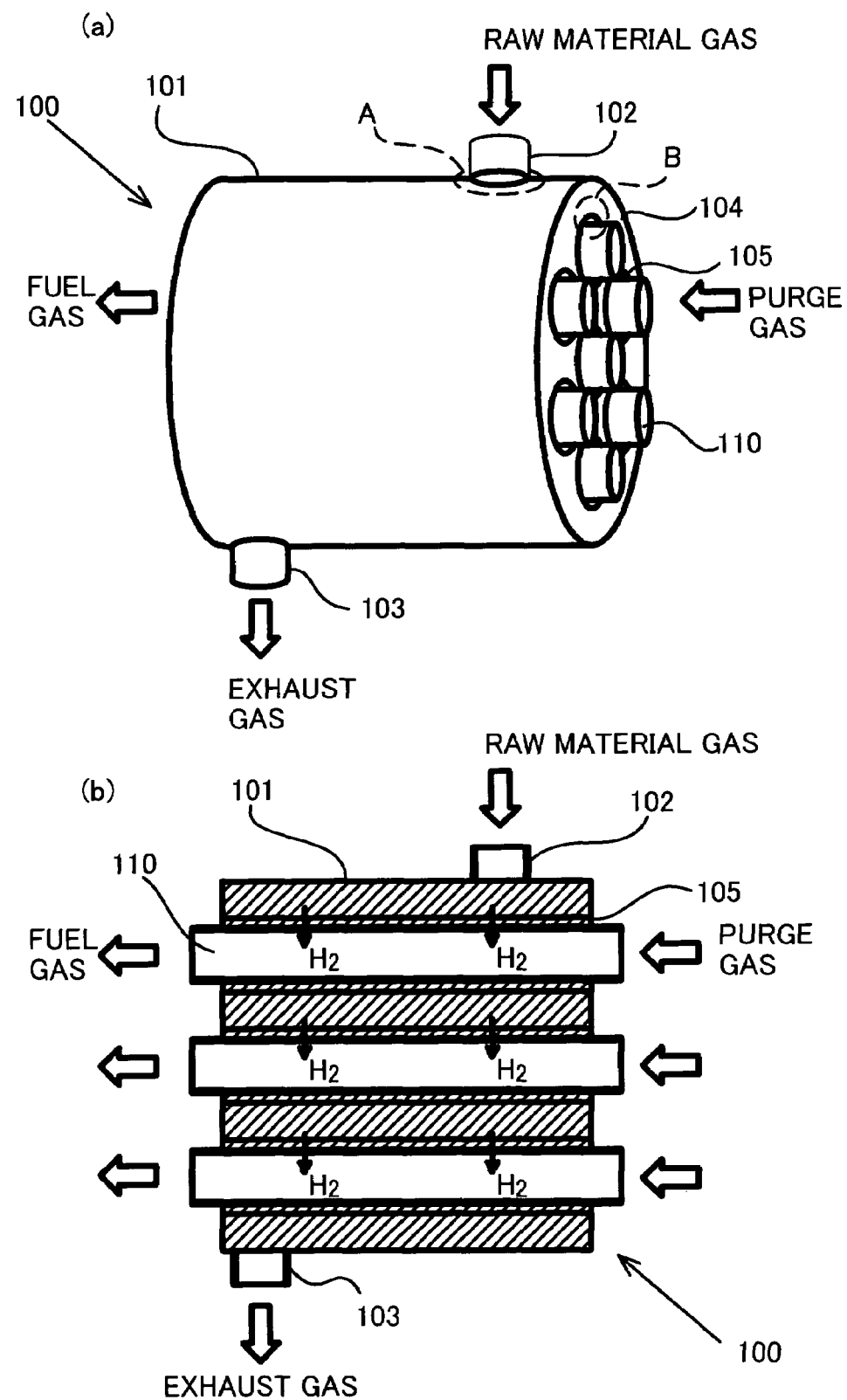

Fig.25
(a)
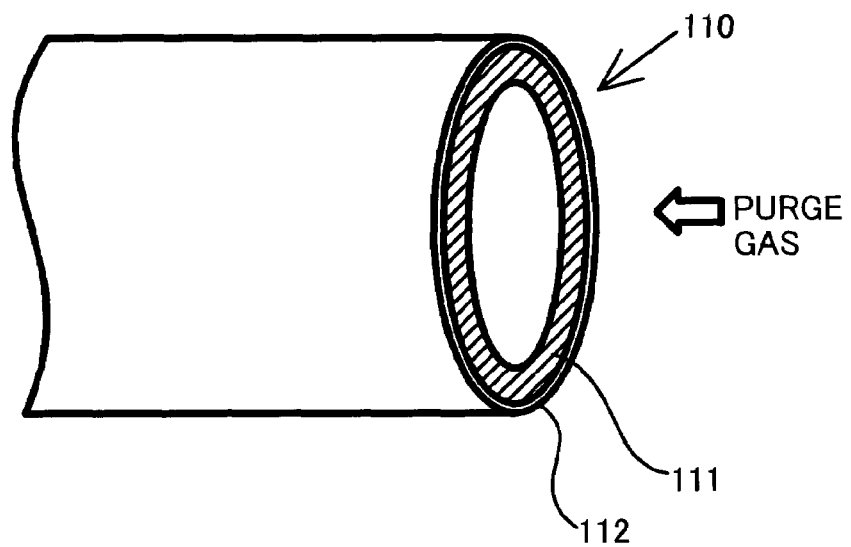
(b)
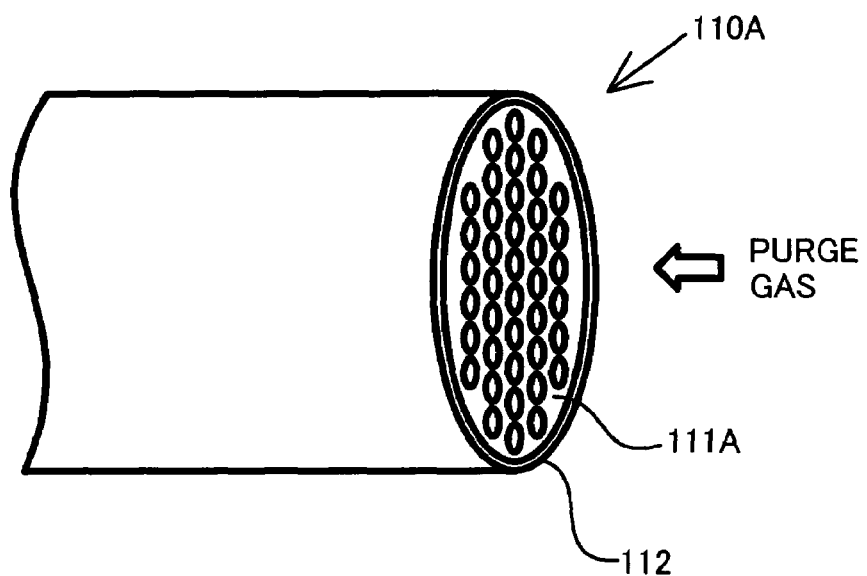

Fig.27
(a)
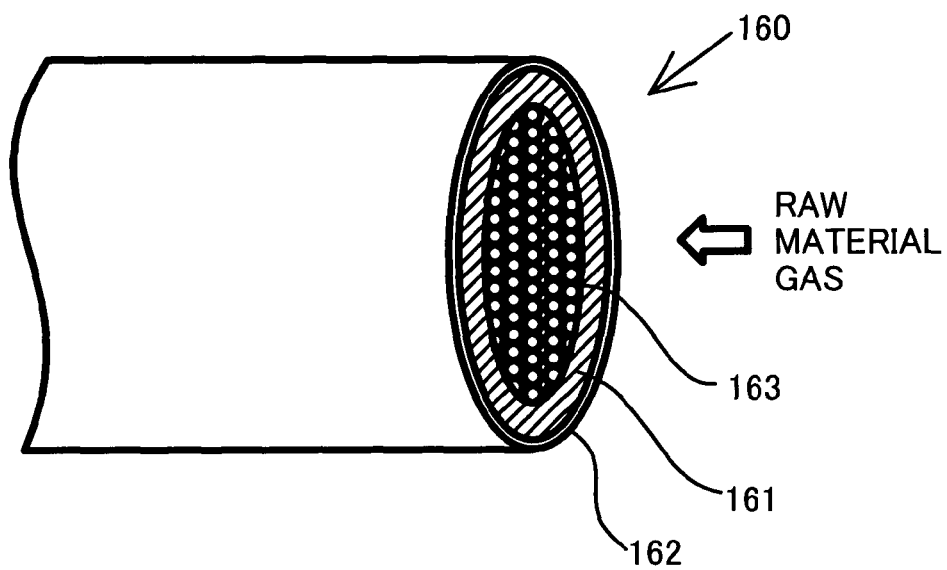
(b)
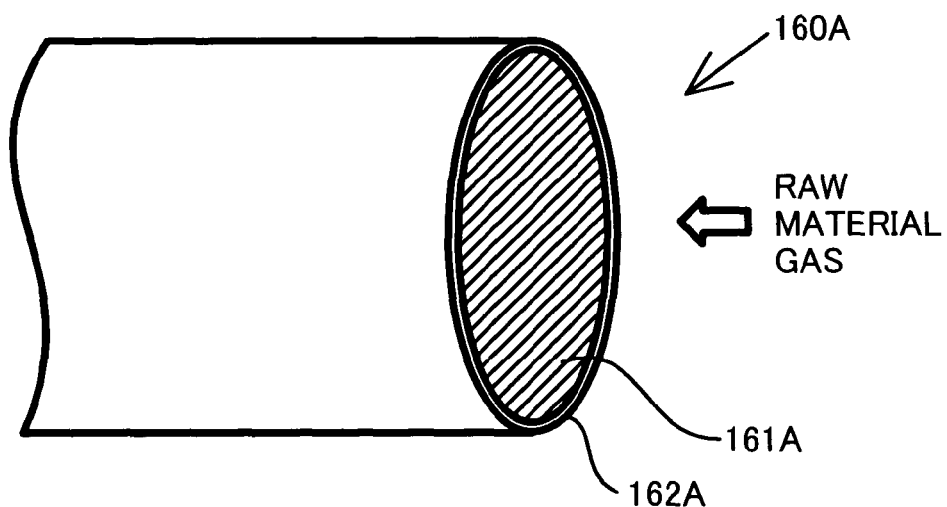

DEVICE FORMING FUEL GAS FOR FUEL CELL AND COMPOSITE MATERIAL FOR HYDROGEN SEPARATION

TECHNICAL FIELD

The present invention relates to a fuel gas generating device that generates hydrogen-rich fuel gases supplied to fuel cells from a specified raw material that contains hydrogen atoms such as hydrocarbon, alcohol, ether, and aldehyde, and relates to composites for hydrogen separation used to separate hydrogen from gas generated by said fuel gas generating device.

BACKGROUND ART

What has been proposed is a fuel cell that generates electromotive force by comprising a hydrogen pole and oxygen pole that sandwich an electrolytic layer that transmits hydrogen ions and which causes a reaction expressed by the following reaction formulas with the hydrogen pole and oxygen pole, respectively.

Hydrogen pole: $H_2 \rightarrow 2H^+ + 2e-$

Oxygen pole: $(1/2) O_2 + 2H^+ + 2e- \rightarrow H_2O$

For a system that uses this kind of fuel cell as a power supply, hydrogen gas must be supplied on the hydrogen pole side. For supplying hydrogen gas, there is a method that directly uses reserve hydrogen gas using a hydrogen occluded alloy or the like, and a method that uses hydrogen that is drawn by a chemical reaction such as a reforming reaction from a specified raw material such as methanol and natural gas prepared as fuel. Fuel such as natural gas is generally decomposed to a mixed gas that contains hydrogen by a reaction such as the one shown by the following formulas.

$C_nH_m + nH_2O \rightarrow nCO + (n+m/2) H_2$;

$C_nH_m + 2nH_2O \rightarrow nCO_2 + (2n+m/2) H_2$;

It is also possible to directly supply mixed gas to a fuel cell, but in addition to reactions at the electrode being hindered due to a drop in the hydrogen partial pressure at the electrode, there is also the risk of other ill effects such as having stable reactions being hindered due to toxification by carbon monoxide at the electrode, so normally, the mixed gas is supplied to the fuel cell after a process for reducing the carbon monoxide concentration or a process for separating only hydrogen is performed.

For these reactions, to separate hydrogen from the generated gas, a hydrogen separation film that has a property of selectively transmitting only hydrogen is used. Items known as hydrogen separation films are films formed with palladium or a palladium silver alloy, or items for which these metals are coated on a porous support medium such as ceramic. A hydrogen separation film has a property of moving hydrogen in a film by the difference in the hydrogen partial pressure on the front side and back side of the film, and can separate hydrogen from mixed gases using this property.

Specifically, as technology relating to a hydrogen separation film that uses a porous support medium and the manufacturing method thereof, there are the technologies noted in JAPANESE PATENT LAYING-OPEN GAZETTE No. 1-266833 and JAPANESE PATENT LAYING-OPEN GAZETTE No. 63-171617, for example. The former is technology that relates to the method of manufacturing a hydrogen separation film that suppresses the generation of pin holes, whereby a thin film of metal $LaNi_5$ that has hydrogen separating properties is formed using a sputtering method on a permeable porous substrate formed by a sintered body of stainless steel metal powder, etc. With this technology, when doing this, by adjusting the sputtering emission direction, a hydrogen separation film with no pin holes is formed on the surface layer of the porous substrate.

The latter is technology that tries to improve things such as transmissivity, heat resistance, and separation properties at high temperatures by forming a hydrogen separation film on an inorganic porous film with palladium supported. By loading palladium using a pressure reduction degassing method onto an inorganic porous film that underwent vapor deposition processing with palladium in advance, palladium is supported in the pores, and a hydrogen separation film is formed. More specifically, proposed are items such as a thin film with a palladium thin film formed on the surface of a porous film with part of this going into the pores as an anchor, and a thin film for which fine particle palladium is supported in the inner walls of the pores.

However, with hydrogen separation films of the prior art, there were problems in that the film thickness was thick and the hydrogen transmission speed was slow. There were also problems of it being easy for pin holes to occur in the hydrogen separation film and mixed gas leaking on the purge side.

For example, with the technology noted in JAPANESE PATENT LAYING-OPEN GAZETTE 1-266833 described above, a hydrogen separation film is formed on the surface of a porous substrate, so the overall thickness of the hydrogen separation part unavoidably became larger. Also, if an attempt was made to sufficiently prevent pin holes, the film thickness of the hydrogen separation film again became unavoidably thicker. The hydrogen separation film noted in JAPANESE PATENT LAYING-OPEN GAZETTE 63-171617 has palladium supported into the pores of the porous film, but with a palladium thin film formed on the surface, part of this entered the pores, or fine particle palladium is supported in the inner walls of the pores, and it does not extend beyond this level, so the effect was not sufficient.

However, in recent years, studies have been done for incorporating fuel cells in things such as vehicles, so the demand for fuel cell systems to become more compact is especially marked. It is known that the transmission speed for the hydrogen separation film is proportional to the surface area of the separation film and inversely proportional to the film thickness, and when using a hydrogen separation film of the prior art, in addition to devices becoming larger due to the film thickness being thick, it becomes necessary to compensate for the thickness of the film using the surface area, so it was not possible to make the separation part sufficiently compact. Also, to avoid gas leaks due to pin holes, the film thickness tends to become thicker, which is an obstacle to making the separation part more compact. Moreover, when forming a fuel gas generating device without using a hydrogen separation film, it is necessary to have something like a part that reduces the concentration of carbon monoxide contained in the mixed gas, which causes the device to become even larger. To try to make this kind of fuel cell system more compact, it is necessary to use a hydrogen separation film in the fuel gas generating device, and to satisfy the requirement of making devices markedly more compact in recent years, it has become necessary to further increase the hydrogen separating performance and to reliably avoid ill effects due to pin holes.

DISCLOSURE OF THE INVENTION

The goal of the present invention is, for a device for generating fuel gas for fuel cells, to provide technology that makes the fuel gas generating device more compact.

To achieve this goal, with the present invention, first, a composite for hydrogen separation that has excellent hydrogen separation performance is used. Second, a structure that increases the hydrogen separation performance is used for the fuel gas generating device. With these inventions, it is possible to increase the hydrogen separation speed while avoiding ill effects such as pin holes, and to try to make the fuel gas generating device more compact. Of these inventions, the structure used for the fuel gas generating device does not have the hydrogen separation composite of the present invention as an absolute prerequisite, but if the hydrogen separation composite of the present inventions is used, it is obvious that there is the advantage of being able to make the fuel gas generating device more compact. Following, we will explain the hydrogen separation composite and its manufacturing method as well as the structure used for the fuel gas generating device in sequence for the present invention, and furthermore, we will explain a fuel cell system that uses this fuel gas generating device. Note that in the field of industrial use related to fuel cells, these inventions have a relationship for the common problems of increasing the hydrogen separation performance and making the device more compact.

The first hydrogen separation composite of the present invention is a hydrogen separation composite that is structured by supporting at least a hydrogen separating metal on a porous support medium, and that selectively transmits the hydrogen in gas, and is characterized in that said hydrogen separation metal is made smaller than the diameter of the pores of said porous support medium, and is supported in a state where the pores of said porous support medium are filled within said porous support medium.

In this case, it is preferable that said hydrogen separation metal is supported in film form within said pores.

When a mixed gas that contains hydrogen, carbon monoxide, etc. penetrates from one surface of this hydrogen separation composite, the mixed gas tries to pierces the pores of the hydrogen separation composite and pass through to the other surface. At this time, for the hydrogen separation composite of the present invention, the pores are filled by the hydrogen separation metal, so it is possible to selectively transmit hydrogen only. It is known that generally, the hydrogen transmission speed based on the separation film formed using a hydrogen separation metal is proportional to the surface area for which the metal contacts the mixed gas, and is proportional to the film thickness of the separation film. The hydrogen separation composite of the present invention can greatly increase the contact area between the hydrogen separation metal and the hydrogen by supporting hydrogen separation metal within the pores. Therefore, it is possible to increase the hydrogen transmission speed and to decrease the thickness of the layer on which the hydrogen separation metal is supported. When using as the hydrogen separation metal palladium or a palladium alloy, it is possible to make the thickness of the palladium layer thin at approximately $1/10$ or less. By doing this, it is possible to contribute to making the fuel gas generating device more compact while also decreasing the volume of hydrogen separation metal, which also gives the advantage of being able to reduce the manufacturing cost of the hydrogen separation composite. Also, if the hydrogen separation metal is supported in film form within the pores, it is possible to make the thickness of each film thinner, and also to increase the contact area of the hydrogen separation metal and the mixed gas, so the hydrogen transmission speed can be increased even further.

The hydrogen separation composite of the present invention supports the hydrogen separation metal so as to fill the pores, so there is also the advantage of so called pin holes not forming easily. Generally, if the film thickness of the hydrogen separation metal is made thin, there is the problem of pin holes occurring easily, but with the present invention, hydrogen separation metal is supported in the porous pores, so it is possible to make the film thinner without bringing on this problem.

Here, we will give a more specific explanation of the significance of the hydrogen separation composite of the present invention by comparing it with the prior art. As prior art, we can list the technology noted in JAPANESE PATENT LAYING-OPEN GAZETTE 1-266833 and the technology noted in JAPANESE PATENT LAYING-OPEN GAZETTE 63-171617 as explained previously. The common point of these technologies and the present invention is that a hydrogen separation film is formed based on a porous support medium, but with the prior art, in contrast to the fact that as a result part of the hydrogen separation metal stopped at being supported in the pores of the porous support medium, with the present invention, the difference is that the hydrogen separation metal is supported to the level of filling the pores within the porous support medium, and mainly the hydrogen separation metal is supported within the porous support medium.

For the hydrogen separation film noted in JAPANESE PATENT LAYING-OPEN GAZETTE 1-266833, as is shown in FIG. 2 (b) of said bulletin, the hydrogen separation metal is formed on the surface layer of the porous support medium. Also, for the hydrogen separation film noted in JAPANESE PATENT LAYING-OPEN GAZETTE 63-171617, as is noted in the working example of said bulletin, a palladium thin film is formed on the surface, with part of this entering the pores as an anchor, and palladium being supported on the inner walls of the pores. In either case, the hydrogen separation metal does not reach the point where it fills the pores within the porous interior, and while pin holes are essentially prevented by the surface layer hydrogen separation metal layer, this is nothing more than the hydrogen separation being essentially done by the hydrogen separation metal surface of the surface layer. With the hydrogen separation films disclosed in the prior art examples, if the hydrogen separation metal layer formed on the surface layer is removed, we can see that it will not be possible to perform hydrogen separation sufficiently. For the prior art, the porous support medium is used for nothing more than to ensure mechanical strength with the process of making a thin film.

In contrast to this, with the hydrogen separation composite of the present invention, a big point of difference with the prior art is the fact that the layer that separates the hydrogen is formed mainly inside the porous support medium. In other words, the present invention was created based on the goal of being able to greatly increase the contact area of the hydrogen separation metal and the mixed gas if the hydrogen separation metal is supported to a degree that it will fill the pores and the hydrogen is separated mainly within the porous structure, and this point is clearly a basic difference from the prior art for which hydrogen separation is performed at the surface layer that is formed by a hydrogen separation metal alone. With the present invention, in contrast to the prior art that tried to simply make the film thinner while keeping the mechanical strength in order to increase the hydrogen separation performance, there is a big technical difference in that the invention provides a different approach of increasing the contact area between the mixed gas and hydrogen separation metal. As a specific means for this approach, the hydrogen separation composite of the present invention supports hydrogen separation metal inside the porous support medium, and by doing this, it exhibits the excellent effect of being able to further prevent pin holes while maintaining mechanical strength.

Note that "fill" here means the hydrogen separation metal being supported at a sufficiently high density in the pores. It is preferable that the hydrogen separation metal be supported in a state that is completely airtight in the pores, but the invention is not absolutely limited to this.

From this perspective, the hydrogen separation composite of the present invention, or put another way, said hydrogen separation metal can be said to be characterized by being made finer than the diameter of the pores of said porous support medium, and by mainly being supported in the pores inside said porous support medium. With the prior art, there was nothing more than part of the hydrogen separation metal being supported inside the pores, and in contrast to this, it is possible to obtain the aforementioned effect by the major part being supported within the pores.

The first hydrogen separation composite of the present invention can be manufactured by the following manufacturing method, for example.

The first manufacturing method is a manufacturing method using the so called impregnation support method, which is a manufacturing method comprising:

a process of forming said porous support medium, a process of forming a solution that contains the substance to be supported for being supported in said pores, and a process of precipitating mainly said substance to be supported in the holes of said porous support medium after impregnating said solution in said porous support medium.

The substance to be supported contains at least a hydrogen separation metal, but it is not limited only to hydrogen separation metals. The porous support medium can be formed from a variety of materials, with it being possible to use ceramics, for example. A variety of solutions can be selected according to the hydrogen separation metal, and when using palladium as the hydrogen separation metal, for example, it is possible to use palladium nitrate, for example, as the aforementioned solution. With processes for which a solution is contained in the porous support medium, it is also possible to simply dip the porous support medium into the solution, or to dip one side in the solution while degassing from the other side.

The second manufacturing method is a manufacturing method comprising a process of forming said porous support medium, a process of forming a viscous paste that can penetrate said pores by taking the substance to be supported to support in said pores while keeping this the same or smaller than the pore diameter of said porous support medium and mixing it with an organic solvent, and a process of, after coating said paste onto said porous support medium, baking, and mainly supporting said substance to be supported in the holes of said porous support medium.

The organic solvent is burned off by the burning process, so the substance to be supported can be supported on the porous support medium. For the process of coating the aforementioned paste, to help penetration into the pores, a process such as degassing from the side facing the coated side is also suitable. For this organic solvent, it is possible to use many diverse solvents according to the type of substance to be supported, etc., so for example, a polymer can be used.

The third manufacturing method is a manufacturing method comprising a process of generating fine particles that form said porous support medium, fine particles of said substance to be supported that is supported, and a compound of the organic solvent, and a process of supporting said substance to be supported in the holes of said porous support medium by molding said compound and baking it.

As with manufacturing method B, by burning off the organic solvent, it is possible to form the hydrogen separation composite of the present invention.

For the third manufacturing method, for the fine particles that form said porous support medium, it is also possible to support the fine particles of the substance to be supported in advance and to mix this with the organic solvent. An example of a method of supporting in advance includes a method of dipping the fine particles that form the porous support medium into the solvent of the substance to be supported and then drying. If fine particles of the substance to be supported is supported in advance on the fine particles that form said porous support medium, then the support aspect of the substance to be supported for the hydrogen separation composite that is ultimately obtained has the advantage of being able to be relatively adjusted as shown below. First, it is possible to adjust the support volume of the substance to be supported. Second, when there are multiple substances to be supported, it is possible to adjust the support volume for each substance to be supported. Also, by biasing by centrifugal separation, etc. each substance to be supported of the fine particles of the supporting porous support medium, it is possible to form each of the composites that is supported in layer form relatively easily. Third, when there are multiple types of both the substance to be supported and the porous support medium, the support combinations can be adjusted. One can support the substance to be supported on the porous support medium in advance in combinations that are easy to get used to or in combinations that exhibit special effects.

With methods such as the first to third manufacturing methods described above, it is possible to further provide a process that forms said hydrogen separation metal within said pores by, after forming a porous support medium for which a hydrogen separation metal is supported in the pores, then baking said porous support medium.

By doing this, it is possible to form a film that fills inside the pores by the hydrogen separation metals that are supported as fine particles inside the pores bonding with each other. The baking temperature when doing this must be set suitably according to things such as the type of hydrogen separation metal and the diameter of the pores. However, the hydrogen separation metal is made to be extremely fine, so it is not absolutely necessary to raise the temperature to the melting point.

In comparison to the first hydrogen separation composite described above, the second hydrogen separation composite of the present invention is characterized by having supported at the pores inside said porous support medium a catalyst that can be suitably used for a reforming reaction that generates hydrogen from a specified raw material.

In this case, it is even more preferable that said hydrogen separation metal and said catalyst be supported in layer form inside said porous support medium.

A catalyst is contained in the second hydrogen separation composite, so it is possible to perform a reforming reaction and hydrogen separation with this alone, making it possible to make the fuel gas generating device smaller. If the hydrogen separation metal and catalyst are mixed inside the porous support medium, though the concerned effect can be obtained, because both of these are provided in layer form, it is possible to do the reforming reaction and hydrogen separation in sequence, so it is possible to make even more effective use of the hydrogen separation metal. Also, with the second hydrogen separation composite, there is also the advantage of being able to have the catalyst contact the mixed gas over a broad area, making it possible to promote the reforming reaction.

For the second hydrogen separation composite for which said hydrogen separation metal and said catalyst are supported in layer form inside said porous support medium, it is also possible to support said catalyst in a less dense state than said hydrogen separation metal within said porous support medium.

Said another way, this means that the diffusion properties of the catalyst are higher than those of the hydrogen separation metal. By doing this, it is possible to increase the contact area of the catalyst and the raw material gas, which makes it possible to promote the reforming reaction further.

To support using the concerned embodiment, for example, with a layer for which said hydrogen separation metal is supported and a layer for which said catalyst is supported, it is possible to have different physical structures for said porous support medium.

As a physical structure, for example, there are items including the diameter of the pores of the porous structure, or the percentage per unit area occupied by pores (hereafter referred to as porosity). For example, if the diameter of the pores on the side on which the catalyst is supported is made larger, then it is possible to do high dispersion of the catalyst. It is also possible to increase the porosity on the side on which the catalyst is supported.

For the second hydrogen separation composite for which said hydrogen separation metal and said catalyst are supported in layer form inside said porous support medium, it is also suitable to form the layer on which said hydrogen separation metal is supported and the layer on which said catalyst is supported using porous support mediums of different compositions.

It is generally known that there are cases when the characteristics of the substance to be supported increase according to the combination of the substance to be supported and the composition of the porous support medium. Therefore, on the side on which the catalyst is supported, by using a porous support medium that exhibits an effect of increasing the catalytic activity, it is possible to promote the reforming reaction. As an example, when using a rhodium noble metal as the catalyst, it is possible to increase the catalytic activity by using ceria particles for the porous body. On the other hand, on the side for which the hydrogen separation metal is supported, by using a porous support medium which is easy for the hydrogen separation metal to get used to, it is easier to support the hydrogen separation metal densely within the pores, and to support the hydrogen separation metal in film form. When using a palladium noble metal as the hydrogen separation metal, it is easier to attach the hydrogen separation metal in film form by using alumina particles in the porous support medium.

For the first through third manufacturing methods explained previously regarding the first hydrogen separation composite, the second hydrogen separation composite can be manufactured by using a hydrogen separation metal and a catalyst as the substance to be supported. Furthermore, when providing both items in layer form, it is also possible to manufacture this using the fourth through sixth manufacturing methods noted below.

The fourth manufacturing method of a hydrogen separation composite is a manufacturing method comprising:

(a) a process of forming a first porous support medium for which said hydrogen separation metal is supported within the pores, (b) a process of forming a second porous support medium for which said catalyst is supported within the pores, and (c) a process of unifying said first and second porous support medium by joining them.

In other words, this is a method with which the layer that supports the hydrogen separation metal and the layer that supports the catalyst are manufactured by separate processes, and these are joined together as one unit. By doing this, not only is it possible to easily support the hydrogen separation metal and catalyst in layer form, but it is also easily possible to realize support of the catalyst in a less dense state than the hydrogen separation metal and to change the support volume of both items. Therefore, with the concerned manufacturing method, it is possible to relatively easily form a hydrogen separation composite that has properties suitable for reforming reactions and hydrogen separation.

For the concerned manufacturing method, it is also possible to bake said first porous support medium before said process (c), and to have a process by which a film of said hydrogen separation metal is formed within the pores of said porous support medium.

By doing this, it is possible to support the hydrogen separation metal in film form inside the porous support medium, and to further increase the hydrogen separation speed.

The fifth manufacturing method of a hydrogen separation composite is a manufacturing method comprising:

a process of generating a mixture of fine particles that form said porous support medium, fine particles of said hydrogen separation metal, fine particles of said catalyst, and an organic solvent, a process of biasing the distribution of each fine particle within said mixture using centrifugal separation, and a process of molding and baking said mixture.

For the concerned manufacturing method, it is also possible to include at least two types of fine particles with different specific gravities for the fine particles that form said porous support medium.

By using the concerned manufacturing method, it is possible to simultaneously form the layer that supports the catalyst and the layer that supports the hydrogen separation metal using one process, which makes it possible to simplify the manufacturing process. Also, by including two different types of fine particles with different specific gravities as the porous support medium, it is possible to change the composition of the porous support medium by the layer that supports the catalyst and the layer that supports the hydrogen separation metal. Furthermore, by adjusting the specific gravity of the organic solvent to be about the same as that of the catalyst, as a result of the organic solvent being biased to the layer that supports the catalyst, it is also possible to increase the porosity of this layer and to increase the diameter of the pores. For the concerned manufacturing method, as was explained with the third manufacturing method previously, it is preferable to respectively support fine particles of hydrogen separation metal and fine particles of the catalyst in advance in the fine particles that form the porous support medium. By doing this, it is possible to obtain the various effects described previously with the third manufacturing method.

The sixth manufacturing method of a hydrogen separation composite is a manufacturing method comprising:

a process that impregnates a solution that contains one of said hydrogen separation metal or catalyst in said porous support medium, a process that precipitates the elements contained in the solution after biasing the distribution of said solution in the thickness direction by having an environment that satisfies at least one of the conditions of having the porous support medium that is impregnated with said solution have a differential between the fluid pressure that works on one surface in the thickness direction and the fluid pressure that works on the other surface, or the condition of centrifugal force working in the thickness direction, and a process of precipitating within the pores after impregnating a solution that contains the other of said hydrogen separation metal and the catalyst in said porous support medium.

The condition of having a differential in the fluid pressure can be realized by blowing air to one side of the porous support medium, for example. Of course, the air pressure must be blown at a high enough level to move the solution in the pores and within a range suppressed to a level that keeps the air from being blown to the other side of the porous support medium. Note that the blown fluid does not have to be air, so it is possible to use an inert gas that does not affect the hydrogen separation metal or catalyst, so that various fluids can be used. For the pressure difference of the fluid, besides the method of blowing from one side, it is also possible to reduce the pressure of the other side.

For the first and second hydrogen separation composites of the present invention, it is also possible to form a flat film of thickness approximately 0.1 mm to 5 mm, but it is preferable to mold to a shape that has bumps in the thickness direction. For example, if the substance to be supported, the fine particles of the porous support medium, and the organic solvent are mixed, and baking is done after molding to a form that has bumps, it is possible to form the concerned shape. It is also possible to support the substance to be supported by using a method such as a method that supports by impregnating into a porous support medium which was formed in a bumpy shape in advance. If this kind of bumpy form is used, it is possible to increase the contact area of the raw material gas and the mixed gas per unit area for the hydrogen separation composite, so it is possible to make the fuel gas generating device more compact.

For the first and second hydrogen separation composites of the present invention, regardless of whether this is molded in a bumpy form, a porous material having a thickness for which it is possible to ensure mechanical strength can be joined on at least one side in the thickness direction. In this case, the porous material can have the same or a different composition than the porous support medium that forms the hydrogen separation composite. For joining of the items, it is possible to use various methods that supply various gases to the hydrogen separation composite and that do not hinder extraction.

Next, we will explain the fuel gas generating device of the present invention.

For a fuel gas generating device that generates hydrogen-rich fuel gas from a specified raw material, the present invention comprises:

the hydrogen separation composite of the present invention, a supply unit that supplies a mixed gas containing hydrogen generated by a chemical reaction from said raw material to said hydrogen separation composite, and an extraction unit that extracts hydrogen separated by said hydrogen separation composite. With the concerned structure, it is possible to separate hydrogen efficiently at the extraction unit using the hydrogen separation composite, and to increase the fuel gas generating efficiency.

Of the hydrogen separation composites of the present invention, when using a hydrogen separation composite equipped with a catalyst and hydrogen separation metal in metal form, it is preferable that the layer in which said catalyst is supported be placed on said supply side. By doing this, it is possible to efficiently realize the generating process which is a process of reforming the raw material gas supplied from the supply side at the layer in which the catalyst is supported and then separating hydrogen at the layer in which the hydrogen separation metal is supported.

For the fuel gas generating device of the present invention, it is preferable to have a structure whereby the flow path that supplies said mixed gas along said supply surface on said supply side has a cross section area that becomes narrower as it goes downstream, and a structure whereby the flow path that transports said fuel gas along said extraction surface on said extraction surface side has a cross section area that becomes wider as it goes downstream.

If the cross section area of the flow path is fixed, then the pressure on the supply side will decrease as it goes downstream and the pressure on the extraction side will increase as it goes downstream by the amount that the hydrogen moves from the supply side to the extraction side. Meanwhile, the fluid pressure is inversely proportional to the cross section are of the flow path, so a flow path constructed with the structure described above exhibits an effect whereby the mixed gas pressure increases as it goes downstream on the supply side, and exhibits an effect of the fuel gas pressure decreasing on the extraction side. As a result, it is possible to compensate for the pressure decrease on the supply side, and to compensate for the pressure increase on the extraction side. Therefore, by providing a flow path with the structure described above, a fuel gas generating device can suppress fluctuation in the difference between supply side pressure and extraction side pressure across the full area of the hydrogen separation composite, so this can be made almost even at the design stage of the cross section shape. Typically with a fuel gas generating device, the volume of fuel gas generated is controlled by controlling the raw material gas or mixed gas pressure, so if approximately even pressure is realized across the entire area of the hydrogen separation composite, there is the advantage that the concerned control is easy. It is also possible to suppress the bias of the weighted distribution that is added to the hydrogen separation composite by the pressure difference, giving the advantage of being able to easily avoid deformation and damage to the composite.

Also, for the fuel gas generating device of the present invention, it is preferable to have a carrier gas supply unit that flows the carrier gas that carries hydrogen to said extraction unit, and to flow the carrier gas in a direction opposite the flow direction of the mixed gas at said supply unit.

Along with extraction of hydrogen, the hydrogen pressure of the supply unit decreases as it goes downstream. Conversely, the hydrogen pressure of the extraction unit increases as it goes downstream. If the flow directions of these are made to face each other, the sites for which the hydrogen partial pressure is low and the sites where it is high face each other sandwiching a hydrogen separation composite. Therefore, even at the downstream side of the supply unit where the hydrogen partial pressure is low, it is possible to maintain a higher hydrogen partial pressure than at the extraction unit, so it is possible to perform hydrogen separation over the entire area of the hydrogen separation composite. As a result, it is possible to increase the hydrogen separation efficiency, and to make the fuel gas generating device smaller.

When also performing a chemical reaction to generate hydrogen on the supply unit side at the same time, there is also the following effect. In this case, due to generation of a mixed gas by the chemical reaction, the hydrogen partial pressure on the supply side becomes higher as it goes downstream. Therefore, if a carrier gas is flowed to the extraction side so as to face the flow direction of the raw material gas along the supply side, then the downstream of the supply side and the upstream of the extraction side face each other sandwiching a hydrogen separation composite. As a result of this, in the concerned area, there is a great difference in hydrogen partial pressure. Generally, the hydrogen transmission speed for a hydrogen separation composite is proportional to the hydrogen partial pressure of the opposing surface, so hydrogen transmission is done extremely efficiently in this area.

When flowing gas to the supply side and extraction side in this way, a variety of extraction side gases can be selected, and as an example, for said supply unit, as a mechanism for mixing the raw material gas and steam and generating said mixed gas, steam can be used as said carrier gas.

It is also possible to directly use the raw material gas to be supplied to said chemical reaction unit as said carrier gas. The raw material gas is a specified gas that contains hydrogen atoms, and there is no risk of toxification at the electrode of the fuel cell even if this is mixed with the fuel gas, so this can be used as the carrier gas. As with the case of using steam, there is the advantage of being able to use the raw material gas transmitted from the extraction side to the supply side for a reforming reaction. Also, when using steam, a considerable amount of heat is required to generate steam for the carrier gas, but when using raw material gas, the concerned heat energy is not necessary, so compared to when using steam, there is the advantage of the energy efficiency being higher.

For the fuel gas generating device of the present invention, with the supply unit and extraction unit, it is preferable to adjust the pressure so that the hydrogen partial pressure of the supply unit is higher than the hydrogen partial pressure of the extraction unit, and that the total pressure of the supply surface is lower than the total pressure of the extraction surface.

By making the total pressure of the supply surface lower than the total pressure of the extraction surface, even when there are pin holes in the hydrogen separation composite, it is possible to avoid leaking of raw material gas or mixed gas from the supply side to the extraction side. The difference in total pressure is provided under the condition of having the hydrogen partial pressure of the supply side be higher than the hydrogen partial pressure of the extraction side, so the hydrogen transmission at the hydrogen separation composite is realized as in normal cases. The concerned pressure difference can be realized easily by supplying high pressure gas that does not contain hydrogen to the hydrogen extraction side. The concerned pressure adjustment is effective when used not only for a fuel gas generating device that uses the hydrogen separation composite of the present invention, but also one that uses a hydrogen separation composite of the prior art.

The pin holes described above include both pin holes that occur as one type of defect in the process of manufacturing a hydrogen separation composite and gaps that are planned in advance based on the structure of the hydrogen separation composite. For example, as described above, for the hydrogen separation composite of the present invention, this includes not only items for which the pores are sealed airtight by hydrogen separation metal, but also embodiments for which hydrogen separation metal is supported while keeping a gap of a level that allows air to pass through. The concerned gap is also included in the pin holes described above. With the structure noted above, if the total pressure on the extraction side is made high, then even when a hydrogen separation metal is supported in a state whereby a gap is kept in advance n this way, it is possible to separate hydrogen while preventing gas leaks.

Note that when supplying fuel gas generated with steam as the carrier gas to a low temperature type fuel cell, it is preferable to supply it via a dehumidifier that reduces the partial pressure of the steam in the fuel gas to a specified value or below. An example of a low temperature type fuel cell is a solid polymer film type fuel cell.

With a low temperature type fuel cell, when a fuel gas that contains a large amount of steam is supplied, water condenses within the anode electrode, and it is possible that the electricity generating efficiency will be reduced. As described above, if a dehumidifier is provided between the fuel gas generating device and the fuel cell and the partial pressure of the steam is reduced, then the concerned ill effects can be avoided. As a dehumidifier, for example, it is possible to use a device that uses a heat exchanger and retrieves the steam in the fuel gas as condensed water. Note that when using a solid polymer film type fuel cell as a low temperature type fuel cell, that humidification of the electrolytic film is required, so it is preferable that the partial pressure of the steam be reduced at a level that allows maintenance of the humidity needed for this humidification at the dehumidifier.

When constructing a fuel cell system without providing a dehumidifier, it is preferable to use a high temperature type fuel cell for said fuel cell. A high temperature type fuel cell means a fuel cell for which the operating temperature reaches 150° C. or above, and known examples of this include phosphoric acid type and fused carbonate type fuel cells. When using these fuel cells, condensation of the steam in the fuel gas does not occur, so it is not necessary to provide a dehumidifier, making it possible to simplify the device structure.

Using the hydrogen separation composite of the present invention, it is possible to have a variety of structures for a fuel gas generating device that generates fuel gas for a fuel cell from a specified raw material.

For example, it is possible to include a chemical reaction unit that generates from said raw material a mixed gas that contains hydrogen, and a carrier flow path that carries the hydrogen separated from said mixed gas by flowing a specified carrier gas, and for one element of said chemical reaction unit and carrier flow path to have a pipe flow path formed within the other element using the hydrogen separation composite of the present invention.

As a first structure, the pipe flow path can have a structure whereby one of said chemical reaction unit or carrier flow path can be a pipe formed by the hydrogen separation composite of the present invention with this provided in a state that pierces through the interior of the other element. The cross section of the pipe does not have to be circular.

This is a relatively simple structure, which has the advantage of having easy manufacturing and maintenance. For the aforementioned structure, there are two structures, one a structure with the interior of the pipe as the carrier flow path, and the other with it as the chemical reaction unit. With the former structure, the chemical reaction unit through which the pipe passes is formed from a roughly airtight container, and this can be structured so that the interior of said container is filled with a catalyst that promotes the chemical reaction. In this case, if the catalyst is filled in particle form, there is the advantage of being able to disperse the raw material gas, making it possible to promote the reaction. Also for the former structure, while supporting a catalyst, it is possible to form said chemical reaction unit, as a porous material monolith provided with a hole for inserting the pipe that is said carrier flow path. When filling with the catalyst in particle form, there is the risk of friction occurring with the separation film formed by the hydrogen separation composite on the surface of the pipe due to contact with the catalyst, but there is the advantage of being able to avoid the concerned ill effects if a porous material in which a catalyst is supported is used. Note that for these structures, to increase strength, the carrier gas flow path itself is formed as a porous monolith, and a pillar shaped component on the surface of which is formed a hydrogen separation film can be used as the pipe. The concerned component also exhibits the same effects as the pipe in terms of forming a carrier gas flow path, so in a broad sense, it is equivalent to the pipe of the present invention.

The latter structure, in other words the structure that uses the pipe interior as the chemical reaction unit, can be structured by supporting a catalyst within said pipe. The pipe interior can be filled with the catalyst in particle form. It is also possible to construct the pipe by forming a hydrogen separation film around a porous material in which a catalyst is supported. With a structure filled with particle shaped catalyst, there is the advantage of maintenance of the chemical reaction unit being easy by changing the catalyst. Also, because the hydrogen separation film formed on the outer surface of the pipe does not contact the filled catalyst, there is the advantage that the hydrogen separation film can be protected. With a structure that uses a porous material in which a catalyst is supported, there is the advantage that the catalyst distribution can be kept even, the advantage that manufacturing of the fuel gas generating device is easy, and the advantage of being able to ensure pipe strength.

For the fuel gas generating device of the present invention, said pipe can also be a straight pipe, but it can also be a shape that has a curved part inside the other component that the pipe pierces through. A curved part means a part where the gas flow direction changes. It is not absolutely necessary that the pipe itself curves. By having a curved part, it is possible to efficiently lay pipe inside the other component, and to be able to increase the hydrogen transmission volume. A curved part also has some freedom in relation to heat distortion, so there is also the advantage of being able to avoid the effects of heat during operation. When using a pipe that has a curved part in this way, it is preferable to have a composite that has a metal porous material for said porous support medium. Metal has ductility, so it is possible to suppress damage to the hydrogen separation composite due to vibration, etc.

When a curved part is provided in a pipe, it is possible to increase the maintainability by providing a mechanism that allows the curved part to be removed. This structure is especially effective when using the pipe interior as a chemical reaction unit, and by making it possible to remove the curved part, there is the advantage that it is easy to replace the catalyst that fills or is supported in the pipe. Maintainability will be increased even further if there are two locations, one upstream and one downstream of the curved part, where removal is possible.

For the fuel gas generating device of the present invention, it is possible to have said pipe be a double pipe in which is inserted into an outer pipe, one end of which is open, an inner pipe for which both ends are open. Gas is inserted from the inner pipe, is turned back at the closed end of the outer pipe, and is exhausted from the opening of the outer pipe. It is also possible to use a flow that is opposite to this. By using the concerned structure, it is possible to give freedom in relation to heat distortion of both the outer pipe and inner pipe, giving the advantage of it being easy to suppress the effects of heat.

When using the aforementioned double pipe, it is also possible to construct said chemical reaction unit provided with a catalyst for reforming reactions in said inner pipe, and provided with a catalyst for reactions to reduce carbon monoxide in the outer pipe. If this is done, then two types of chemical reaction unit can be structured as one unit, making it possible to make the device more compact. Examples of reactions for reducing carbon monoxide include a shift reaction and a reaction that selectively oxidizes carbon monoxide. The catalyst can be filled in particle form or can be supported in the porous material.

For the structure noted above, it is especially preferable to perform a shift reaction with the outer pipe. Generally the reaction temperature of reforming reactions is very high, and the reaction temperature of shift reactions is slightly lower than that. The operating temperature of a fuel cell is lower than the reaction temperature of a shift reaction. If a shift reaction is to be performed at the outer pipe, then it is possible to have the temperature of the separated hydrogen approach the operating temperature of the fuel cell while maintaining the reaction temperature of the reforming reaction and the shift reaction.

For the fuel gas generating device of the present invention, it is preferable to provide a suppression mechanism inside the other pipe that said pipe pierces through that suppresses the speed component in the same direction as the flow direction inside said pipe for the flow of that interior. For example, it is preferable to provide a mechanism that realizes a flow orthogonal to the pipe, or a mechanism that realizes a flow that faces opposite the flow in the pipe. A partition or pane, etc. can be used for the suppression mechanism. By using the concerned structure, it is possible to expand the hydrogen partial pressure difference of the hydrogen separation film and to increase the hydrogen separation rate.

For the fuel gas generating device of the present invention, it is preferable to provide a stirring mechanism that stirs the gas inside the other element that said pipe pierces through. If the gas is stirred, it is possible to increase the hydrogen separation efficiency. We will explain an example of a case when a carrier gas is flowed inside a pipe. A reforming reaction or the like is performed at the chemical reaction unit that is the other element, and a mixed gas that contains hydrogen is generated. When there is no stirring mechanism, hydrogen is extracted from the mixed gas into the pipe, so the hydrogen distribution within the chemical reaction unit decreases near the pipe, and thus the hydrogen separation efficiency decreases. In contrast to this, if the mixed gas of the chemical reaction unit is stirred by a stirring mechanism, it is possible to avoid extreme reduction of the hydrogen distribution near the pipe even after hydrogen is extracted in the pipe, so it is possible to suppress the decrease in hydrogen separation efficiency. The same is true when using the pipe interior as the chemical reaction unit. In this case, it is possible to avoid an increase in the extraction side hydrogen partial pressure by the extraction of hydrogen, and to increase the hydrogen separation efficiency.

For the first structure, when using a pipe with both ends open, it is preferable to provide at both ends of the pipe an isolation mechanism that isolates said mixed gas and the carrier gas, and at least at one end, a suppression mechanism that suppresses thermal stress of said pipe. By suppressing the thermal stress generated at the pipe by heat during operation, it is possible to avoid things such as pipe damage. Part of the pipe formed by hydrogen separation composite can have a structure that works as a suppression mechanism, or the material attached separately to the pipe can have a structure that works as a suppression mechanism.

For example, if a pipe is supported so that one end is a free end that pierces through said isolation mechanism, then the free end works as the suppression mechanism. The free end pierces through the isolation mechanism, so even if the position of the free end varies due to the presence of heat distortion, it is possible to avoid mixed gas and carrier gas leaks. For the isolation mechanism, for example, a gasket can be used to seal around the pipe. It is also possible to use a high pressure gas layer that supplies inert gas of a higher pressure than the mixed gas and carrier gas between the two. With the latter embodiment, it is possible to more reliably avoid mixed gas and carrier gas leaks by using the pressure of the inert gas. Steam can be used as the inert gas.

For the suppression mechanism, as another structure, an expansion mechanism that absorbs the heat distortion can be used so that the entire length including the pipe and said suppression mechanism are roughly constant. If this is done, then even if both ends of the pipe are fixed to the isolation mechanism, it is possible to suppress heat stress. For the concerned structure, for example, a structure that connects a bellows to one end of the pipe can be used. A slide pipe can also be used. In other words, the pipe is constructed by a combination of an outer pipe and an inner pipe, with one end of the outer pipe fixed to one isolation mechanism and the other end being the free end, and the inner pipe having one end fixed to the other isolation mechanism and the other end being the free end, with the structure such that the free end of the inner pipe is inserted into the free end of the outer pipe. By having the free end of the outer pipe and inner pipe slide, it is possible to suppress heat stress. It is preferable to seal the gap between the inner pipe and the outer pipe.

For the pipe shaped flow path, besides using a pipe formed using hydrogen separation composite, as a second structure, it is possible to use a structure for which there is a monolith made of porous material on which is formed through holes, a hydrogen separation layer for which said hydrogen separation metal is supported is formed in the porous material around said through holes, a catalyst support unit in which is supported the catalyst used for said chemical reaction is formed at the parts except for said hydrogen separation layer in said porous material, and said catalytic support part becomes said chemical reaction unit while said hydrogen separation layer and through holes become said carrier flow path.

Used for the porous material monolith is a porous material solid, or block, of an approximate size that can be used as a hydrogen generating unit. Forming a separation film on the surface of a porous material monolith can be realized relatively easily busing various methods such as impregnation support, physical deposition, and chemical deposition. It is possible to form a unit using a single parts surface process, so there is the advantage that production is relatively easy. Using the monolith, by forming a hydrogen separation film on the surface, there is the advantage o being able to ensure the unit strength. For the hydrogen separation film, it is possible to use a thin film such as of palladium which was used from the prior art, but it is preferable to use the hydrogen separation composite of the present invention.

For the fuel gas generating device of the present invention, comprising a raw material supply mechanism that supplies raw material gas for which said raw material has been vaporized in said chemical reaction unit, and a carrier gas supply mechanism that supplies said carrier gas to said carrier flow path, it is preferable that at least at one of said raw material supply mechanism and carrier gas supply mechanism, there be provided a flow volume averaging mechanism that suppresses bias of the flow volume distribution to said chemical reaction unit or said carrier flow path. For the raw materials and carrier gas, by supplying raw material gas and carrier gas evenly, it is possible to increase the efficiency of hydrogen generation and hydrogen separation. The bias of flow volume distribution occurs more easily when the inlet cross section area of the chemical reaction unit and carrier flow path is broader than the cross section area of the pipes that supply raw material gas and carrier gas. Near the pipe outlet front, it is common for the flow volume distribution to be high, and the flow volume distribution to get lower as the distance from the outlet increases.

As a flow volume averaging mechanism, for example, it is possible to use a mechanism that diffuses the supply port of the gas to the chemical reaction unit and the carrier flow path. As an example, it is possible to use a structure for which a baffle board provided with multiple orifices is placed near the pipe outlet. It is possible to make this even more even by setting the orifice diameter to be smaller near the outlet front and larger as it separates from the front.

It is also possible to use a mechanism that disperses the dynamic pressure of the supplied gas. For example, it is possible to use a structure provided with a deflecting plate that deflects the flow to the pipe outlet front. It is possible to avoid having the dynamic pressure of the gas center on the outlet front through the effect of the deflecting plate. From the perspective of the dispersion of dynamic pressure, it is effective to provide a deflecting plate in a direction that deflects the flow by 90 degrees. It is also possible to provide multi level deflecting plates rather than to use just one. It is also possible to provide the pipe outlet so that the gas is supplied roughly parallel to the inlet of the chemical reaction unit and carrier flow path.

BRIEF DESCRIPTION OF THE DRAWINGS

FIG. 8 is an explanatory diagram that shows the hydrogen partial pressure on the chemical reaction unit side and the purge side.

FIG. 23 is an explanatory diagram that shows the categories of hydrogen generating and separation mechanisms.

FIG. 24 is an explanatory diagram that shows the structure of hydrogen generating and separation mechanism 100 as structure 1.

FIG. 25 is an explanatory diagram that shows the structure of separation pipe 110.

FIG. 27 is an explanatory diagram that shows the structure of separation pipe 160.

BEST MODE FOR CARRYING OUT THE INVENTION

We will explain working embodiments of the present invention divided into the following sections.

A. Structure of a Fuel Cell System

B. Structure and Manufacturing Method of Composite for Hydrogen Separation

C. Structure of the Flow Path of a Fuel Gas Generating Device

D. Variation Example of a Composite for Hydrogen Separation

E. Variation Example of a Gas Flow Path [Sic]

F. Variation Example of a Fuel Cell System

G. Second Working Example

H. Structure Examples of a Hydrogen Generating and Separation Mechanism

A. Structure of a Fuel Cell System

Figure 1:
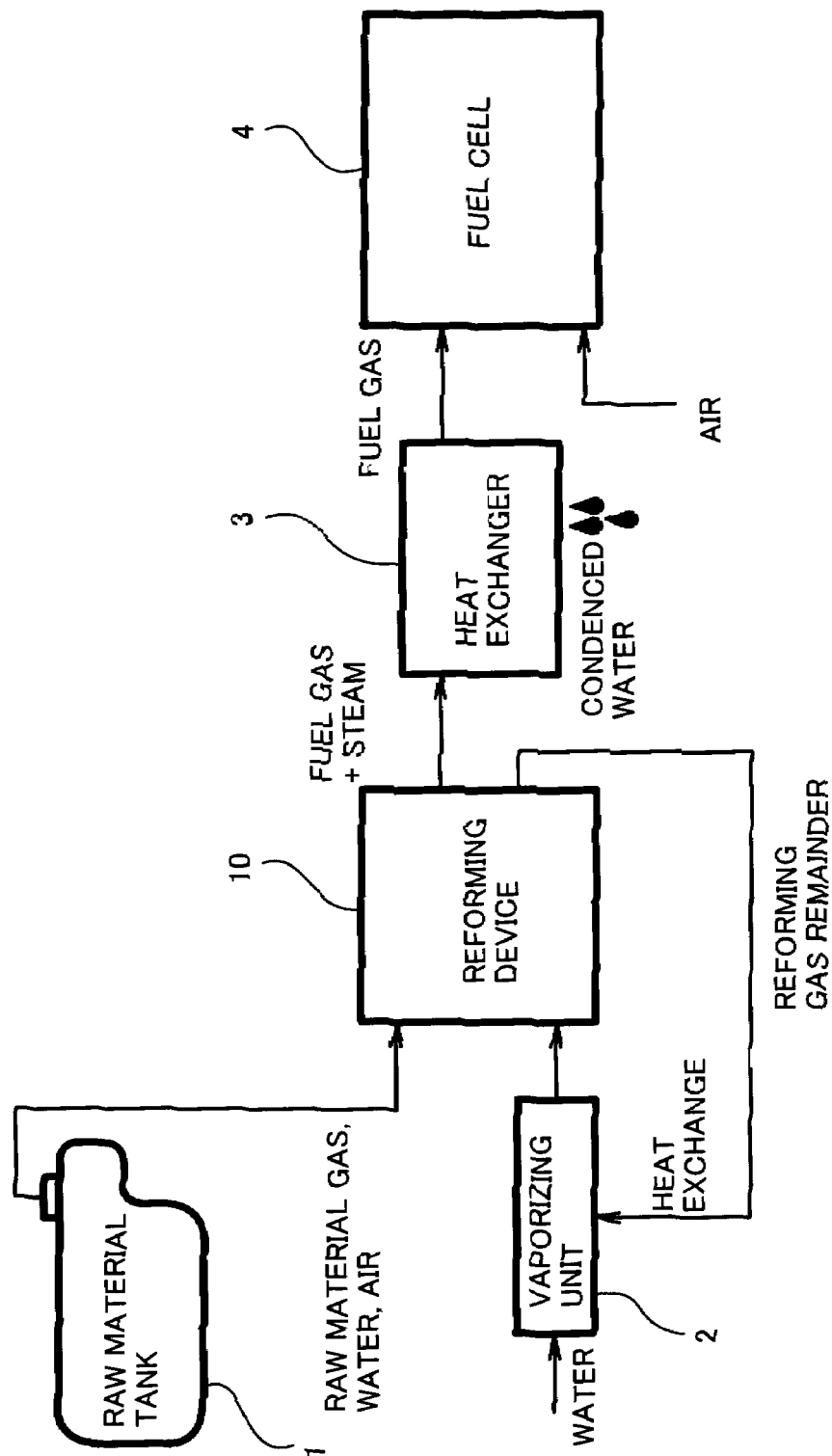
FIG. 1 is an explanatory diagram that shows the schematic structure of a fuel cell system as a working example.

FIG. 1 is an explanatory diagram that shows the schematic structure of a fuel cell system as a working example. The fuel cell system is constructed with the main elements of fuel cell 4 that obtains electromotive force by an electrochemical reaction using hydrogen and oxygen, and a fuel gas generating device 10 that generates from raw material gas the fuel gas that is supplied to fuel cell 4.

Fuel cell 4 is a solid polymer film type fuel cell, and is composed from multiple layers of cells comprising an electrolytic film, a cathode, an anode, and a separator. The electrolytic film is a proton conductive ion exchange film formed from a solid polymer material such as a fluorocarbon resin. The cathode and anode are both formed using carbon cloth woven from carbon fibers. The separator is formed by conductive material that is gas impermeable such as dense carbon for which the carbon is compressed and that is gas impermeable. A flow path for fuel gas and oxidation gas is formed between the cathode and anode. Compressed air is used for the oxidation gas, and fuel gas is generated from raw materials stored in fuel tank 1 using the device structure shown below.

With this working example, natural gas was used as the raw material. Raw material gas is supplied together with water and air to fuel gas generating device 10. Fuel gas generating device 10 first decomposes natural gas using the following reactions and generates a mixed gas that contains carbon monoxide, carbon dioxide, and hydrogen.

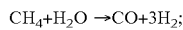

$CH_4 + H_2O \rightarrow CO + 3H_2;$

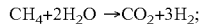

$CH_4 + 2H_2O \rightarrow CO_2 + 3H_2;$

By having a mixed gas generated in this way pass through a hydrogen separation composite provided inside fuel gas generating device 10, the hydrogen that is the fuel gas is separated. At this time, with this working example, steam obtained by vaporizing the water at vaporizing unit 2 is used as a purge gas that has the role of extracting only hydrogen in a stable manner and then carrying it. Note that the heat source for obtaining steam at vaporizing unit 2 is obtained by burning the hydrogen and carbon monoxide contained in the rest of the mixed gas.

Through the concerned process, a gas containing steam as a purge gas and hydrogen as a combustion gas is exhausted from fuel gas generating device 10. It is acceptable to supply this gas directly to fuel cell 4, but with this working example, the gas temperature is lowered using heat exchanger 3, steam is removed as condensed water, and after lowering the humidity, is supplied to fuel cell 4. This is because solid polymer film type fuel cell 4 has a relatively low temperature while operating, so when gas containing a large volume of steam is supplied, steam condenses at the anode part of fuel cell 4, and there is the risk of stable operation being hindered. By reducing the humidity, it is possible to suppress the concerned condensation, and to have stable operation of fuel cell 4. Note that though we have omitted an illustration, operation of each of these structural elements is controlled by a control device which has a CPU.

Figure 2:
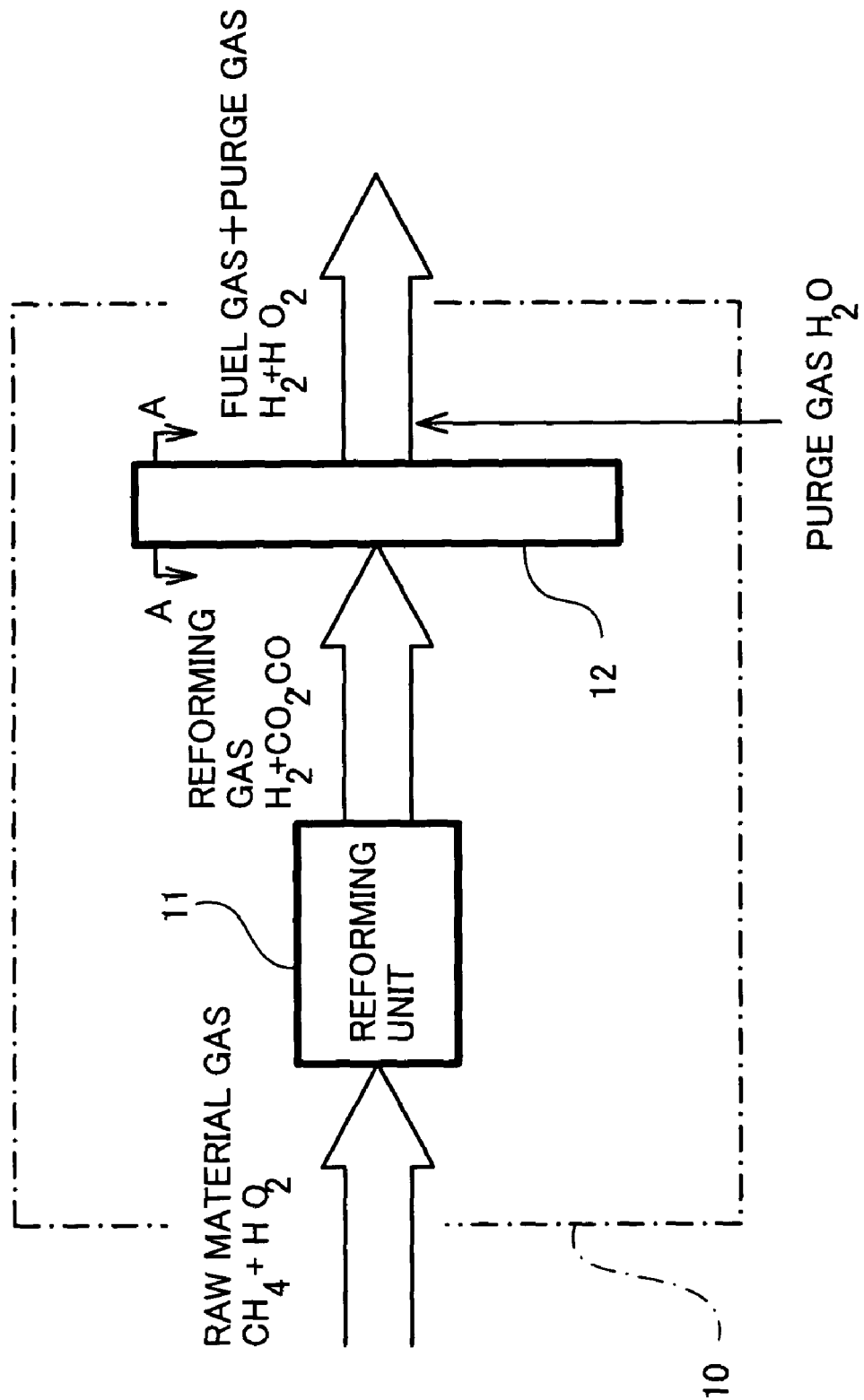
FIG. 2 is an explanatory diagram that shows the internal structure of fuel gas generating device 10.

FIG. 2 is an explanatory diagram that shows the internal structure of fuel gas generating device 10. This is shown based on the situation of the reaction from the raw material gas. The fuel gas generating device is equipped with a chemical reaction unit 11 and hydrogen separation composite 12. A catalyst that promotes a reforming reaction is supported at chemical reaction unit 11 according to the raw material gas. When using natural gas as the raw material gas, it is possible to use rhodium noble metal as the catalyst, and when using methanol as the raw material, it is known that CuO—ZnO catalysts and Cu—ZnO catalysts, etc. are effective.

When methane that is the raw material gas and steam are supplied to chemical reaction unit 11, the previously explained reforming reaction occurs, and a mixed gas that contains hydrogen, carbon dioxide, and carbon monoxide is generated. When a mixed gas generated in this way is supplied to hydrogen separation composite 12, only the hydrogen in the mixed gas is selectively transmitted. At this time, on the side where the hydrogen is extracted, steam is supplied as a purge gas. In this way, the hydrogen as a fuel gas is exhausted together with the purge gas from fuel gas generating device 10.

B. Structure and Manufacturing Method of Composite for Hydrogen Separation

Figure 3:
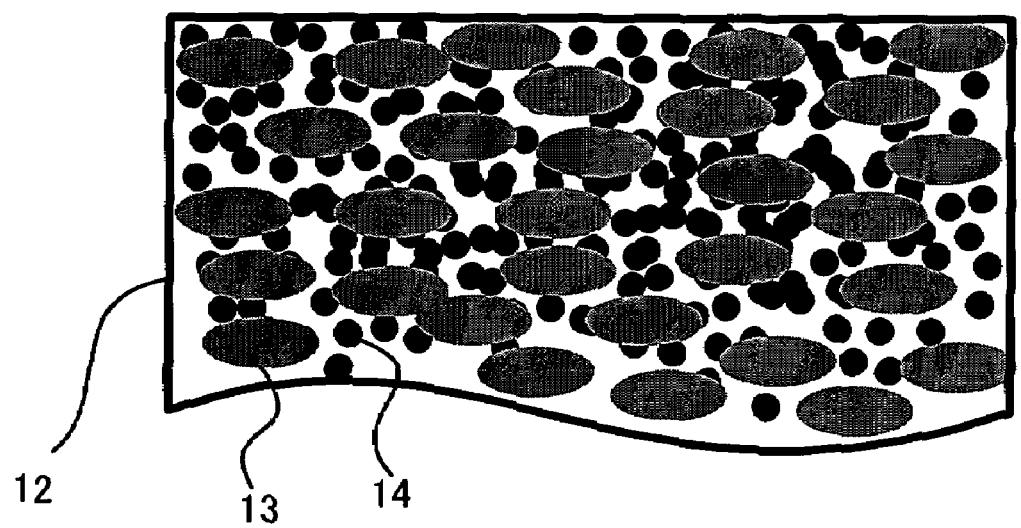
FIG. 3 is a cross section diagram of hydrogen separation composite 12 as a working example.

Next, we will give a detailed explanation of hydrogen separation composite 12 which is provided in fuel gas generating device 10. FIG. 3 is a cross section diagram of hydrogen separation composite 12 as a working example. This correlates to the A-A cross section in FIG. 2. Hydrogen separation composite 12 of this working example is a porous support medium of thickness 0.1 mm to 5 mm in which a hydrogen separation metal is supported. As shown in the figure, inside hydrogen separation composite 12, the ceramic fine particles 13 that form the porous support medium have gaps of approximately several hundred Å, forming pores. Palladium fine particles 14 which are the hydrogen separation metal are supported inside these pores. For illustration purposes, palladium fine particles 14 are shown as being scattered, but in actuality, they are supported at a density of a level for which they fill the inside of the pores of the porous support medium. However, all pores are not necessarily filled. When the mixed gas supplied from one side passes through the gaps of ceramic fine particles 13, it is sufficient to have palladium fine particles 14 supported to a degree for which the gas can pass through some of the pores filled by palladium fine particles 14 as necessary. Some items common to the various embodiments explained hereafter are that the various substances having the property of selectively transmitting hydrogen can be used for the supported metal, and it is possible to use a palladium and silver alloy or a lanthanum and nickel alloy, etc. It is also possible to use alumina, silicon nitride, or silica, etc. for the ceramic fine particles.

Figure 4:
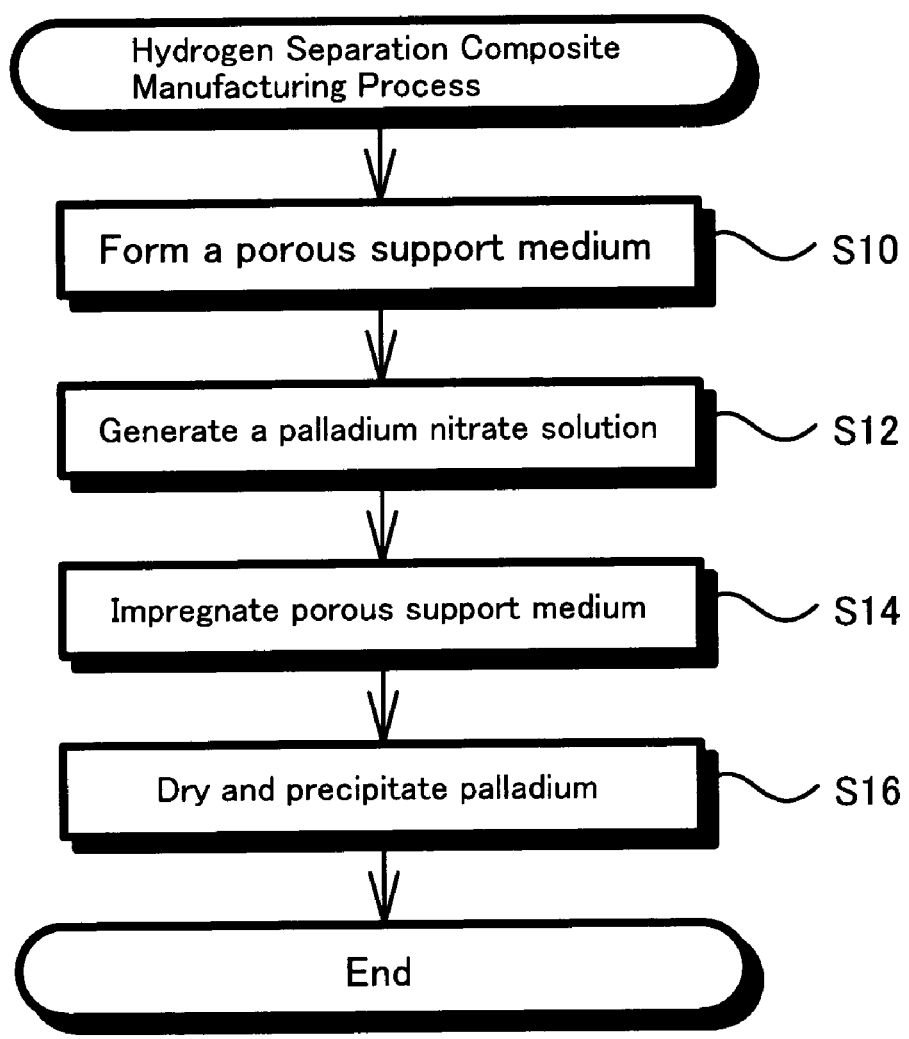
FIG. 4 is a process diagram that shows the manufacturing process for manufacturing method A of hydrogen separation composite 12.

Hydrogen separation composite 12 of this working example can be manufactured by one of the following three manufacturing methods. FIG. 4 is a process diagram that shows the manufacturing process for manufacturing method A of the hydrogen separation composite 12. Manufacturing method A is a manufacturing method called a so-called impregnation support method. As shown in the figure, with this manufacturing process, first, a porous support medium used for the hydrogen separation composite is formed (step S10). With this working example, ceramic fine particles are mixed with an organic solvent, and the molded item is baked and formed. Next, a palladium nitrate solution for impregnating the formed porous support medium is generated (step S12). With this working example, because palladium is used as the hydrogen separation metal, a palladium nitrate aqueous solution is used, but the type of solution can be suitably selected according to the type of hydrogen separation metal that is supported. Also, for the concentration, enough palladium to be sufficiently supported in the pores must be included, and this is adjusted according to things such as the volume, porosity, and pore diameter of the porous support medium to be impregnated.

When an aqueous solution generated in this way is impregnated in the porous support medium (step S14), and then the porous support medium is dried, the palladium that was dissolved in the solution is precipitated, and is supported within the pores (step S16). It is also possible to perform a degassing process together in order to impregnate sufficient aqueous solution in the pores.

Figure 5:
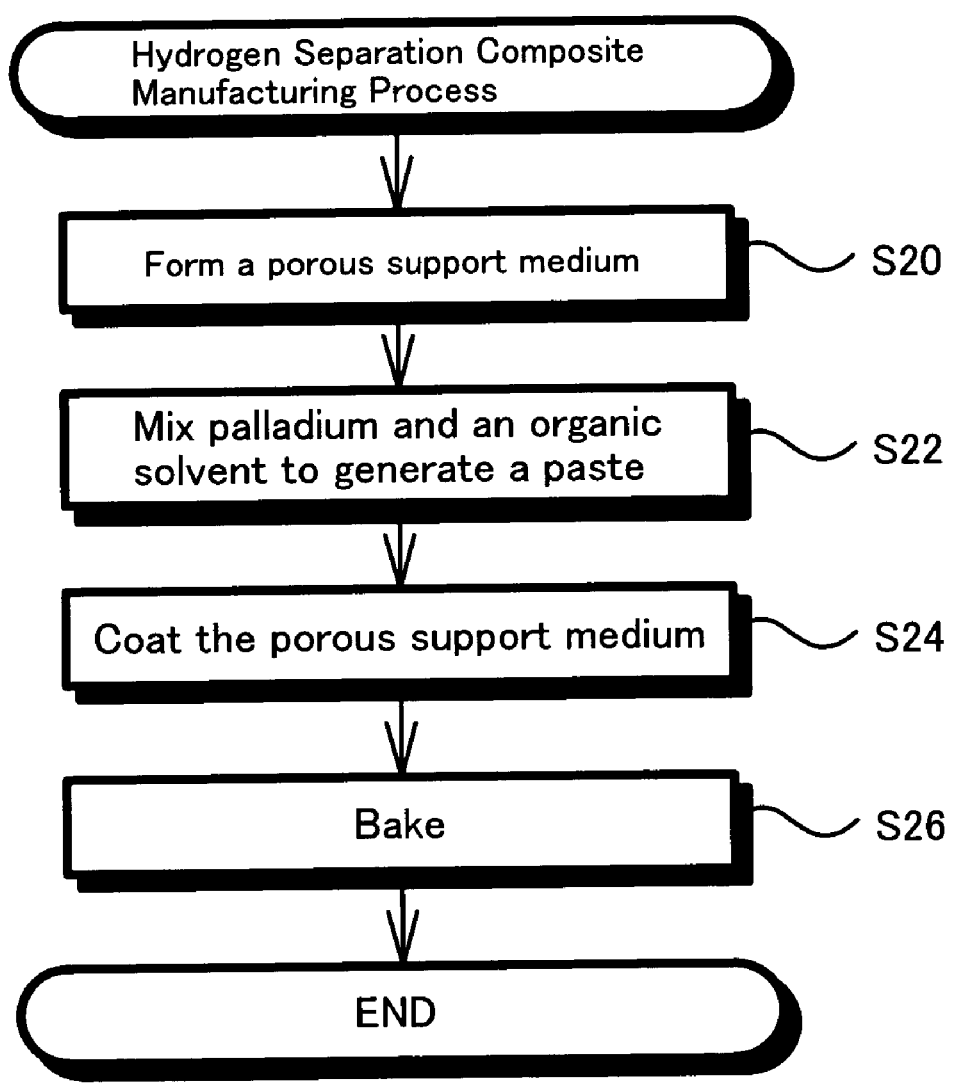
FIG. 5 is a process diagram that shows the manufacturing process for manufacturing method B of hydrogen separation composite 12.

FIG. 5 is a process diagram that shows the manufacturing process of manufacturing method B of hydrogen separation composite 12. First, a porous support medium is formed using the same method as manufacturing method A (step S20). Next, palladium and an organic solvent are mixed to make a paste (step S22). The palladium is made to a fine level in advance to a level that will allow it to be supported in the pores of the porous support medium. There are no particular restrictions on the organic solvent, and a variety of resins can be used, but when mixed with palladium, it is preferable to select a material which has a viscosity that will allow a sufficient level of penetration into the pores of the porous support medium. When an organic solvent generated in this way is coated on the surface of the porous support medium (step S24), an organic solvent layer is formed on the surface, and organic solvent also fills the inside of the pores. In this case as well, to more reliably fill with the organic solvent, it is preferable to blow gas from the surface coated with organic solvent and to perform degassing from the opposite side to the coated one. After sufficiently filling organic solvent into the interior of the pores in this way, when the porous support medium is baked (step S26), the organic solvent is burned off, so a porous support medium for which palladium is supported inside the pores is formed.

Figure 6:
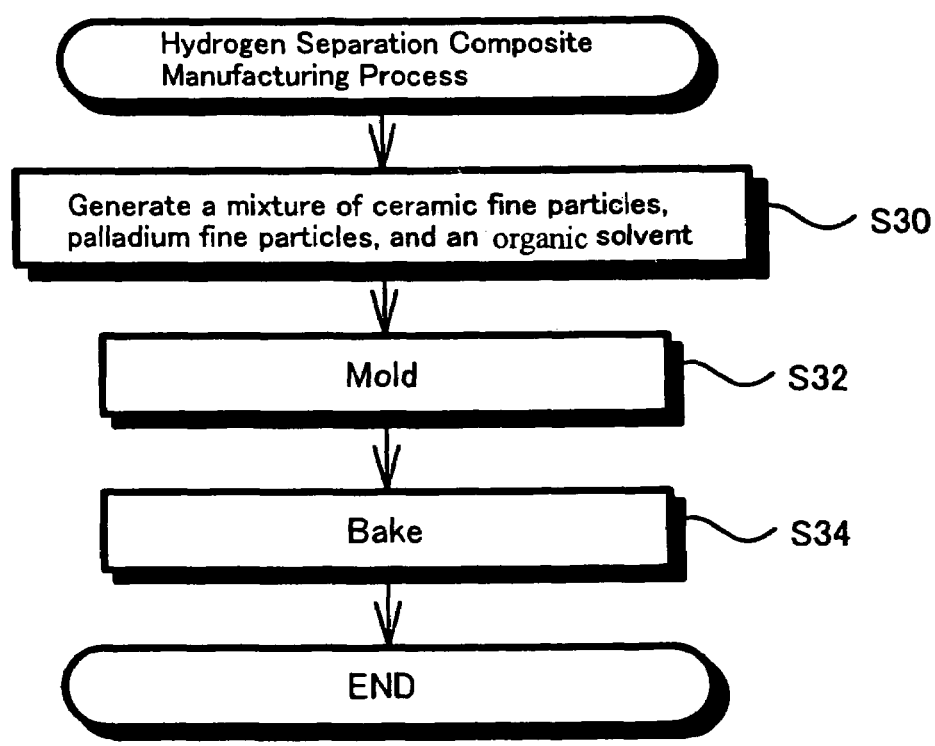
FIG. 6 is a process diagram that shows the manufacturing process for manufacturing method C of hydrogen separation composite 12.

FIG. 6 is a process diagram that shows the manufacturing process for manufacturing method C of hydrogen separation composite 12. With manufacturing method A and manufacturing method B, we showed examples whereby after first forming a porous support medium, a hydrogen separation metal was supported. Manufacturing method C is a method with which both are manufactured at once. With this manufacturing method, first, a mixed substance of ceramic fine particles, palladium fine particles, and an organic solvent is generated (step S30). There is no particular restriction on the organic solvent, and any item having a viscosity of a level which will make later formation easy can be selected. A polymer can be used, for example.

Next, this mixture is molded (step S32) and baked (step S34). The organic solvent is burned off, and a porous support medium in which palladium fine particles are supported in the ceramic pores is formed. Manufacturing method C allows completion of the formation of the porous support medium and support of the palladium with the same manufacturing process, so it has the advantage that it is possible to reduce manufacturing cost of the porous support medium. Note that with manufacturing method C, before generating the mixture at step 30, it is also possible to provide a process of supporting the palladium fine particles in the ceramic fine particles. For example, it is possible to dip the ceramic fine particles in a palladium solution and dry this to support the particles.

With hydrogen separation composite 12 of this working example, by supporting palladium inside the pores, it is possible to increase the transmission speed of transmitting only hydrogen of the mixed gas. It is known that generally, the hydrogen transmission speed is proportional to the surface area for which the palladium contacts the mixed gas, and is inversely proportional to the film thickness, and with this working example, because it is possible to greatly increase the contact area for the mixed gas and palladium by supporting palladium inside the pores, it is possible to greatly increase the hydrogen transmission speed. Also, hydrogen separation composite 12 of this working example has the advantage of pin holes not occurring easily because palladium is supported inside the pores, so the film can be made thinner for hydrogen separation composite 12. With the concerned effect, if a fuel gas generating device is constructed using hydrogen separation composite 12 of this working example, it is possible to make the device more compact.

C. Structure of the Flow Path of a Fuel Gas Generating Device

Figure 7:
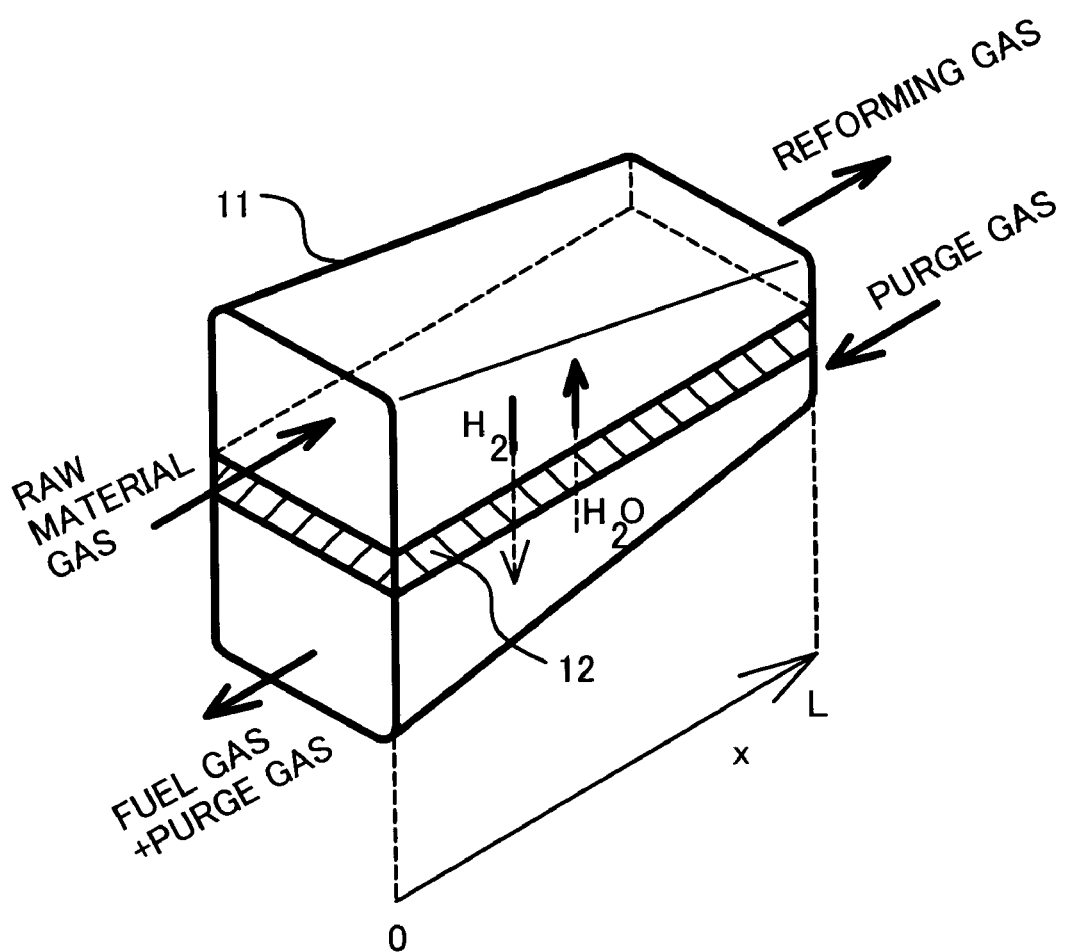
FIG. 7 is an explanatory diagram that shows the structure of the flow path of fuel gas generating device 10.

FIG. 7 is an explanatory diagram that shows the structure of the flow path of fuel gas generating device 10. In FIG. 2, we showed the structure of fuel gas generating device 10 with the gas reaction as the center as a typical example, but in reality, chemical reaction unit 11 is provided to contact hydrogen separation composite 12. As shown in the figure, when raw material gas is flowed in from one inlet, and a reforming reaction occurs inside chemical reaction unit 11 to generate hydrogen, that hydrogen is exhausted on the purge side through hydrogen separation composite 12.

Here, with fuel gas generating device 10 of this working example, a flow path is formed so that purge gas flows in the direction facing opposite the direction that the raw material gas flows. We will explain the reason for this. FIG. 8 is an explanatory diagram that shows the hydrogen partial pressure on the chemical reaction unit side and on the purge side. For the horizontal axis, the direction shown in FIG. 7, in other words, the direction in which the raw material gas flows, the x axis is used, and origin point O is shown as the raw material gas inlet part while point L shows the outlet part. FIG. 8 is a figure that shows the hydrogen partial pressure for each position on the x axis. FIG. 8 (a) shows the hydrogen partial pressure when the gas flow is made to face opposite for the chemical reaction unit side and the purge side. FIG. 8 (b) shows the hydrogen partial pressure when both gases flow in the same direction as a comparative example.

At the chemical reaction unit side, the reforming reaction advances as it faces downstream, so the hydrogen percentage increases and the hydrogen partial pressure increases. It is known that generally near the raw material gas inlet the reforming reaction progresses rapidly, after which the hydrogen in the mixed gas is extracted and the chemical balance is destroyed, so in response to this a trend is shown of having the reaction progress gradually. In comparison to this, on the purge side, as it faces downstream, the volume of extracted hydrogen increases, so the hydrogen partial pressure gradually increases.

Therefore, as shown in FIG. 8 (a), when the flow of gas is made to face opposite at the chemical reaction unit side and the purge side, the hydrogen partial pressure is extremely high at the chemical reaction unit side and the purge side at the outlet side of the chemical reaction unit side, in other words, near point L of the x axis. In contrast to this, as shown in FIG. 8 (b), when the flow of both is made in the same direction, the hydrogen partial pressure increases for both the chemical reaction unit and the purge side as it faces toward point L, so the hydrogen partial pressure difference of both stays relatively small. It is known that generally the speed that hydrogen is transmitted by hydrogen separation composite 12 becomes faster as the hydrogen partial pressure difference becomes larger. Therefore, as with fuel gas generating device 10 of this working example, it is possible to increase the hydrogen transmission speed if the gas flow of the chemical reaction unit side and purge side are made to face opposite. This means that it is possible to efficiently separate hydrogen and to efficiently generate hydrogen gas, so if the flow path structure of this working example is used, then it is possible to make fuel gas generating device 10 more compact.

Also, with fuel gas generating device 10 of this working example, the flow path of chemical reaction unit 11 is constructed so that the cross section area becomes narrower as it faces from upstream to downstream. In FIG. 7, we showed an example of a state with a linear change in the cross section area, but it does not necessarily have to be linear. Meanwhile, the flow path of the purge side is constructed so that the cross section area becomes broader as it faces from upstream to downstream. Generally, gas pressure is inversely proportional to the cross section area of the flow path. Therefore, with the fuel gas generating device of this working example, the flow path is constructed so that the chemical reaction unit pressure increases as it goes downstream, and the purge side pressure decreases as it goes downstream. Meanwhile, with the chemical reaction unit, hydrogen is extracted the further it goes downstream, so the pressure decreases by that amount. On the purge side, extracted hydrogen increases as it goes downstream, so the pressure increases by that amount. With this working example, these offset each other, and the flow path is constructed so that the overall pressure is kept approximately constant along the entire area at both the chemical reaction unit side and the purge side. The volume of fuel gas generated at fuel gas generating device 10 is often controlled based on the raw material gas and purge gas pressure, so there is the advantage that control is relatively easy by keeping the overall pressure approximately constant for the entire area of fuel gas generating device 10.

Figure 9:
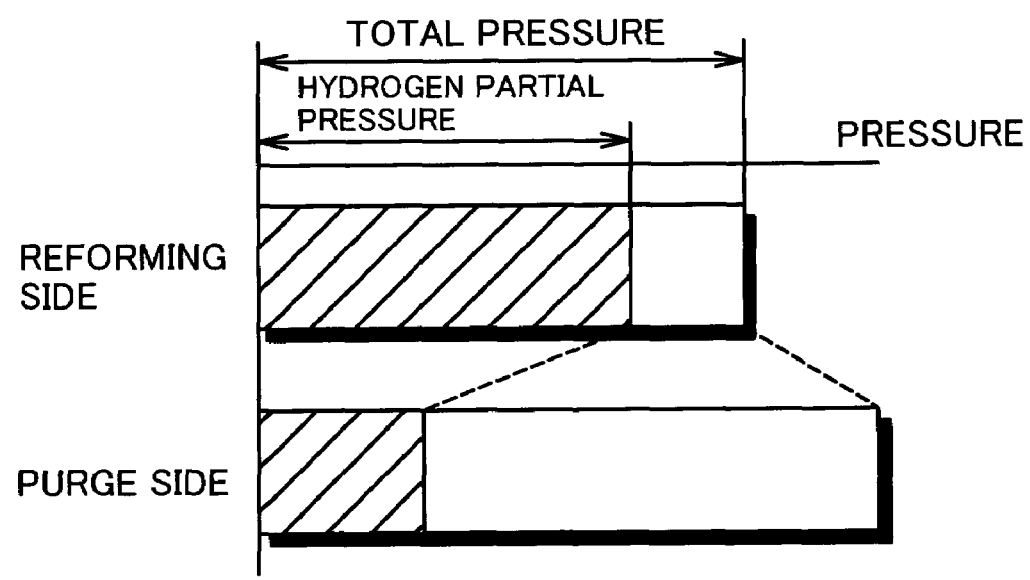
FIG. 9 is an explanatory diagram that shows the conditions relating to pressure on the reforming side and the purge side.

As described above, with fuel gas generating device 10 of this working example, hydrogen is extracted using purge gas. When hydrogen is separated using hydrogen separation composite 12, purge gas is not absolutely necessary, but with this working example, by using purge gas under the conditions shown hereafter, efficient and stable hydrogen extraction is realized. FIG. 9 is an explanatory diagram that shows the conditions relating to the reforming side and purge side pressure. As shown in the figure, with this working example, purge gas is supplied so as to satisfy simultaneously a condition of the overall pressure on the reforming side being lower than the overall pressure of the purge side, as well as the condition of the hydrogen partial pressure on the reforming side being higher than the hydrogen partial pressure on the purge side. The concerned conditions can be met by supplying as purge gas steam in a volume that will supplement the hydrogen partial pressure shown by cross hatching in FIG. 9.

Hydrogen separation composite 21 exhibits an effect of selectively transmitting hydrogen from the side with high hydrogen partial pressure to the side with low pressure, so the condition of having the purge side hydrogen partial pressure be lower than that of the reforming side is an essential condition for separating hydrogen. Meanwhile, the condition of having the total pressure of the purge side be higher than the total pressure of the reforming side exhibits the effect of preventing leaks of mixed gas on the purge side. For example, even when there are pin holes in hydrogen separation composite 12, if the concerned pressure conditions are set, then it is possible to avoid mixed gas leaking to the purge side. Therefore, it is possible to avoid toxification of the electrode of fuel cell 4 by mixing of carbon monoxide in the fuel gas, so that stable operation of fuel cell 4 is possible.

When purge gas is not supplied under the concerned pressure conditions, for cases when carbon monoxide is mixed into the fuel gas, it is necessary to provide a carbon monoxide reduction unit or to make hydrogen separation composite 2 thick to a level that will reliably prevent pin holes. In contrast to this, with this working example, by supplying purge gas under the pressure conditions described above, it is possible to prevent gas leaks even when there are pin holes, so countermeasures such as providing a carbon monoxide reduction unit are not necessary, and it is possible to make fuel gas generating device 10 more compact. Note that in the case of this working example, part of the purge gas supplied at higher pressure than the chemical reaction unit side is transmitted to the chemical reaction unit side due to the pressure difference as shown in FIG. 7, so it is possible to also use this for reforming raw material gas.

With hydrogen separation composite 12 of this working example and fuel gas generating device 10 using this as described above, it is possible to make the device more compact while also generating fuel gas efficiently. Note that with this working example, we showed an example of a case using a hydrogen separation composite in which palladium is supported in the porous support medium, but for the flow path structure, gas flow direction, and pressure conditions shown in FIGS. 7 through 9, it is possible to apply this individually regardless of the type of hydrogen separation composite 12, so it is also possible to use the prior art so-called hydrogen separation film formed by palladium only.

D. Variation Example of a Composite for Hydrogen Separation

Figure 10:
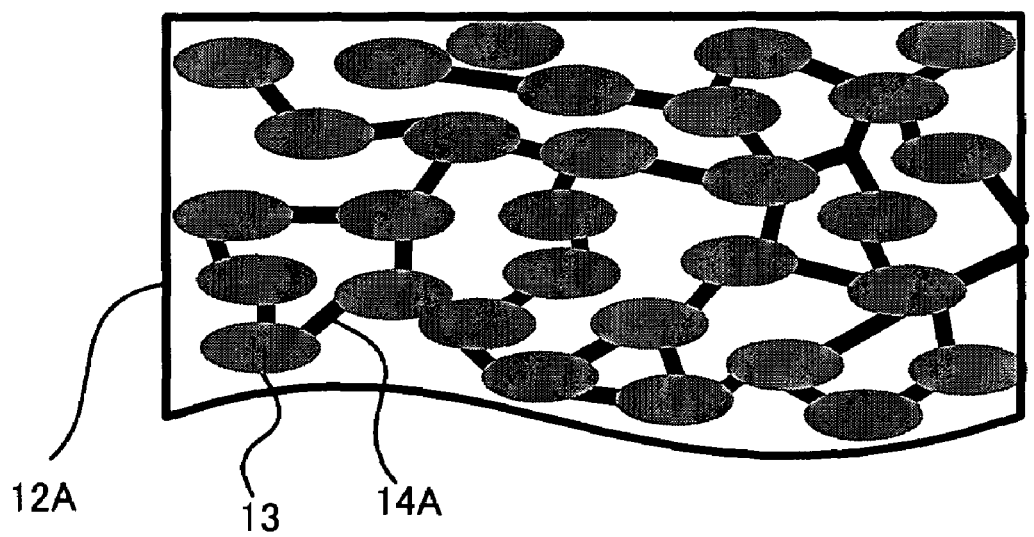
FIG. 10 is a cross section diagram of hydrogen separation composite 12A as a first variation example.

FIG. 10 is a cross section diagram of hydrogen separation composite 12A as a first variation example. The fact that the structure has palladium supported in the porous support medium is the same as the hydrogen separation composite 12 of the working example, but how the support is embodied is different. With this working example, as shown in FIG. 3, palladium is supported in fine particle form inside the pores. In contrast to this, with the hydrogen separation composite 12A of the variation example, palladium 14A is supported in film form within the pores of ceramic fine particles 13.

Figure 11:
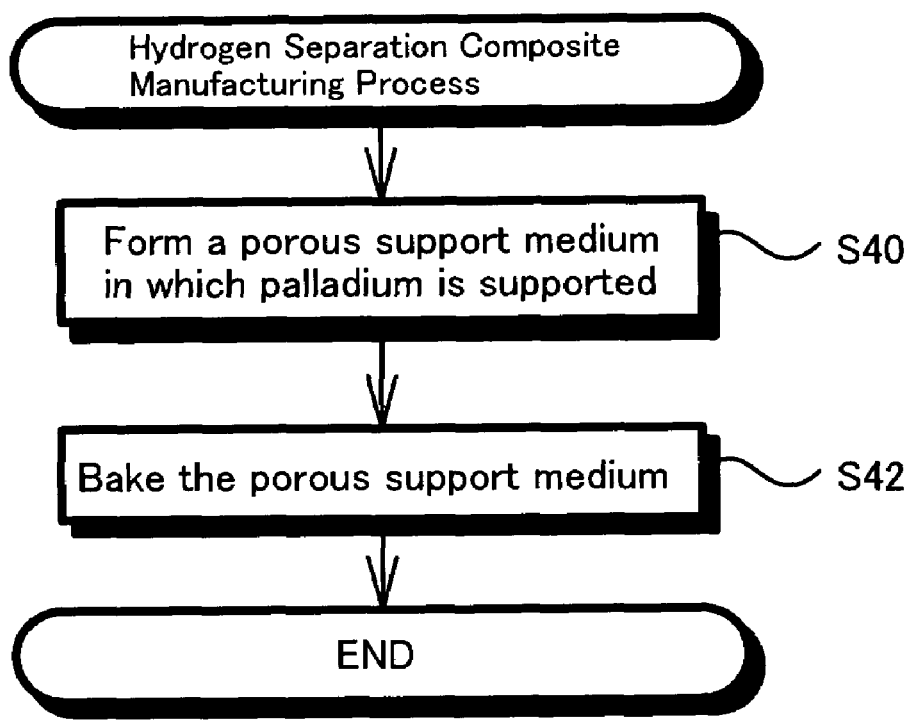
FIG. 11 is a process diagram that shows the manufacturing method of hydrogen separation composite 12A.

FIG. 11 is a process diagram that shows the manufacturing method of hydrogen separation composite 12A. Hydrogen separation composite 12A of the variation example is formed by, after forming a porous support medium in which palladium is supported (step S40), forming the porous support medium by baking (step S42). The porous support medium formed at step S40 can be manufactured by any of manufacturing methods A through C shown in the working example (see FIGS. 4 through 6). When a porous support medium manufactured in this way is baked, the supported palladium fine particles are partially dissolved, and form a film inside the pores. At the beginning, the palladium is supported as extremely fine particles, so when baking, it has been confirmed that a film is formed even when the temperature is not necessarily raised to the melting point.

With hydrogen separation composite 12A of the variation example, though a process for baking the porous support medium is newly required, by supporting palladium in film form within the pores, it is possible to further suppress pin holes and to increase the hydrogen transmission speed.

Figure 12:
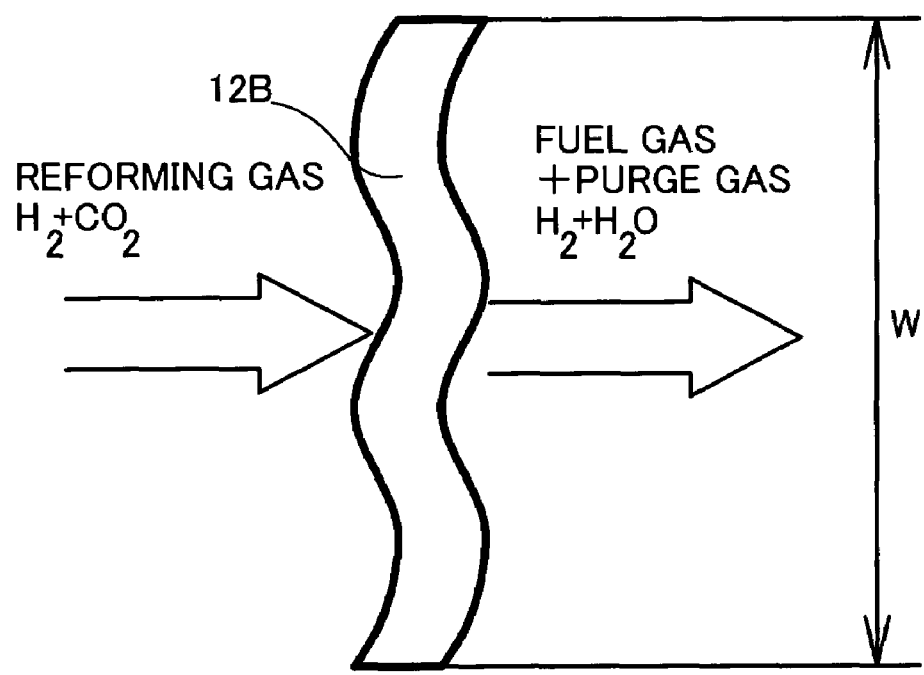
FIG. 12 is a cross section diagram of hydrogen separation composite 12B as a second variation example.

FIG. 12 is a cross section diagram of hydrogen separation composite 12B as a second variation example. With the working example, we showed an example of a hydrogen separation composite formed on a flat plate. In contrast to this, the difference with hydrogen separation composite 12B is that it is molded in a shape having bumps in the thickness direction. The concerned hydrogen separation composite 12B can be formed using a porous support medium molded to have bumps in advance using manufacturing method A and manufacturing method B shown with the working example (see FIGS. 4 and 5). It is also possible to bake a mixed substance of ceramic fine particles, palladium fine particles, and an organic solvent after molding in a shape that has bumps using manufacturing method C shown with the working example (see FIG. 6).

With the second variation example, by using a bumpy shape, it is possible to increase the area of contact per width W between hydrogen separation composite 12B and the mixed gas. The speed at which the hydrogen separation composite transmits hydrogen is known to be proportional to the contact area with mixed gas, so with the second variation example, it is possible to increase the transmission efficiency per unit width. Therefore, with this hydrogen separation composite 12B, it is possible to make fuel gas generating device 10 more compact. Note that the bumps are not limited to being the wave shapes shown in FIG. 12.

Figure 13:
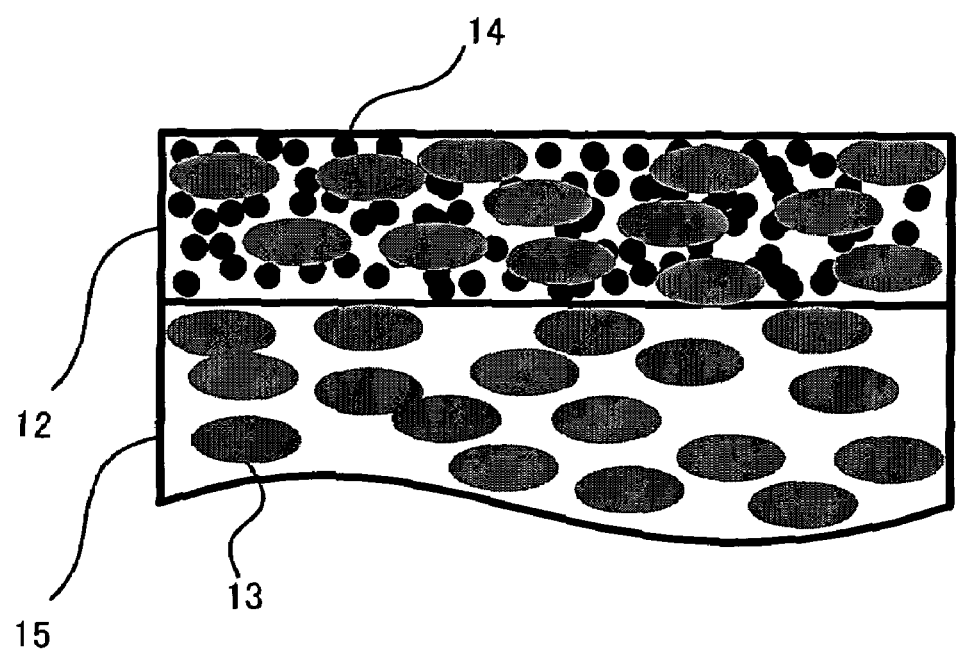
FIG. 13 is a cross section diagram of a hydrogen separation composite as a third variation example.

FIG. 13 is a cross section diagram of a hydrogen separation composite as a third variation example. With the third variation example, porous support medium 17 is joined to one side of the hydrogen separation composite 12 of the working example. Porous support medium 17 uses ceramics of the same composition as the porous support medium that forms hydrogen separation composite 12, and ceramic fine particles 13 form pores the same as hydrogen separation composite 12. For porous support medium 17, it is possible to use a different material than hydrogen separation composite 12, but if the same material is used, there is the advantage of being able to reduce manufacturing processes.

As described previously, the porosity of hydrogen separation composite 12 of the working example is high, so there are cases when the mechanical strength is insufficient. With the third variation example, by joining porous support medium 17, it is possible to increase the mechanical strength. For porous support medium 17, it is necessary to provided a thickness that can ensure the mechanical strength needed for the hydrogen separation composite.

The joining of hydrogen separation composite 12 and porous support medium 17 must be done in a way that will allow exchange of gas between these items. For example, ceramic fine particles and an organic solvent can be mixed to make a paste that is coated on both items, and this is baked. It is also possible to mold porous support medium 17 before baking onto hydrogen separation composite 12, and then to bake the whole thing. Here, we showed an example of joining hydrogen separation composite 12 of the working example with porous support medium 17, but it is also possible to use the hydrogen separation composite of the first and second variation examples. It is also possible to join the porous support medium to both sides of the hydrogen separation composite.

E. Variation Example of a Gas Flow Path

Figure 14:
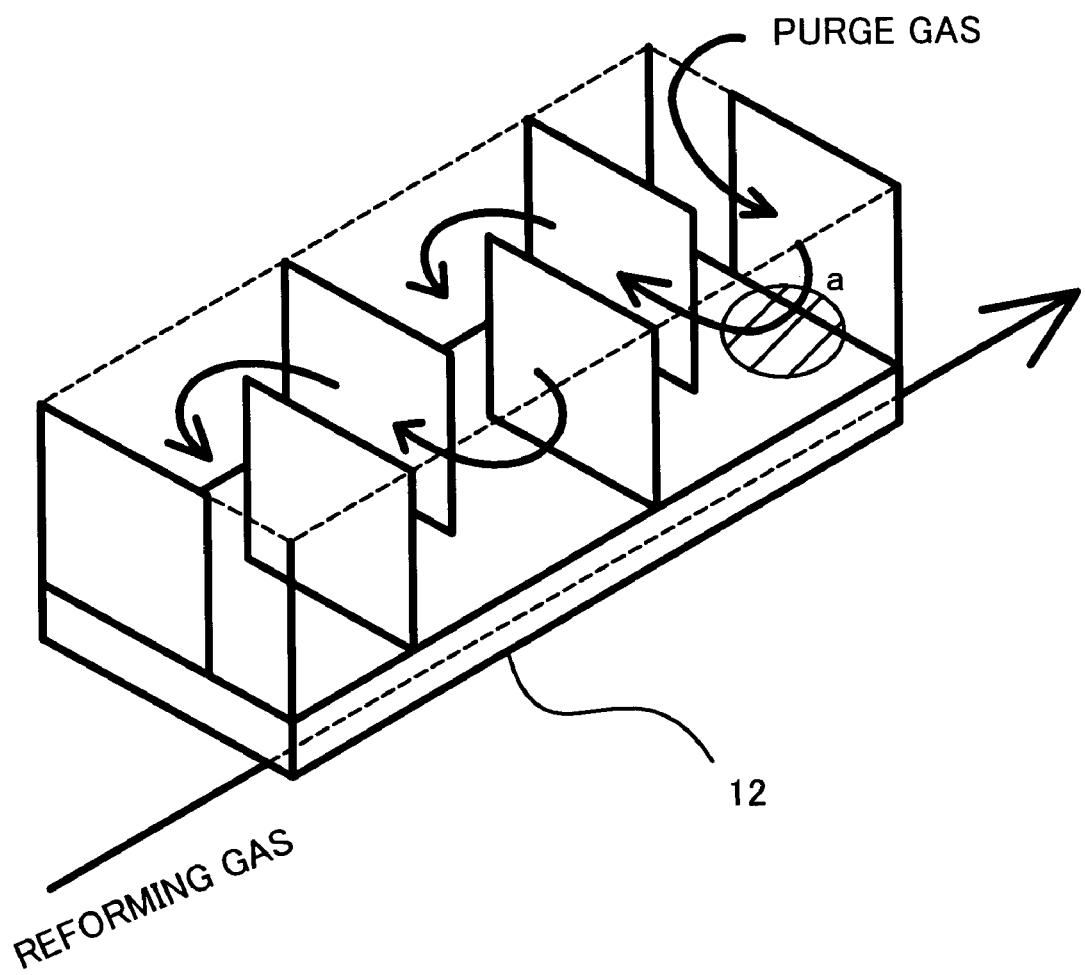
FIG. 14 is an explanatory diagram that shows the flow path of the purge gas as a first variation example.

FIG. 14 is an explanatory diagram that shows the flow path of purge gas as a first variation example. Differing from FIG. 7, this shows the purge gas in a state of flowing over the top surface of hydrogen separation composite 12. With the first variation example, the purge gas flows in switch-back fashion along hydrogen separation composite 12. In areas such as area a shown by cross hatching in the figure, the flow of the purge gas and the flow of the mixed gas partially face opposite each other. It is not necessary to flow the purge gas and mixed gas so that they face opposite each other along the entire area of hydrogen separation composite 12, and it is acceptable to have them flow partially facing each other in this way.

Figure 15:
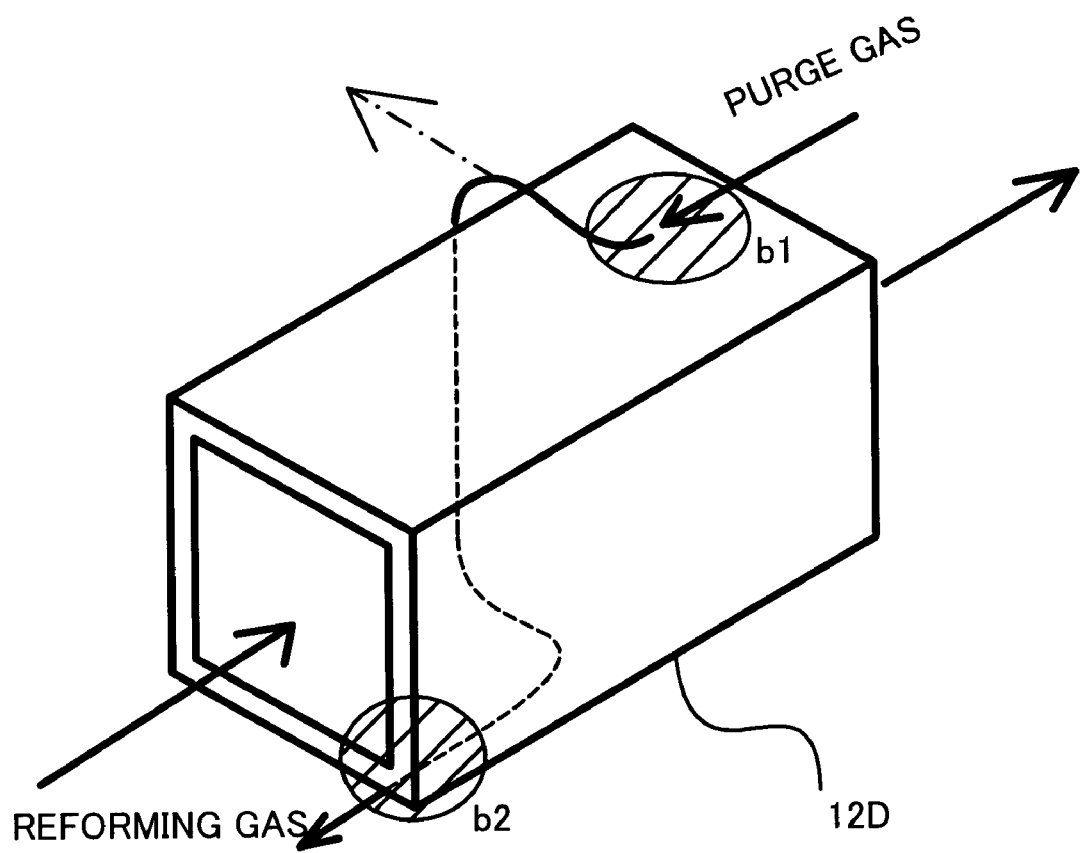
FIG. 15 is an explanatory diagram that shows the flow path of the purge gas as a second variation example.

FIG. 15 is an explanatory diagram that shows the flow path of the purge gas as a second variation example. With the second variation example, hydrogen separation composite 12D is formed in a tube shape, and mixed gas passes through its interior. Purge gas is passed through so as to enclose the periphery of hydrogen separation composite 12D. In areas b1 and b2 in the figure, purge gas and mixed gas flow in directions opposite each other. It is also possible to construct one flow path in this way three dimensionally. It is also possible to pass the purge gas through in spiral form. Also, as shown by the dot-dash line in FIG. 15, it is possible to have the purge gas flow out in a direction orthogonal to the flow of the mixed gas.

With all the variation examples described above, as with the working example, it is possible to ensure a large hydrogen partial pressure difference. To ensure a hydrogen partial pressure difference, it is possible to use various flow path structures with the mixed gas and purge gas facing opposite each other, particularly near the outlet of the mixed gas.

F. Variation Example of a Fuel Cell System

Figure 16:
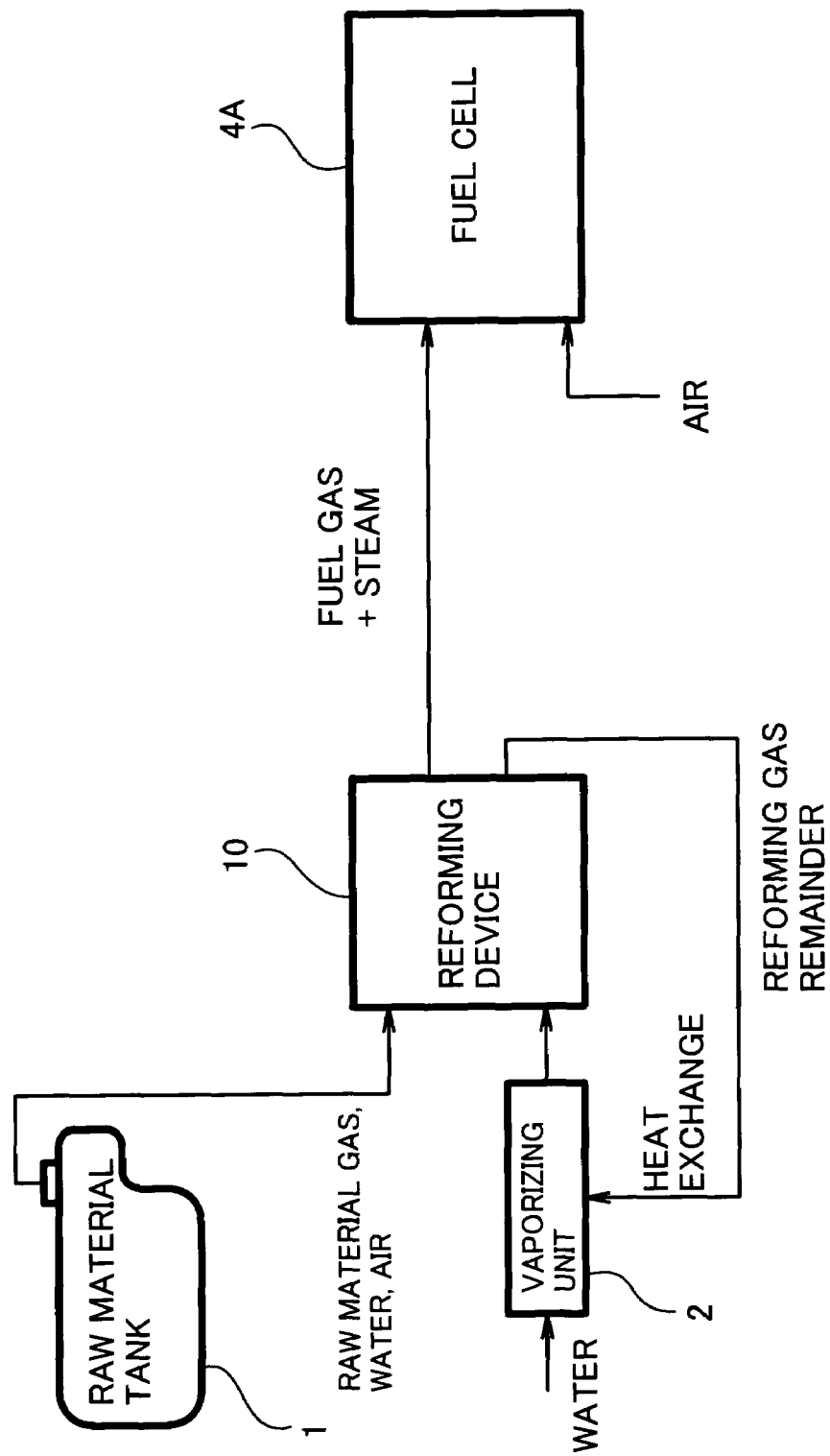
FIG. 16 is an explanatory diagram that shows the fuel cell system as a variation example.

FIG. 16 is an explanatory diagram that shows a fuel cell system as a variation example. For the fuel cell system of the working example (see FIG. 1), we showed an example that uses a solid polymer film type as fuel cell 4, and to prevent condensation at the anode part, the structure provided a heat exchanger 3. In contrast to this, with the fuel cell system of the variation example, a high temperature type fuel cell for which the operating temperature reaches 150° C. or greater was used as fuel cell 4A. This is applicable to fuel cells such as a phosphoric acid type or fused carbonate type fuel cell.

When using this kind of high temperature type fuel cell, the possibility of water drop condensation occurring at the anode part is low. Therefore, as shown in the variation example, the heat exchanger is omitted, and the mixed gas of fuel gas obtained using fuel gas generating device 10 and steam can be directly supplied to fuel cell 4A. By using a fuel cell system of the variation example in this way, by using a high temperature type fuel cell, there is the advantage of being able to simplify the system structure.

G. Second Working Example

Figure 17:
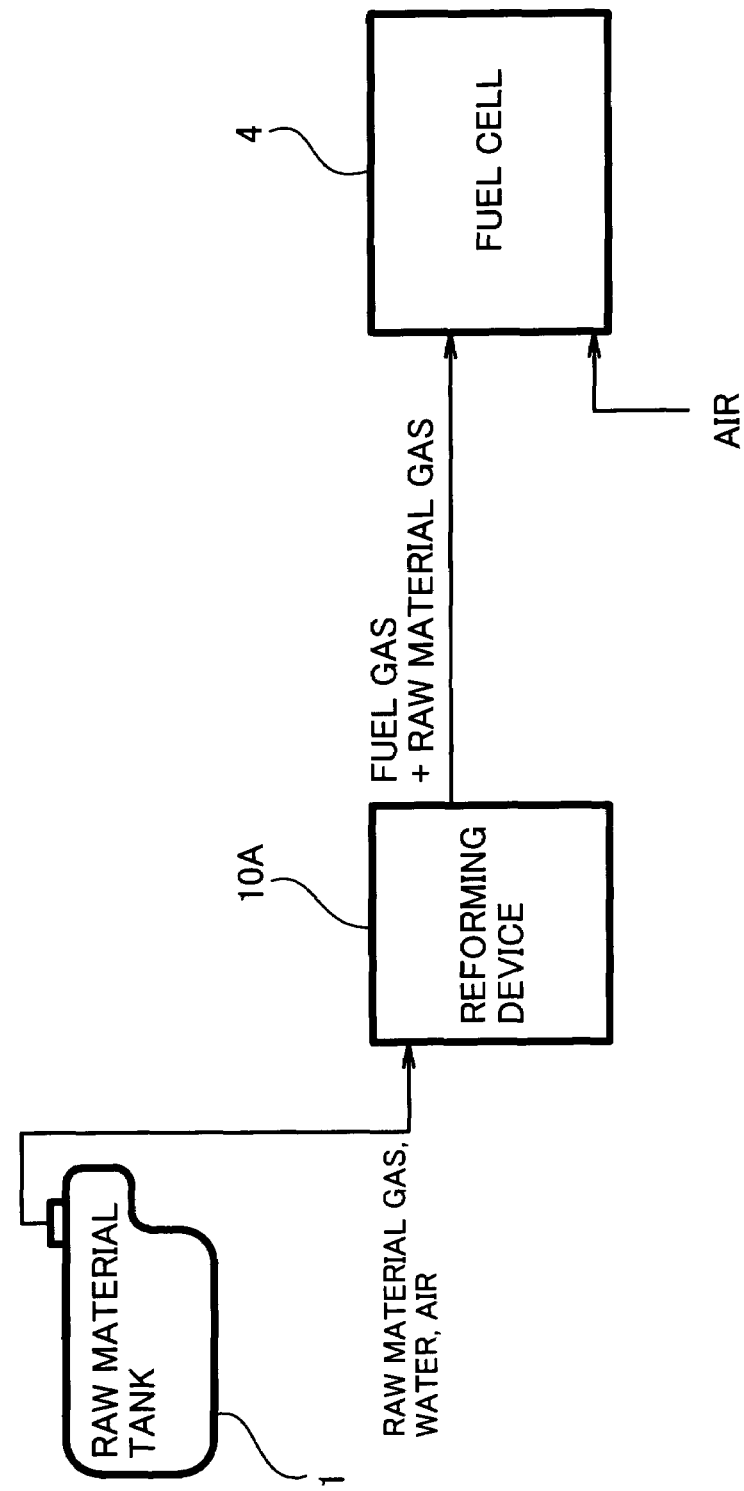
FIG. 17 is an explanatory diagram that shows the schematic structure of a fuel cell system as a second working example.

FIG. 17 is an explanatory diagram that shows the schematic structure of a fuel cell system as a second working example. With the first working example, we showed an example of using steam as the purge gas for fuel gas generating device 10. With the second working example, a raw material gas is used as the purge gas. Along with this, elements provided with the first working example such as vaporizer 2 for generating steam and heat exchanger 3 for condensing steam of the supplied gas to fuel cell 4 become unnecessary (see FIG. 1), so the overall system structure can be simplified.

With the second working example, the structure of fuel gas generating device 10A is also different from the first working example. With the first working example, we showed an example where mixed gas was generated using chemical reaction unit 11, and only the hydrogen in this was extracted using hydrogen separation composite 12. Specifically, with the first working example, we showed an example where fuel gas generating device 10 was mainly composed from two structural elements. In contrast to this, with the second working example, we will show an example of a case where both the work of the reforming reaction and hydrogen separation are performed inside the hydrogen separation composite. Note that a structure that uses raw material gas as the purge gas is not unique to fuel gas generating device 10A of the second working example, but can also be applied to the first working example. Conversely, as with the first working example, it is also possible to use steam as the purge gas for the second working example as well.

Figure 18:
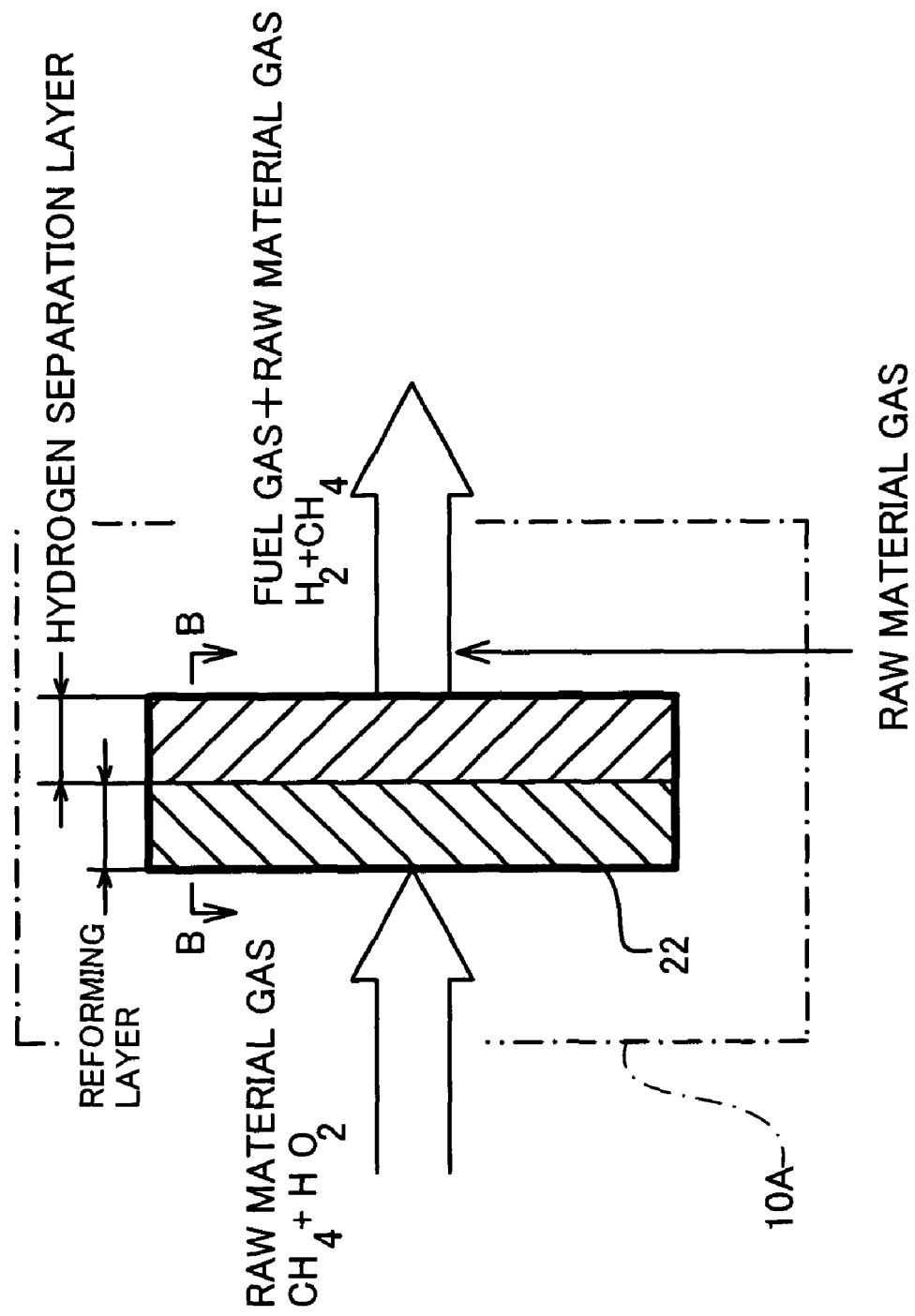
FIG. 18 is an explanatory diagram that shows the schematic structure of fuel gas generating device 10A.

FIG. 18 is an explanatory diagram that shows the schematic structure of fuel gas generating device 10A. Fuel gas generating device 10A is formed using hydrogen separation composite 22 that is a single structural element. As shown in the figure, hydrogen separation composite 22 of the second working example is constructed in a form where two layers, the reforming layer and the hydrogen separation layer, are joined internally. When raw material gas and steam are supplied to this hydrogen separation composite 22, a reforming reaction occurs at the reforming layer, and hydrogen, carbon monoxide, and carbon dioxide are generated. Mixed gas generated in this way is supplied as is to the hydrogen separation layer and only hydrogen is extracted. With the second working example, raw material gas is used as the purge gas for extracting hydrogen, so gas that contains fuel gas and raw material gas is exhausted from fuel gas generating device 10A. The fact that fuel gas is generated by performing the two effects of a reforming reaction and hydrogen separation on raw material gas inside hydrogen separation composite 22 formed as a single unit in this way is the characteristic point of fuel gas generating device 10A of the second working example.

Figure 19:
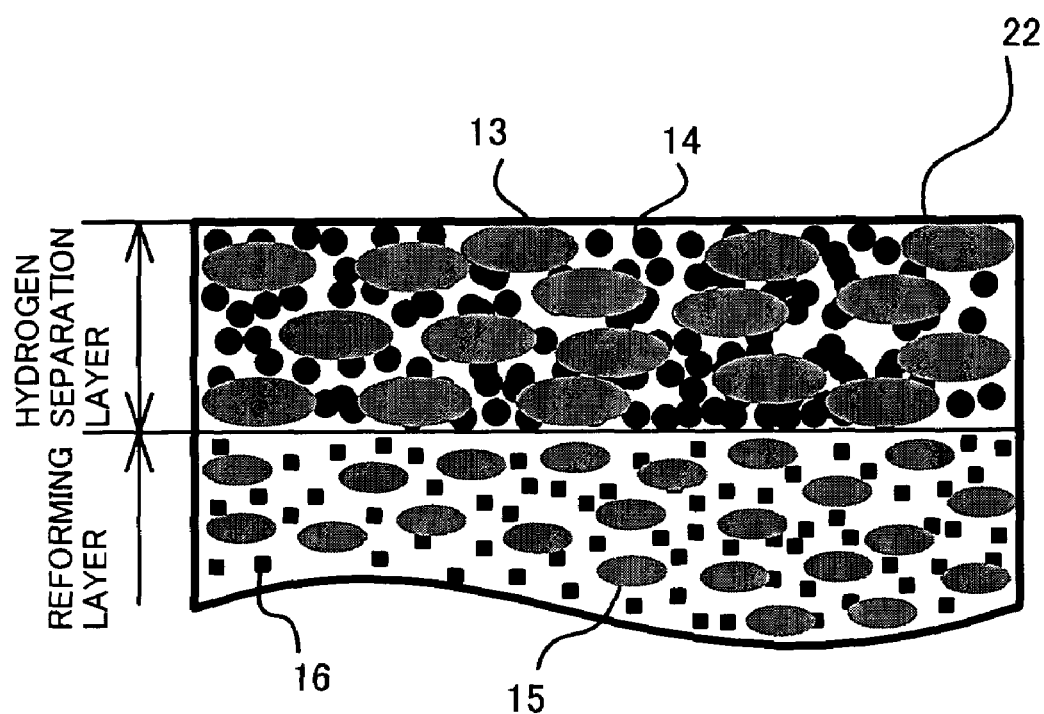
FIG. 19 is a cross section diagram of hydrogen separation composite 22.

FIG. 19 is a cross section diagram of hydrogen separation composite 22. As described above, hydrogen separation composite 22 is constructed from a reforming layer and a hydrogen separation layer. The hydrogen separation layer has the same structure as the hydrogen separation composite of the first working example, with palladium fine particles 14 that are the hydrogen separation metal supported in the pores of a porous support medium constructed using ceramic fine particles 13. For illustration purposes, palladium fine particles 14 are shown with gaps open, but in reality, as with the first working example, it is supported at a density of a level that will fill the pores of the porous support medium.

For the reforming layer, rhodium fine particle 16 that are the catalyst are supported in the pores of a porous support medium constructed in the same way using ceramic fine particles 15. The reforming layer is constructed with the size of the ceramic fine particles 15 smaller than those of the hydrogen separation layer, and with the diameter of the pores and the porosity greater than those of the hydrogen separation layer. Also, rhodium fine particles 16 are not supported at a high density that would completely fill the pores, but instead are supported in a less dense state than the hydrogen separation layer. In this way, it is possible to sufficiently diffuse raw material gas inside the reforming layer by adjusting the pore diameter, porosity, and density of rhodium fine particles 16 at the reforming layer. By constructing so as to increase the dispersibility of rhodium fine particles 16 and sufficiently diffuse the raw material gas in this way, it is possible to increase the opportunity for contact between the raw material gas and rhodium fine particles, and thus to promote the reforming reaction. Here, we showed an example of having different pore diameter and porosity for the reforming layer and the hydrogen separation layer, but hydrogen separation composite 22 is not limited to this embodiment, and it is obvious that it is also acceptable to form both layers using a porous support medium of the same structure.

Furthermore, with hydrogen separation composite 22, the composition of the ceramic fine particles for the reforming layer and hydrogen separation layer are also changed. With the hydrogen separation layer, palladium fine particles 14 are reliably supported in a state that fills the pores, so alumina particles that have a property of being very adaptable to palladium fine particles 14 is used as ceramic fine particles 13. Meanwhile, with the reforming layer, ceria particles which have the properties of increasing the catalytic activity of the rhodium fine particles and of promoting the reforming reaction are used as ceramic fine particles 15. By doing this, the reforming effect and hydrogen separation effect of the layers will work more effectively. The information noted here is nothing more than an example, and for each layer, it is also possible to select ceramic fine particles that have the effects described above according to the type of substance that supports the ceramic fine particles. Note that it is also acceptable to construct the reforming layer and hydrogen separation layer using ceramic fine particles of the same composition.

Figure 20:
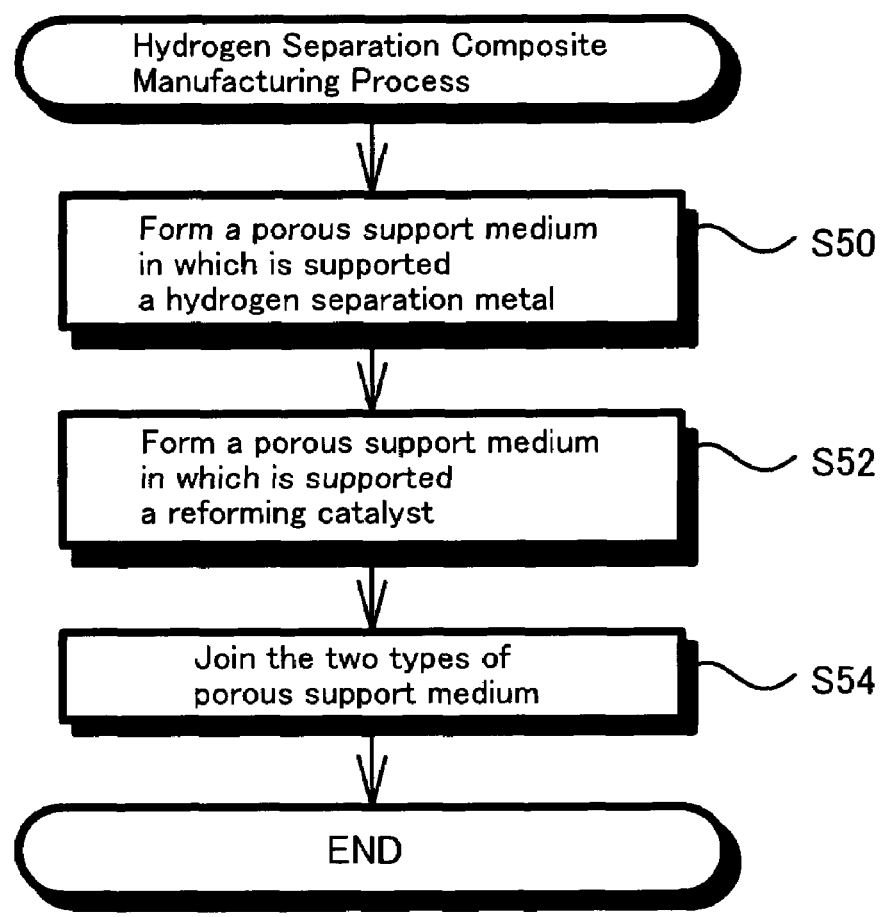
FIG. 20 is a process diagram of manufacturing method D of hydrogen separation composite 22.

Hydrogen separation composite 22 can be manufactured using one of the three manufacturing methods described below. FIG. 20 is a process diagram of manufacturing method D of hydrogen separation composite 22. With this manufacturing method, a porous support medium in which is supported hydrogen separation metal and a porous support medium in which is supported a catalyst are manufactured separately (steps S50 and S52), and these are joined together as a single unit (step S54). For joining, the two types of porous support medium can be put together and baked. For the manufacturing method for the porous support medium in which is supported hydrogen separation metal and the porous support medium in which is supported a catalyst, it is possible to use manufacturing methods A through C described with the first working example (see FIGS. 4 through 6). With the concerned manufacturing methods, the hydrogen separation layer and reforming layer are manufactured separately, so there is the advantage that it is easier to apply a state that is suitable for the effect for the manufacturing of each layer.

Figure 21:
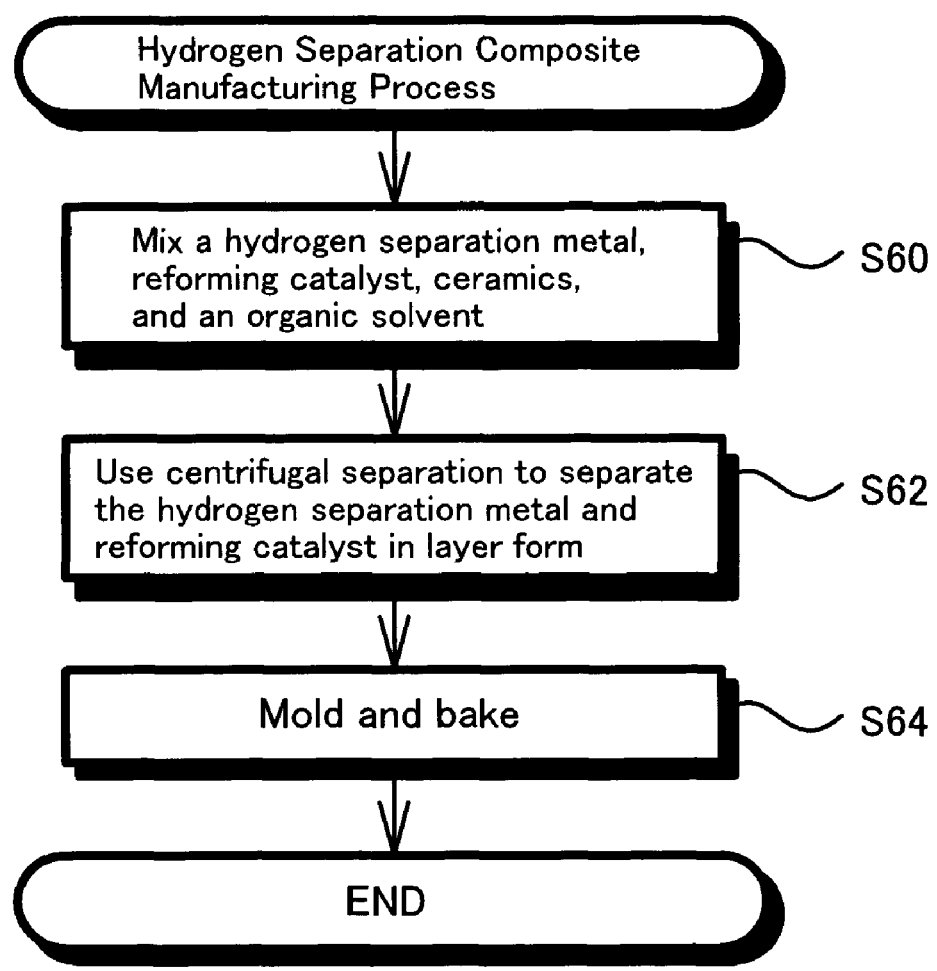
FIG. 21 is a process diagram of manufacturing method E of hydrogen separation composite 22.

FIG. 21 is a process diagram of manufacturing method E of hydrogen separation composite 22. With this manufacturing method, the point of difference with manufacturing method D is that the hydrogen separation layer and reforming layer are manufactured together. Specifically, with manufacturing method E, first, a mixture of a hydrogen separation metal, a catalyst, ceramic fine particles, and an organic solvent is generated (step S60). When the composition of the ceramic fine particles is changed for the hydrogen separation layer and the reforming layer, the two types of ceramic fine particles used for each of these are mixed. At this time, it is preferable that the two types of ceramic fine particles have a different specific gravity.

Note that before this process, it is preferable to have a hydrogen separation metal and a catalyst supported in the ceramic fine particles in advance. When changing the composition of each layer such as when constructing a porous support medium using palladium and alumina particles in the hydrogen separation layer and using rhodium and ceria particles in the reforming layer, if using this composition, an organic solvent is mixed after supporting palladium and rhodium in advance, there is the advantage that it is possible to form both of these in layer form relatively easily.

After performing centrifugal separation on a mixture generated in this way to separate the hydrogen separation metal and catalyst (step S62), this is molded and baked (step S64). When there are two types of ceramic fine particles with different specific gravity in the mixture, these fine particles are also separated together with the hydrogen separation metal and the catalyst. Though this is obvious, when the specific gravity of the hydrogen separation metal is greater than the specific gravity of the catalyst, it is necessary to make the specific gravity of the ceramic fine particles of the hydrogen separation layer greater than the specific gravity of the ceramic fine particles of the reforming layer, and when the size relationship of the specific gravity of the hydrogen separation metal and the catalyst is the reverse of this, then the size relationship of the specific gravity of the ceramic fine particles of each layer must be set to match this. With manufacturing method E, it is possible to manufacture both the hydrogen separation layer and the reforming layer at once, so it is possible to simplify the manufacturing process for hydrogen separation composite 22, giving the advantage of being able to reduce manufacturing costs.

Figure 22:
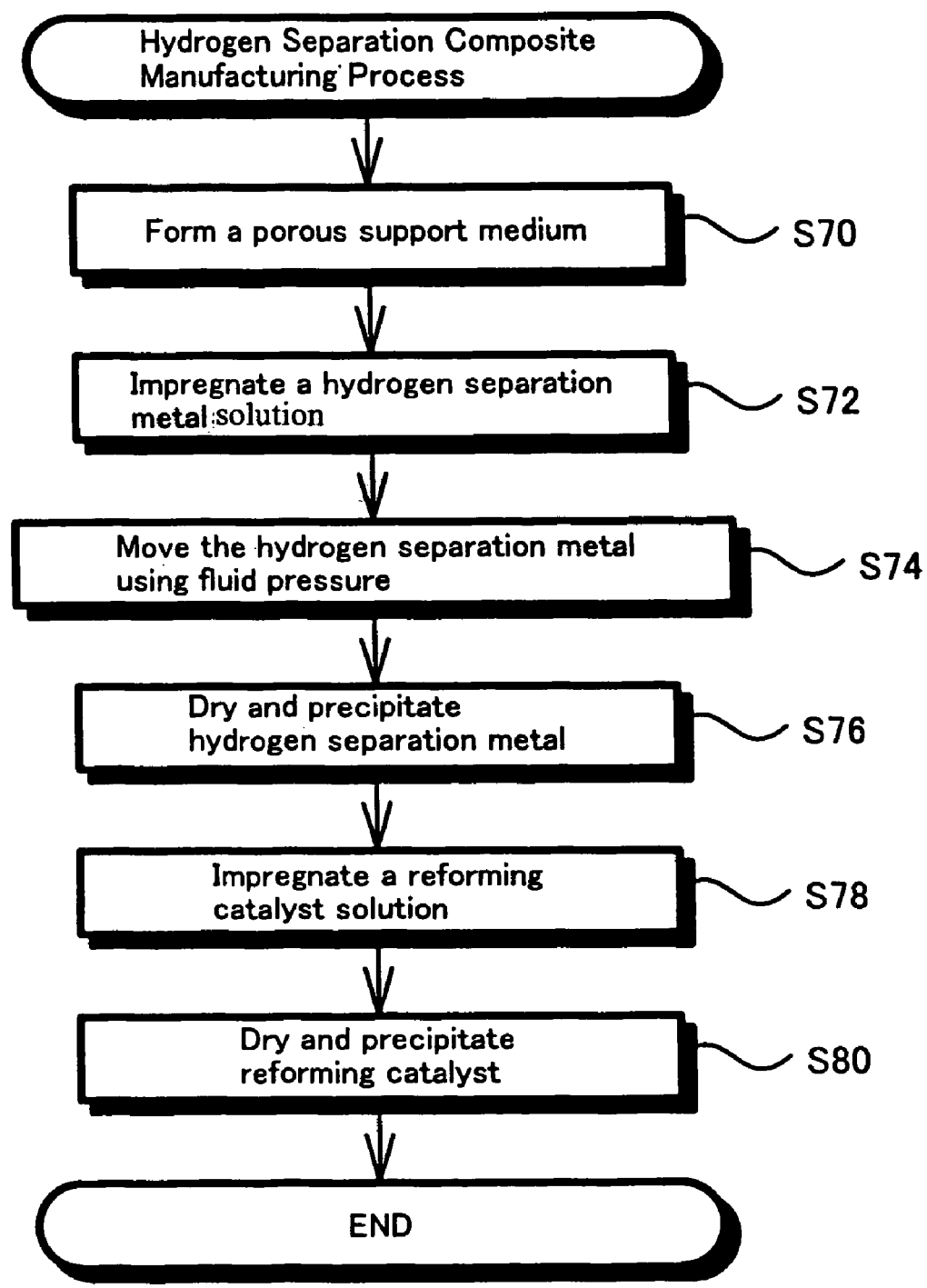
FIG. 22 is a process diagram of manufacturing method F of hydrogen separation composite 22.

FIG. 22 is a process diagram of manufacturing method F of hydrogen separation composite 22. With this manufacturing method, a hydrogen separation metal and a catalyst are sequentially impregnated into a porous support medium. First, a porous support medium is manufactured (step S70), and then a solution of hydrogen separation metal is impregnated (step S72). Next, the hydrogen separation metal is moved inside the porous body using fluid pressure (step S74). With this working example, we blew gas from one side of the porous support medium. When gas is blown, the solution impregnated by this pressure is moved into the pores of the porous support medium, and collects on the surface opposite to the side on which the gas was blown. The porous support medium is dried in this state, and a hydrogen separation layer is formed by precipitating the hydrogen separation metal (step S76).

Step S74 is a process that is performed with the goal of biasing the impregnated solution inside the porous support medium, so when blowing gas, it is necessary to blow using a pressure that is sufficient to move the solution and at a pressure of a level whereby the gas will not be blown out anywhere else. Besides this method, the process of step S74 can also be realized by degassing from one surface, and making an environment for which there is a pressure difference on both sides of the porous support medium.

After forming a hydrogen separation layer in this way, a catalyst solution is impregnated in the porous support medium (step S78), and if this is dried and the catalyst is precipitated, it is possible to form a reforming layer (step S80). Note that when forming a reforming layer, it is not necessary to perform the process of moving the solution using fluid pressure.

For fuel gas generating device 10A that uses hydrogen separation composite 22 manufactured in this way, it is preferable to provide the gas flow path using the same structure as that of the first working example. In this case, it goes without saying that it is preferable to place hydrogen separation composite 22 such that the reforming layer contacts the side on which the raw material gas is supplied.

With the fuel cell system of the second working example explained above, it is possible to perform both a reforming reaction and hydrogen separation inside hydrogen separation composite 22, so it is possible to simplify the structure of fuel gas generating device 10A, and to make the device more compact. Also, as with the first working example, hydrogen separation composite 22 has high hydrogen separation capability, so the same effects can be obtained using the second working example.

Note that it is also possible to use the various variation examples of the first working example on the second working example. For example, it is also possible to use the structure shown for the first variation example for the hydrogen separation layer (see FIG. 10). The concerned hydrogen separation composite can also be manufactured using manufacturing method D, for example, by forming a porous support medium in which a hydrogen separation metal is supported, then baking this porous support medium, and after supporting the hydrogen separation metal in film form, joining this with the reforming layer. It is also suitable to mold hydrogen separation composite 22 of the second working example in a shape having bumps like that shown in FIG. 12, or to join with a porous support medium for which mechanical strength can be ensured as shown in FIG. 13.

With the second working example, we showed an example of a hydrogen separation composite 22 for which a hydrogen separation metal and a catalyst are supported in layer form. To perform a reforming reaction and hydrogen separation simultaneously within one porous support medium, it is not absolutely necessary to provide the hydrogen separation metal and the catalyst in layer form, and it is also possible to form a hydrogen separation composite in an embodiment with both items randomly mixed inside the porous support medium. This can be realized easily by omitting the process using centrifugal separation in manufacturing method E.

H. Structure Examples of a Hydrogen Generating and Separation Mechanism

For the working examples noted above, we will explain in further detail the internal structure of the unit explained as the reforming device. In FIG. 2, we showed a typical example of having the internal structure of reforming device 10 be formed from reforming unit 11 and separation composite 12. In the explanation that follows, we will show an example of forming as a single unit from a part that generates a mixed gas that contains hydrogen using a reforming reaction from a raw material gas, etc. and from a part that separates hydrogen from the mixed gas (hereafter referred to as the "hydrogen generating and separation mechanism"). With the generating and separation mechanism as the core, the reforming device is constructed by providing items such as a mechanism that exhausts mixed gas and fuel gas after the supply and reaction of raw material gas and purge gas, respectively, and a mechanism that maintains the temperature required for a chemical reaction.

Figure 32:
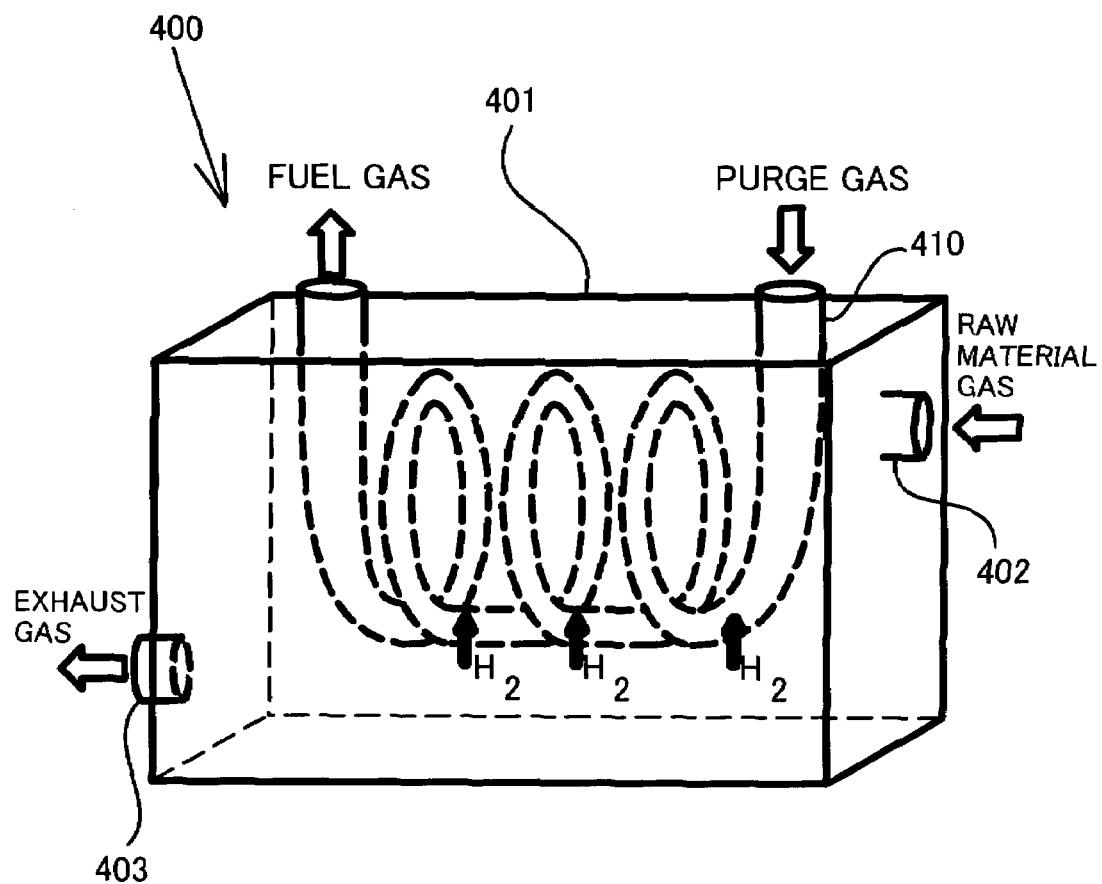
FIG. 32 is an explanatory diagram that shows the structure of hydrogen generating and separation mechanism 400 as structure 7.

FIG. 23 is an explanatory diagram that shows the categories of hydrogen generating and separation mechanism. At the upper level, we showed the categories according to things such as the flow path structure and the type of gas that flows in the flow path. At the lower level, we showed categories according to the type of additional mechanisms. As shown in the figure, the flow path structure can be broadly categorized into cases of using a single pipe, a double pipe having a dual structure, or a flow path formed inside a porous monolith, and for each of these, it is possible to categorize into cases of forming a flow path that is a straight pipe with no curves, or cases of forming a flow path as a bent pipe with curves. Furthermore, for each flow path structure, it is possible to categorize into cases of flowing purge gas and cases of flowing raw material gas inside the flow path. In the former case, the structure extracts the hydrogen from outside the flow path into the flow path by flowing purge gas inside the flow path. In the latter case, the structure extracts hydrogen by performing a hydrogen generating reaction in the flow path using a reforming reaction, etc., and by flowing purge gas outside the flow path. In the working examples below, we will show specific structural examples for representative items for the categories described above. FIG. 32 shows the correspondence between the structures shown as examples and the categories. The blank categories in FIG. 23 are items for which examples have been omitted because they are structures for which it is possible to inferred from structures that are specifically shown as examples. This does not mean that these are categories that cannot be realized.

As additional mechanisms, there are a partition that controls the flow, a stirring apparatus, and a removable part. There is also a categorization based on cases when the type of gas flowed to sites where each of these mechanisms is provided is purge gas, and when it is raw material gas. In the working examples noted below, we show examples of representative structures in these categories according to the correlation shown in FIG. 23.

H1. Structure 1 (Structure 1 that Uses a Single Pipe that does not Have Curves)

FIG. 24 is an explanatory diagram that shows the structure of hydrogen generating and separation mechanism 100 as structure 1. FIG. 24 (*a*) is an oblique diagram of the external appearance of the mechanism. FIG. 24 (*b*) is a cross section diagram cut at the symmetric plane. As shown in the figure, hydrogen generating and separation mechanism 100 is constructed from main body 101 and multiple separation pipes 110. Main body 101 is formed as a porous material monolith in cylinder form. A reforming catalyst is supported in the porous material. Raw material gas supply port 102 is joined to main body 101, and raw material gas such as a hydrocarbon is supplied to the porous pores. This raw material gas generates a reforming reaction by the effect of the reforming catalyst supported in the porous material, and generates a mixed gas that contains hydrogen.

Multiple holes 105 that pierces the monolith in the axial direction from end surface 104 are provided on main body 101. These holes 105 have a diameter with a slight margin in relation to the diameter of separation pipe 110. Separation pipes 110 are inserted into these holes 105. FIG. 25 is an explanatory diagram that shows the structure of a separation pipe 110. A separation pipe 110 is formed using the hydrogen separation composite explained previously with the first working example and the second working example. Specifically, as shown in FIG. 25 (*a*), with separation pipe 110, a separation film 112 in which palladium is supported is provided on the surface of cylindrical porous support medium 111. The various methods explained previously with the working examples can be used as the method for forming separation film 112. With structure 1, as shown in FIG. 25 (*a*), a hollow separation pipe 110 is used, but as shown in FIG. 25 (*b*), it is also possible to form the pipe interior using a porous material. As shown in the figure, as a variation example, separation pipe 110A is constructed by providing separation film 112 on the surface of porous support medium 111A formed in a cylinder shape. With the variation example, there are the advantages that forming the separation pipe 110A is easy, and it is possible to increase the strength. With structure 1, it is also possible to use either separation pipe 110 or 110A.

As shown in FIG. 24 (*b*), the hydrogen in the mixed gas generated by the main body 101 is extracted into separation pipe 110 inside hole 105. This hydrogen is carried downstream as fuel gas together with the purge gas. The gas that remains inside main body 101, in other words, the gas after hydrogen has been separated form the mixed gas, is exhausted from exhaust port 103.

In FIG. 24, though not illustrated, to realize the flow described above, with the first structure, the surface of main body 101 is sealed so that mixed gas does not flow out. The juncture of raw material gas supply port 102 (area A in the figure), the juncture of exhaust port 103, and the gap between the hole for inserting separation pipe 110 and separation pipe 110 (area B in the figure) are also sealed to avoid gas leaks. It is also possible to cover hydrogen generating and separation mechanism 100 with an airtight casing.

Structure 1 is constructed by inserting single pipe separation pipe 110 with no curves, so there is the advantage that manufacturing is easy. It is possible to extract hydrogen at separation pipe 110 while reforming at main body 101, so there is also the advantage of being able to make the device more compact. As explained using the first working example, etc., by using purge gas, there is also the advantage of having high hydrogen separation efficiency.

With structure 1, we showed an example of a case where main body 101 that performs the reforming reaction is formed by a porous material monolith. Various structures can be used for main body 101. For example, it is also possible to construct it by filling a catalyst in an airtight container. For separation pipe 110 as well, this is not limited to being a cylinder, and a variety of cross section shapes can be used. The number of and placement of the separation pipes 110 are not restricted to the example shown in FIG. 24.

H2. Structure 2 (Structure 2 that Uses a Single Pipe that does not Have Curves)

Figure 26:
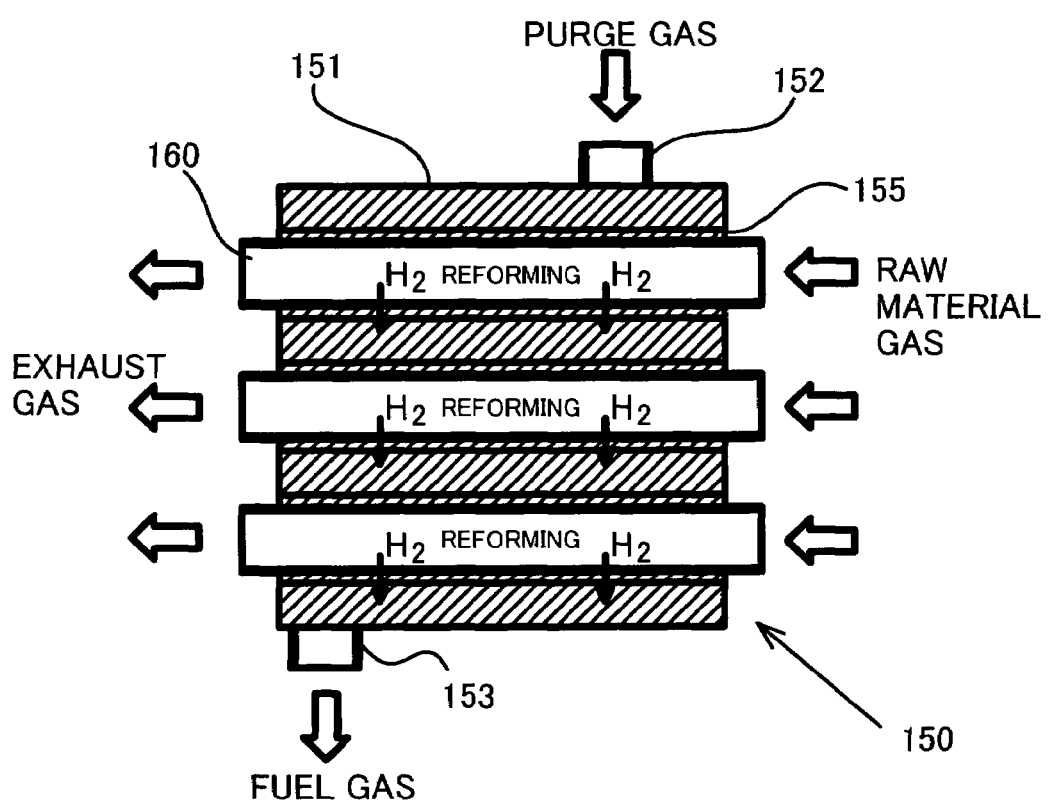
FIG. 26 is an explanatory diagram that shows the structure of hydrogen generating and separation mechanism 150 as structure 2.

FIG. 26 is an explanatory diagram that shows the structure of hydrogen generation and separation mechanism 150 as structure 2. A cross section diagram of the symmetric plane is shown. The external appearance is the same as that of structure 1. With structure 2, the purge gas and raw material gas flow sites are the reverse of those of structure 1. The device structure itself is the same as structure 1, and separation pipes 160 are inserted into holes 155 that are provided in main body 151 formed by a porous material monolith. Steam is supplied as purge gas from supply port 152 that is joined to the main body 151, and after hydrogen is extracted from separation pipes 160, this is exhausted from exhaust port 153 as fuel gas. At main body 151, no chemical reaction occurs, so no catalyst is supported.

FIG. 27 is an explanatory diagram that shows the structure of a separation pipe 160. With structure 2, raw material gas is supplied inside separation pipes 160 to perform a reforming reaction, so the point of providing a catalyst differs from structure 1. Separation pipe 160 is constructed using the hydrogen separation composite explained with the first working example, etc. As shown in FIG. 27 (*a*), separation film 162 is provided on the surface of porous support medium 161. The inside of separation pipes 160 is filled with pellet shaped reforming catalyst 163. Because there is a porous support medium 161, reforming catalyst 163 does not directly contact separation film 162. Therefore, there is the advantage of not having the risk of the particles of reforming catalyst 163 causing damage to separation film 162 due to vibration during operation, etc. Also, the pellet shaped reforming catalyst 163 can be easily refilled, so there is the advantage of maintenance of the hydrogen generating and separation mechanism being easy.

The catalyst of separation pipe 160 can also be supported in a porous support medium. FIG. 27 (*b*) shows the structure of separation pipe 160A as a variation example. As shown in the figure, with separation pipe 160A of the variation example, separation film 162A is formed on the surface of a porous support medium formed in a cylinder shape. A reforming catalyst is supported in porous support medium 161A. If the concerned structure is used, there is the advantage that evenly supporting the reforming catalyst is easy, and that it is possible to ensure the strength of separation pipe 160.

With hydrogen generating and separation device 150 of structure 2, there are the same advantages of structure 1. For structure 2 as well, it is possible to realize the same variation examples as structure 1.

H3. Structure 3 (Structure 1 that Uses a Single Pipe that has Curves)

Figure 28:
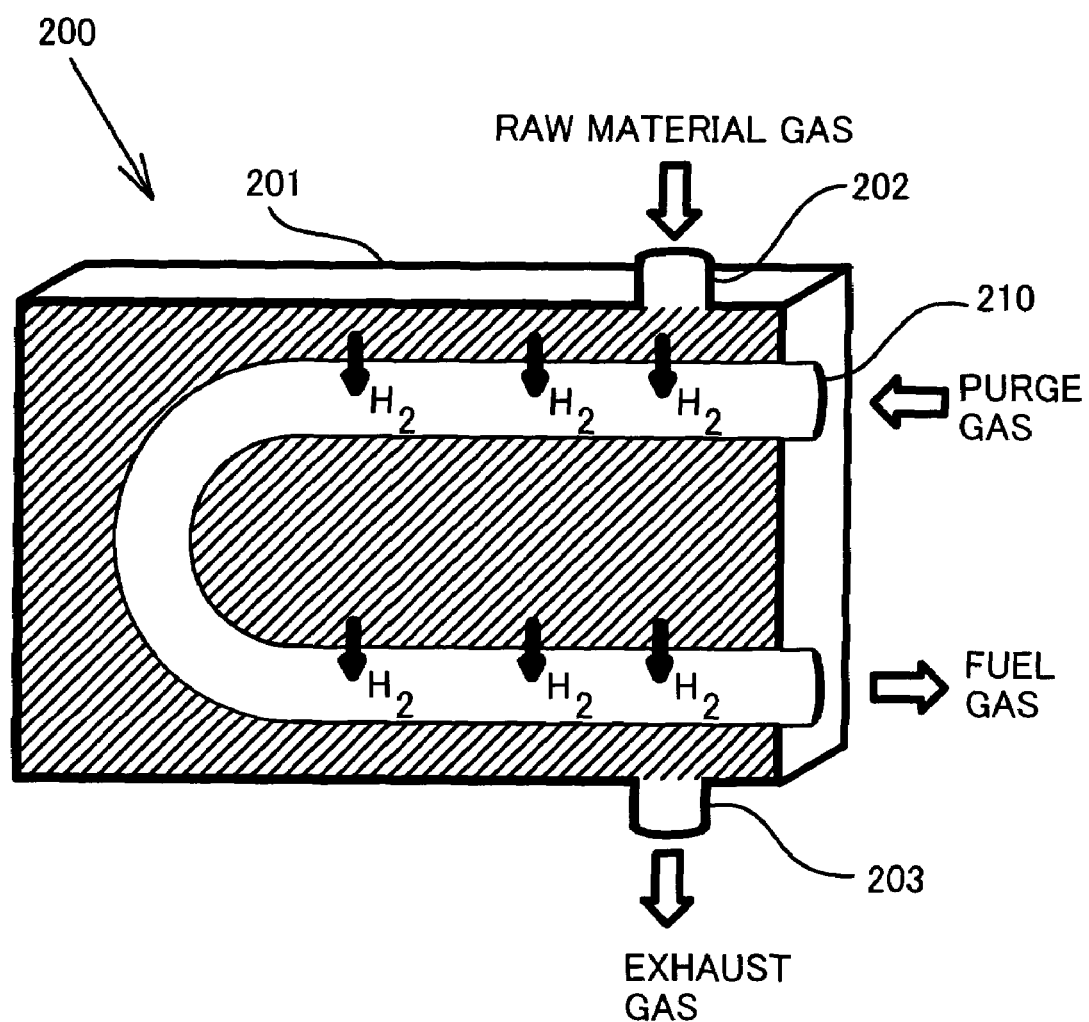
FIG. 28 is an explanatory diagram that shows the structure of hydrogen generating and separation mechanism 200 as structure 3.

FIG. 28 is an explanatory diagram that shows the structure of a hydrogen generating and separation mechanism 200 as structure 3. This shows an oblique diagram of the state cut at the symmetric plane. Hydrogen generating and separation mechanism 200 of structure 3 has a U shaped separation pipe 210 that pierces into main body 201. The structure of separation pipe 210 is the same as that of separation pipe 110 of structure 1 (see FIG. 25). Raw material gas supply port 202 and exhaust port 203 are joined to main body 201. Main body 201 is an airtight container, and the interior (the part shown by cross hatching in the figure) is filled with a reforming catalyst. The raw material gas supplied for supply port 202 is reformed inside main body 201. Purge gas is flowed into separation pipe 210, and the hydrogen generated by main body 201 is extracted into separation pipe 210.

Hydrogen generating and separation mechanism 200 of structure 3 has the same advantages as structure 1, such as manufacturing being relatively easy. Separation pipe 210 is curved in a U shape, so there is also the advantage of being resistant to heat distortion. Generally, reforming reactions are performed at high temperatures, so there is a big temperature difference between when hydrogen generating and separation mechanism 200 is operating and when it is stopped. These temperature differences invite expansion and contraction of separation pipe 210. With structure 3, the curved part of separation pipe 210 is the free end that is not fixed to main body 201, so separation pipe 210 can expand and contract with relative freedom in the axis direction due to heat. Therefore, structure 3 has the advantage of being able to suppress the possibility of damage occurring to separation pipe 210 due to heat stress. There is also the advantage that separation pipe 210 that has a curve can increase the capacity efficiency. In other words, by having a curve, it is possible for separation pipe 210 to be efficiently housed in main body 201. As a result, it is possible to increase the area at which separation pipe 210 contacts mixed gas, so it is possible to increase the hydrogen separation efficiency.

With structure 3, we showed an example of a case when main body 201 is constructed from an airtight container. Main body 201 can also be formed using a porous material in which a reforming catalyst is supported.

H4. Structure 4 (Structure 2 that Uses a Single Pipe that has Curves)

Figure 29:
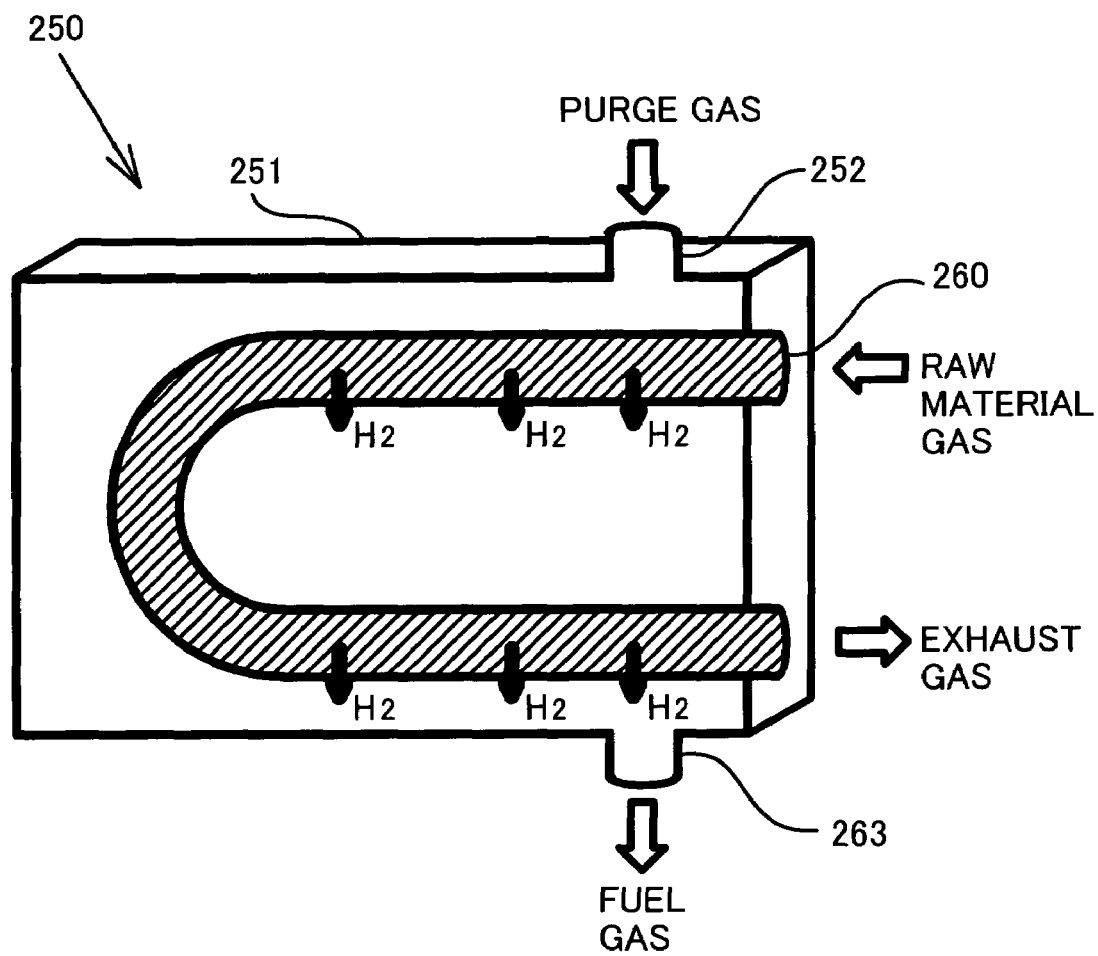
FIG. 29 is an explanatory diagram that shows the structure of hydrogen generating and separation mechanism 250 as structure 4.

FIG. 29 is an explanatory diagram that shows the structure of a hydrogen generating and separation mechanism 250 as structure 4. This shows an oblique diagram of being cut at the symmetric plane. Hydrogen generating and separation mechanism 250 of structure 4 is different from structure 3 in that purge gas flows into main body 251 and reforming is performed from the raw material gas inside separation pipe 260. There is no catalyst supported inside main body 251. The structure of separation pipe 260 the same as that of separation pipe 160 of structure 2 (see FIG. 27). With structure 4 as well, there are advantage s such as manufacturing being easy, being resistant to heat distortion, and having excellent capacity efficiency and hydrogen separation efficiency. Also, as with structure 2, it is possible to avoid contact between the catalyst and the hydrogen separation film, so there is also the advantage of being able to protect the hydrogen separation film.

H5. Structure 5 (Structure 3 that Uses a Single Pipe that has Curves)

Figure 30:
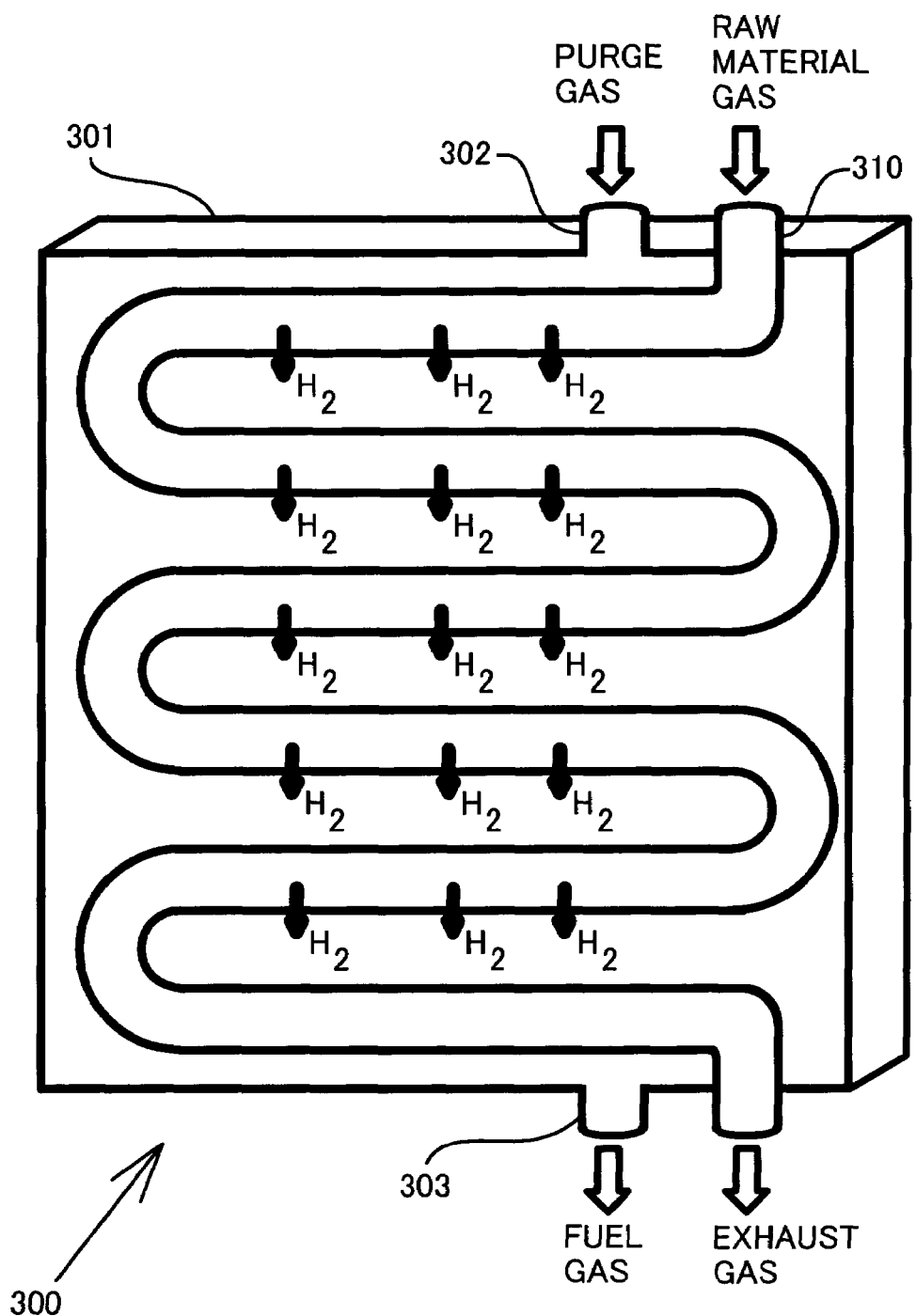
FIG. 30 is an explanatory diagram that shows the structure of hydrogen generating and separation mechanism 300 as structure 5.

A structure that has a curve in the separation pipe and that increases the capacity efficiency as well as the hydrogen separation efficiency can be realized in various forms. FIG. 30 is an explanatory diagram that shows the structure of hydrogen generating and separation mechanism 300 as structure 5. This shows an oblique diagram of the state cut at the symmetric plane. With the mechanism of structure 5, multiple separation pipes 310 that have a curve pierce into main body 301. The structure of separation pipes 310 is the same as that of separation pipe 160 of structure 2 (see FIG. 27). Supply port 302 and exhaust port 303 are joined to main body 301. The hydrogen that is generated inside separation pipes 310 by the purge gas supplied from supply port 302 is extracted into main body 301. In this way, if the structure has multiple curves, it is possible to further increase the capacity efficiency of separation pipes 310, and also to make the device thinner. Note that it is also possible to have a structure that flows purge gas into separation pipes 310 to perform reforming in main body 301. Also, the number and shape of the curves of separation pipes 310 are not limited to those shown in the figure.

H6. Structure 6 (Structure 4 that Uses a Single Pipe that has Curves)

Figure 31:
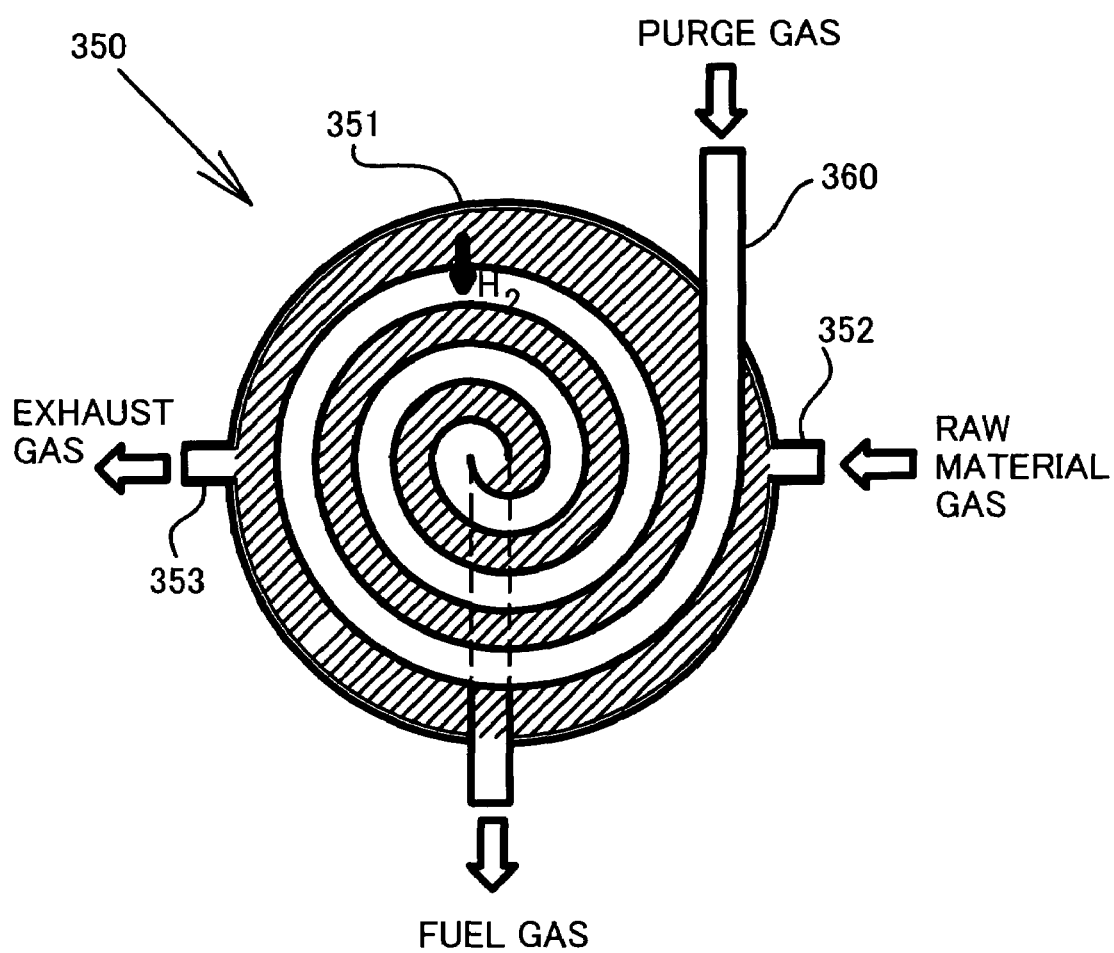
FIG. 31 is an explanatory diagram that shows the structure of hydrogen generating and separation mechanism 350 as structure 6.

FIG. 31 is an explanatory diagram that shows the structure of hydrogen generating and separation mechanism 350 as structure 6. It shows a cross section diagram shown from the top. Main body 351 is a circular container, and supply port 352 and exhaust port 353 are attached tot his. Main body 351 has a reforming catalyst supported in it for use in reforming the raw material gas supplied from supply port 352. Separation pipe 360 is formed in a spiral shape, and purge gas is supplied inside it. The structure of separation pipe 360 is the same as that of structure 1 (see FIG. 25).

In this way, if the structure is made to have continuous curves, it is possible to further increase the capacity efficiency of separation pipe 360, and to make the device thinner. Note that it is also possible to have a structure with which reforming is done inside separation pipe 360 and purge gas is supplied inside main body 351.

H7. Structure 7 (Structure 5 that Uses a Single Pipe that has Curves)

FIG. 32 is an explanatory diagram that shows the structure of hydrogen generating and separation mechanism 400 as structure 7. Main body 401 is an airtight container, and supply port 402 and exhaust port 403 are joined to it. Main body 401 has a reforming catalyst supported in it for reforming the raw material gas that is supplied from supply port 402. Separation pipe 410 is formed in a spiral shape, and purge gas is supplied to its interior. The structure of separation pipe 410 is the same as that of structure 1 (see FIG. 25).

If separation pipe 410 is placed three dimensionally in this way, then it is possible to further increase the capacity efficiency of separation pipe 410, and it is possible to increase the hydrogen separation efficiency. Note that when a separation pipe 410 having many curves is formed, it is preferable to use a metal porous material as the porous support medium. The ductility of metal makes it easier to form separation pipe 410 and also has the advantage of making it easier to avoid damage due to vibration during operation. Use of a metal porous material is not limited to structure 7, and is effective when providing curves in separation pipes.

H8. Structure 8 (Structure 1 that Uses a Double Pipe that does not Have Curves)

Figure 33:
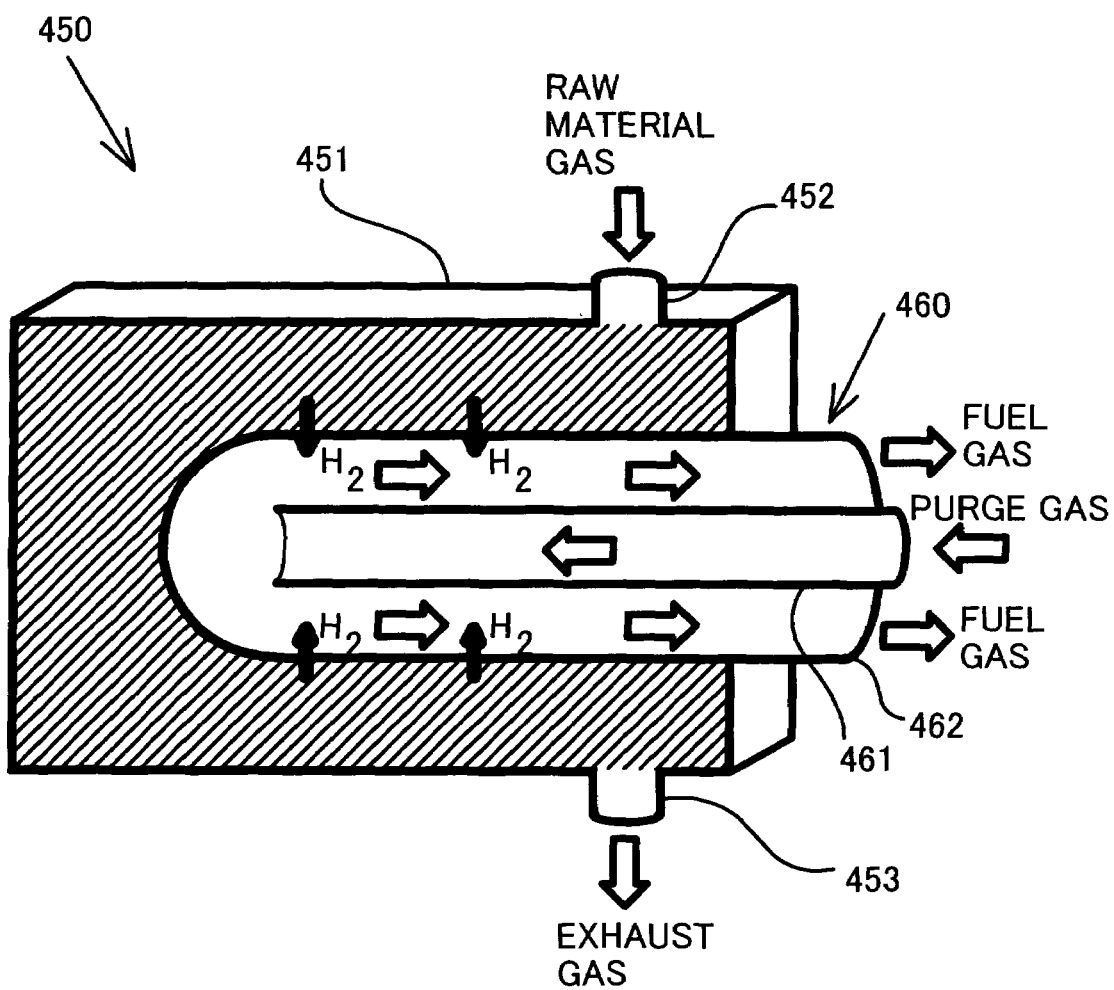
FIG. 33 is an explanatory diagram that shows the structure of hydrogen generating and separation mechanism 450 as structure 8.

FIG. 33 is an explanatory diagram that shows the structure of hydrogen generating separation mechanism 450 as structure 8. The mechanism of structure 8 is structured with separation pipe 460, which is formed as a double pipe, inserted into main body 451. Supply port 452 and exhaust port 453 are joined to main body 451. Main body 451 is an airtight container filled with a reforming catalyst, and raw material from supply port 452 is reformed here. It is also possible to form main body 451 with a porous material in which a reforming catalyst is supported.

Separation pipe 460 is constructed with inner pipe 461 for which both ends are open inserted into outer pipe 462 for which only one end is open. Outer pipe 462 and inner pipe 461 are formed in the same way as separation pipe 110 of structure 1 (see FIG. 25). Outer pipe 462 and inner pipe 461 are fixed at the right side in the figure. Purge gas is supplied to inner pipe 461, and extracted from outer pipe 462 is fuel gas for which the hydrogen generated by main body 451 is extracted. The flow of inner pipe 461 and outer pipe 462 can be the reverse as well.

With the mechanism of structure 8, separation pipe 460 is structured as a double pipe for which free expansion and contraction due to heat is possible for inner pipe 461 and outer pipe 462, so there is the advantage that it is possible to further reduce the effects due to heat distortion. For example, when using steam as the purge gas, rather than steam, water is sprayed in inner pipe 461. When performing reforming at main body 451, separation pipe 460 is exposed to a high temperature atmosphere, so the water sprayed by that heat is vaporized. Water is vaporized by the heat from the fuel gas in outer pipe 462 being absorbed, so the fuel gas temperature decreases according to the vaporization heat. With structure 8, with this effect, it is possible to have the temperature of the fuel gas more closely approach the operating temperature of the fuel cell.

H9. Structure 9 (Structure 2 that Uses a Double Pipe that does not Have Curves)

Figure 34:
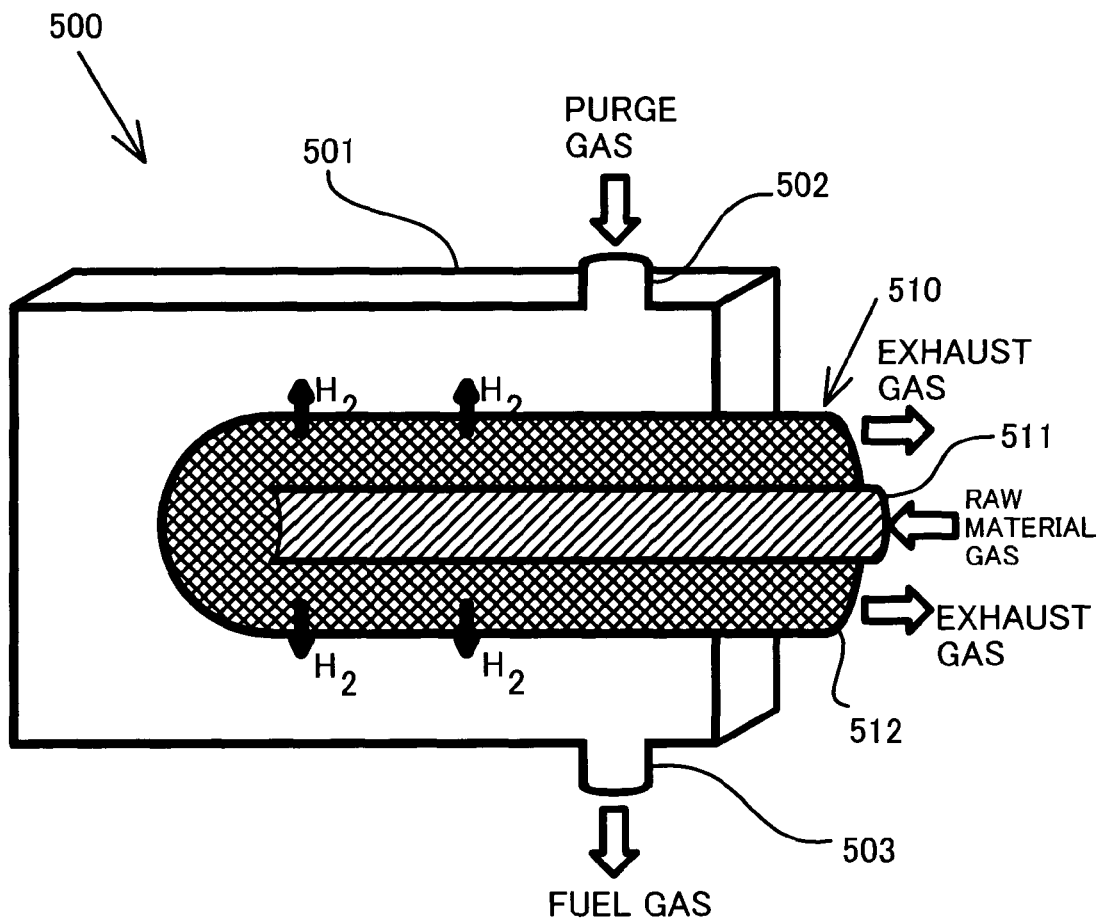
FIG. 34 is an explanatory diagram that shows the structure of hydrogen generating and separation mechanism 500 as structure 9.

FIG. 34 is an explanatory diagram that shows the structure of hydrogen generating and separation mechanism 500 as structure 9. The point of difference from structure 8 is that purge gas is flowed into main body 501 and reforming reactions, etc. are performed at separation pipe 510 which is formed as a double pipe. Main body 501 is an airtight container in which no catalyst is supported. Main body 501 can also be formed using a porous material. Purge gas is supplied from supply port 502, and hydrogen that was generated in separation pipe 510 is extracted and exhausted from exhaust port 503.

Separation pipe 510, as with structure 8, forms a double structure made from inner pipe 511 and outer pipe 512. Raw material gas is supplied to inner pipe 511 and exhausted from outer pipe 512. Inner pipe 511 and outer pipe 512 have the same structure as separation pipe 16 of structure 2 (see FIG. 27). Inner pipe 511 and outer pipe 512 are filled with a catalyst for generating hydrogen from raw material gas. With structure 9, a catalyst for reforming reactions is supported in the inner pipe 511, and a catalyst for shift reactions is supported in outer pipe 512. Raw material gas is exhausted through both reforming reactions and shift reactions.

With structure 9, it is possible to realize a unit that performs two types of chemical reactions, reforming reactions and shift reactions, in a single structure, making it possible to make the device more compact. There is also an advantage from the perspective of reaction heat. Generally, reforming reactions are performed at high temperatures of approximately 600 to 800° C., and shift reactions are performed at temperatures of approximately 200 to 400° C. The operating temperature of a fuel cell is slightly lower than the temperature of a shift reaction. With structure 9, the item that contacts the purge gas is outer pipe 512 that performs the shift reaction, and inner pipe 511 that performs reforming reactions is provided inside this. In other words, the structure is such that the gas temperature becomes lower in the sequence of inner pipe 511, outer pipe 512, and main body 501. Therefore, structure 9 has advantages from the perspective of advancing both reforming and shift reactions, and from the perspective of having the temperature of the extracted hydrogen approaching the operating temperature of a fuel cell. Note that for structure 9, besides combination of reforming reactions and shift reactions, it is also possible to perform selective oxidation reactions of carbon monoxide at outer pipe 512.

H10. Structure 10 (Structure 3 that Uses a Double Pipe that does not Have Curves)

Figure 35:
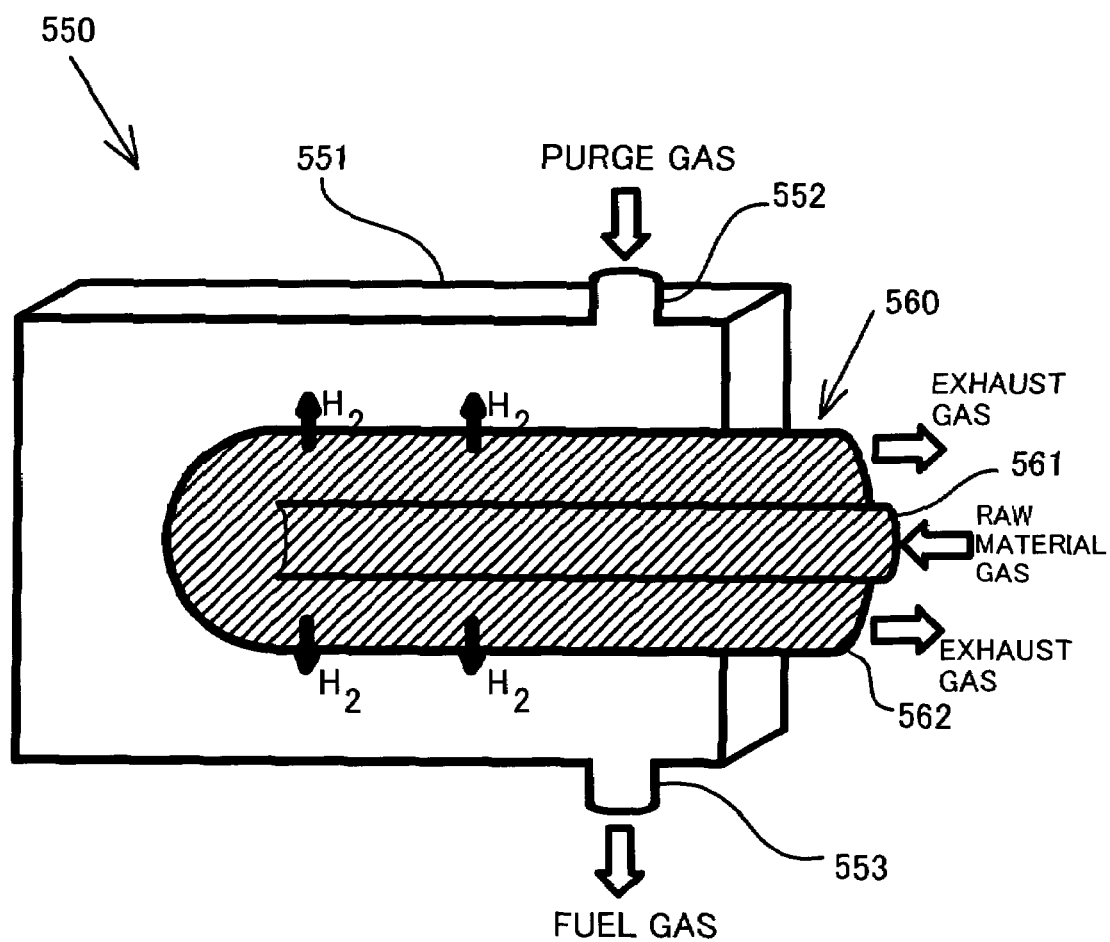
FIG. 35 is an explanatory diagram that shows the structure of hydrogen generating and separation mechanism 550 as structure 10.

FIG. 35 is an explanatory diagram that shows the structure of hydrogen generating and separation mechanism 550 as structure 10. With the mechanism of structure 10, the point of difference from structure 9 is that single chemical reactions are performed inside separation pipe 560. Main body 551, supply port 552, and exhaust port 553 have the same structures as those of structure 9. Separation pipe 560 is formed from inner pipe 561 and outer pipe 562, and the difference from structure 9 is that a reforming catalyst is supported in both of these. Even with the concerned structure, there are the advantages of manufacturing being easy, being able to have the reforming unit and hydrogen separation unit in a single unit structure so it is possible to make the device more compact, and not being susceptible to heat distortion.

H11. Structure 11 (Structure that Uses a Flow Path within a Porous Monolith)

Figure 36:
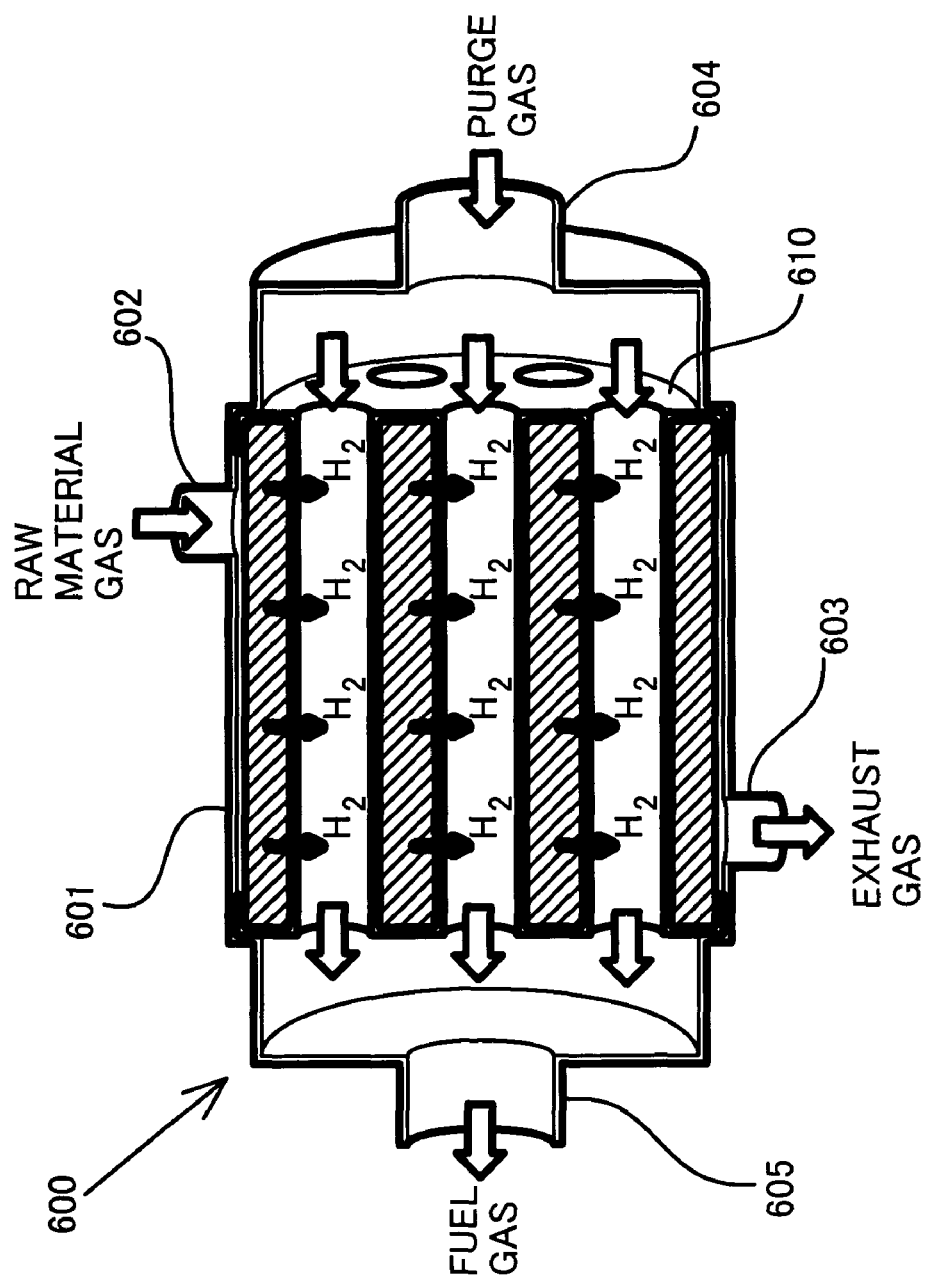
FIG. 36 is an explanatory diagram that shows the structure of hydrogen generating and separation mechanism 600 as structure 11.

FIG. 36 is an explanatory diagram that shows the structure of hydrogen generating separation mechanism 600 as structure 11. This shows an oblique diagram of a cross section at the symmetric plane. Structure 11 is constructed with a generating and separation pipe 610 formed by a porous material monolith attached to airtight casing 601.

Figure 37:
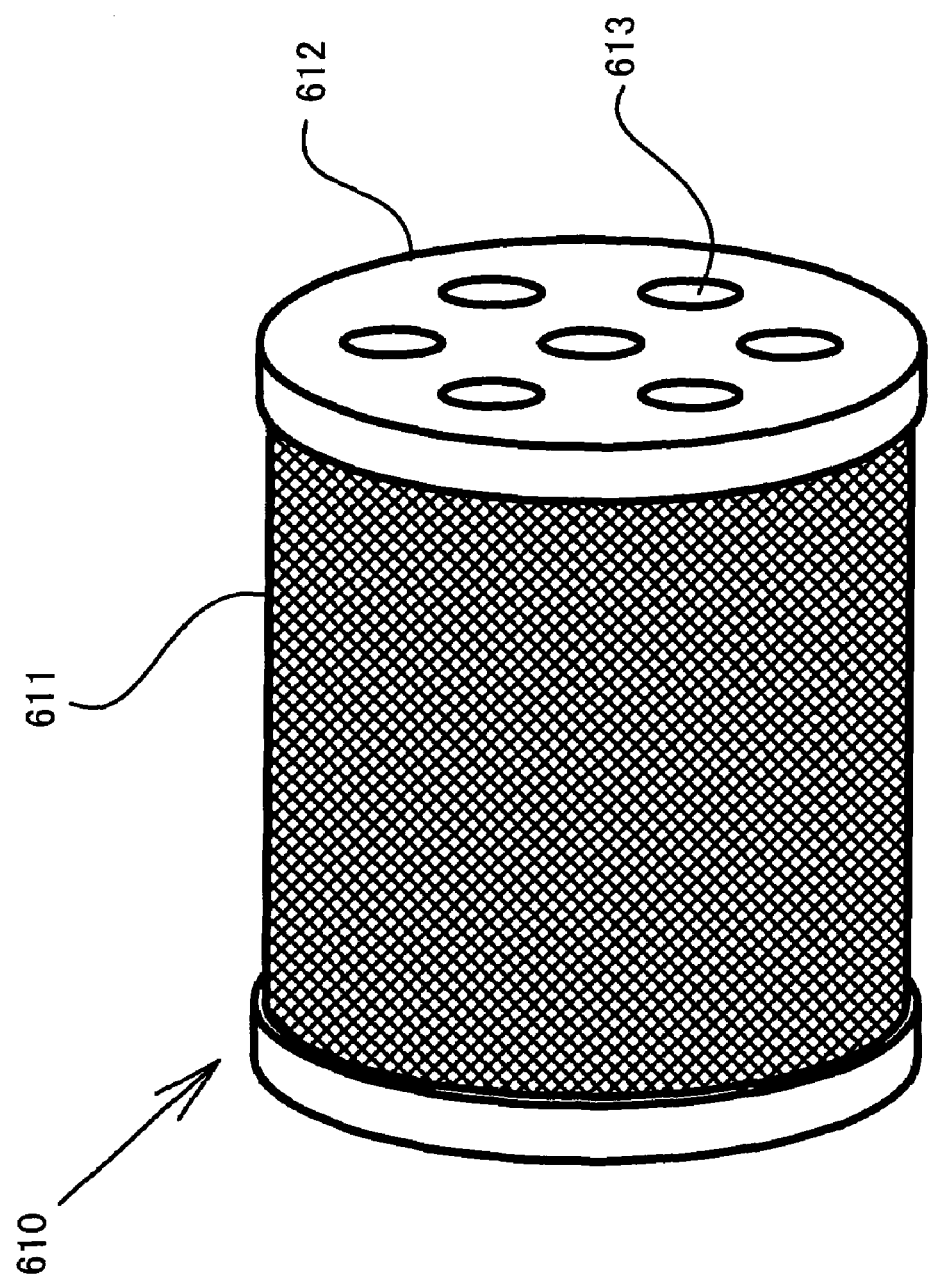
FIG. 37 is an explanatory diagram that shows the structure of generating and separation pipe 610.

FIG. 37 is an explanatory diagram that shows the structure of generating and separation pipe 610. As shown in the figure, main body 611 of generating and separation pipe 610 is constructed in cylinder form by a porous monolith. There are multiple holes 613 which are the flow path for purge gas provided inside main body 611. As shown in FIG. 36, holes 613 are formed without any curves, but it is also acceptable to provide them with curves.

A hydrogen separation film is formed by the hydrogen separation composite explained previously with the first working example, etc. at holes 613 and end surface 612 of main body 611. The parts shown by bold lines in FIG. 36 are the hydrogen separation film. As shown in the figure, the hydrogen separation film is formed to cover the inner periphery of the holes 613 and the end surface 612. The separation film can be formed using various methods including an impregnation support method, a physical vapor deposition method, or a chemical vapor deposition method. The parts marked by cross hatching in FIG. 37 indicate areas where a hydrogen separation film is not formed, and the porous material can be seen.

Pipes for supplying gas to generating and separation pipe 610 are provided in casing 601 of structure 11. As shown in FIG. 36, these are supply port 602 and exhaust port 603 that supply and exhaust raw material gas at the side surface of generating and separation pipe 610. Casing 601 is sealed at its junction with generating and separation pipe 610 so that raw material gas supplied from supply port 602 does not leak to end surface 612 of generating and separation pipe 610. A mechanism is also provided that prevents leaking of gas supplied from supply port 602 to exhaust port 603 via the periphery of generating and separation pipe 610. Manifolds 604 and 605 are provided in the axis direction of casing 601 to supply and exhaust purge gas. As shown by the arrow in FIG. 36, the purge gas supplied from manifold 604 passes out of holes 613 of generating and separation pipe 610, and with the hydrogen generated by reforming at main body 611 extracted, is exhausted from manifold 605.

With the mechanism of structure 11, it is possible to realize generation and separation of hydrogen with generating and separation pipe 610 as a single unit, so it is possible to make the device more compact. The goal is achieved by forming a hydrogen separation film on the holes of the porous monolith, so there is also the advantage of manufacturing being easy. Main body 611 is formed using a porous monolith, so there is also the advantage of having excellent strength. Note that for structure 11, it is also possible to supply purge gas to main body 611 and to perform reforming inside holes 613. In this case, as with structure 2, it is possible do something like fill holes 613 with a reforming catalyst.

H12. Structure 12 (Structure 1 that Uses a Partition)

Figure 38:
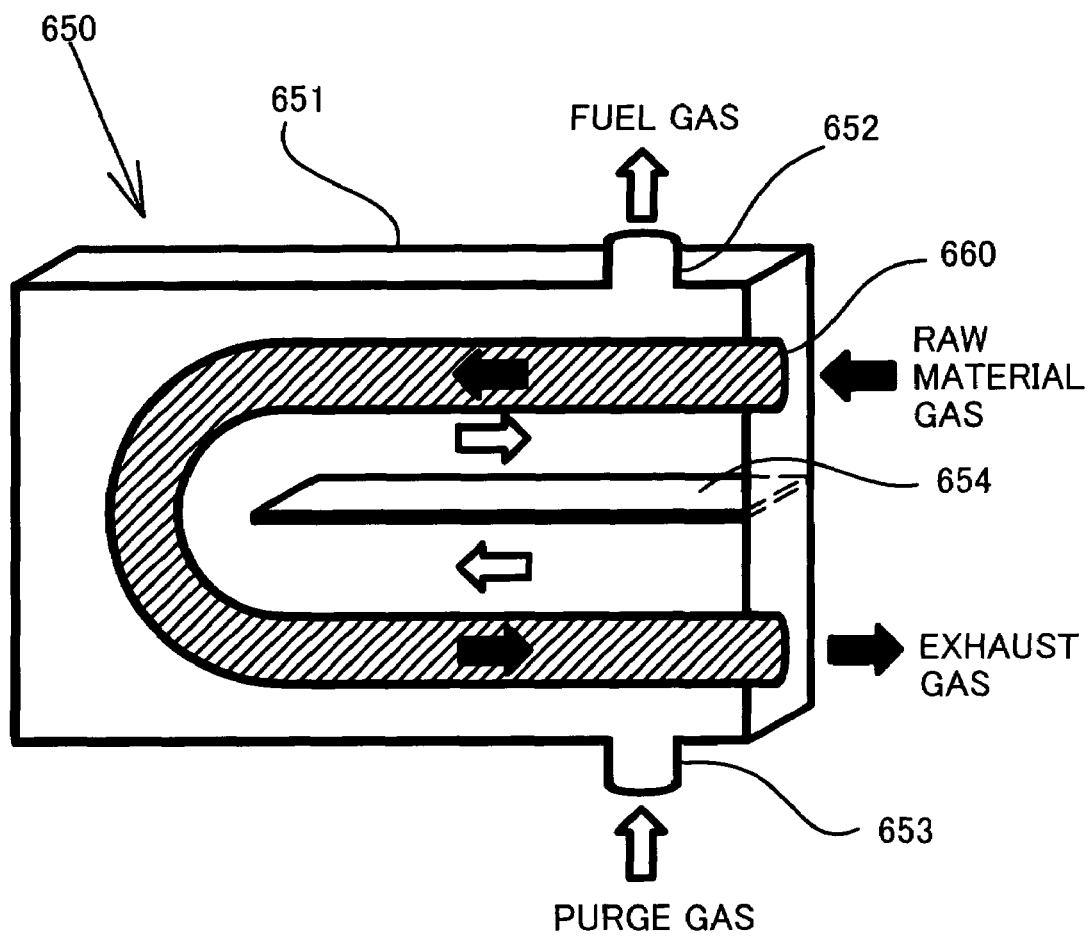
FIG. 38 is an explanatory diagram that shows the structure of hydrogen generating and separation mechanism 650 as structure 12.

FIG. 38 is an explanatory diagram that shows the structure of hydrogen generating and separation mechanism 650 as structure 12. The key points of the structure are the same as structure 4. The point of difference from structure 4 is that a partition 654 is provided in main body 651 to control the flow of purge gas.

With structure 12, as shown by the white arrows in the figure, purge gas is supplied from supply port 653, and after flowing along partition 654, is exhausted from exhaust port 652. Meanwhile, the raw material gas flows inside separation pipe 660 in the direction shown by the filled in arrows in the figure. In the area where purge gas flows along partition 654, the mixed gas inside the separation pipe and the purge gas flow in opposing directions. As explained previously with FIG. 7, if the flow of the mixed gas and purge gas is made to be in opposing directions, then it is possible to expand the hydrogen partial pressure of both, and to increase the hydrogen separation efficiency. By using this effect, structure 12 has the advantage of being able to efficiently separate hydrogen. Note that with structure 12, it is also possible to flow purge gas to separation pipe 660 and to supply raw material gas to main body 651.

H13. Structure 13 (Structure 2 that Uses a Partition)

Figure 39:
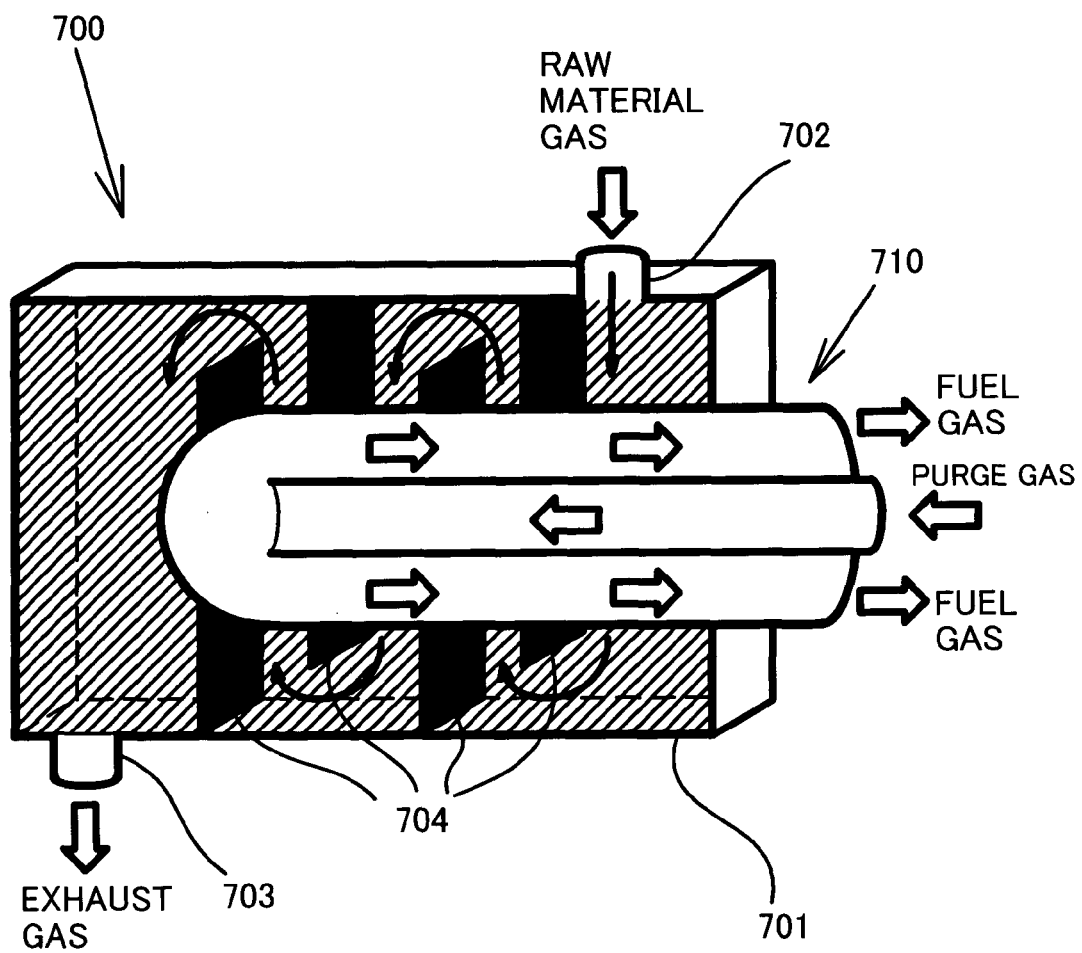
FIG. 39 is an explanatory diagram that shows the structure of hydrogen generating and separation mechanism 700 as structure 13.

FIG. 39 is an explanatory diagram that shows the structure of hydrogen generating and separation mechanism 700 as structure 13. The key parts of the structure are the same as those of structure 8. The point of difference with structure 8 is that a partition 704 is provided at main body 701 to control the flow of purge gas.

As shown by the white arrows in the figure, purge gas flows from the inner pipe toward the outer pipe in separation pipe 710 which is formed as a double pipe. As shown by the arrows in the figure, the raw material gas is supplied from supply port 702, and after having the flow direction turned multiple times by partition 704, is exhausted from exhaust port 703. The number and shape of partition 704 are not limited to the example shown in the figure.

With structure 13, the raw material gas flows in a direction orthogonal to separation pipe 710. It has been confirmed through experiments that there is an increase in the hydrogen separation efficiency by flowing in this direction. Note that with structure 13, it is also possible to perform reforming inside separation pipe 710 and to supply purge gas to main body 701. The structure is not restricted to having the raw material gas in a state flowing in a strictly orthogonal direction to separation pipe 710, but can also flow in a direction that has a slope in relation to separation pipe 710. As a mechanism for controlling the flow of the raw material gas, it is also possible to use a vane instead of partition 704.

H14. Structure 14 (Structure that Uses a Mixer)

Figure 40:
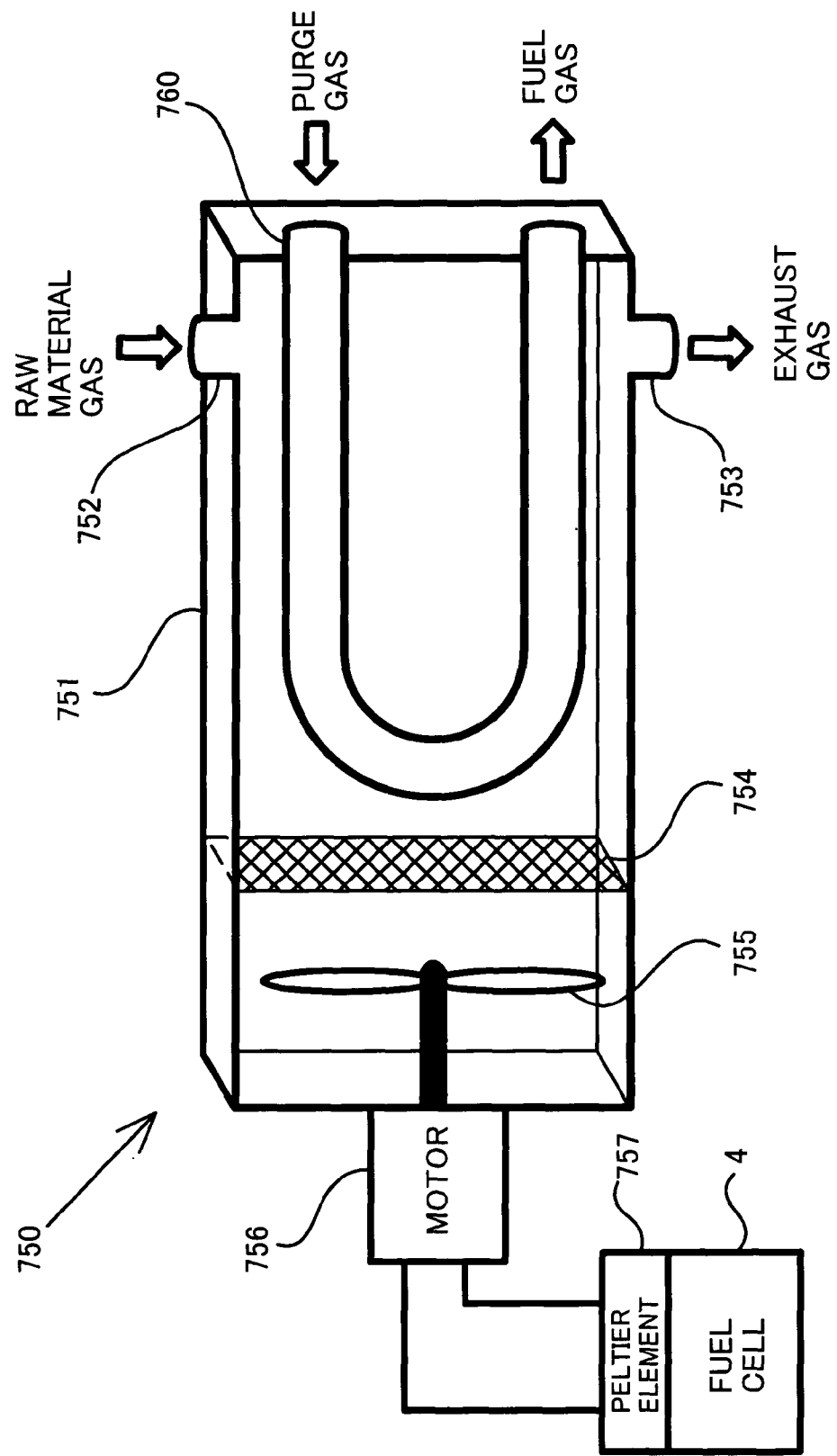
FIG. 40 is an explanatory diagram that shows the structure of hydrogen generating and separation mechanism 750 as structure 14.

FIG. 40 is an explanatory diagram that shows the structure of hydrogen generating and separation mechanism 750 as structure 14. This shows an oblique diagram of the cross section when cut at the symmetric plane. The key points of the structure are the same as those of structure 3. The point of difference from structure 3 is that a fan 755 that stirs the gas is provided inside main body 751.

A reforming catalyst is filled or supported in main body 751, and the raw material gas supplied from supply port 752 is reformed inside main body 751, and after the hydrogen is extracted, it is exhausted from exhaust port 753. The purge gas is supplied to separation pipe 760 and hydrogen is extracted from main body 751.

To avoid inhibition of rotation of fan 755 by the reforming catalyst that fills main body 751, a gauge 754 is provided at the front of fan 755. Fan 755 is driven by motor 756 which is provided outside main body 751. Here, we have shown an example of the waste heat generated during operation of fuel cell 4 being converted to power by Peltier element 757 to drive motor 756. Motor 756 is not limited to this structure, and can also be driven using output from a battery or fuel cell.

Figure 41:
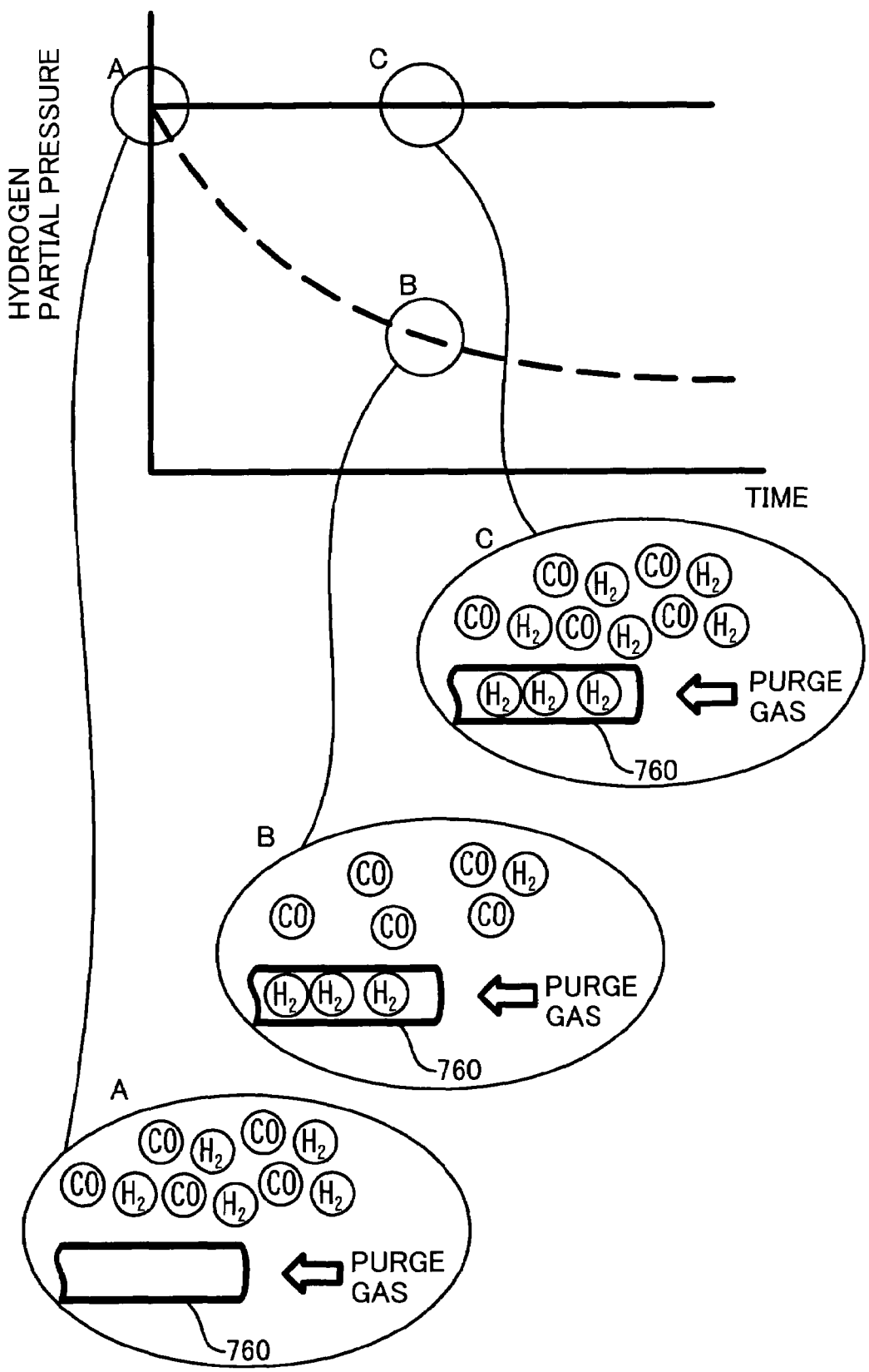
FIG. 41 is an explanatory diagram that shows the effect of stirring using fan 755.

We will explain the effects of structure 14. FIG. 41 is an explanatory diagram that shows the stirring effect of fan 755. This shows the change over time in hydrogen partial pressure near separation pipe 760. The solid line shows changes when operating fan 755, and the dotted line shows the changes when not using fan 755.

At the start of operation (state A in the figure), the raw materials are reformed in main body 751, and hydrogen and carbon monoxide are generated. At this point, the hydrogen partial pressure near separation pipe 760 is relatively high. Hydrogen is gradually extracted into separation pipe 760 by the hydrogen partial pressure difference inside and outside separation pipe 760. States B and C show the distribution of hydrogen and carbon monoxide after a set time has elapsed. Because hydrogen is gradually extracted from near separation pipe 760, when fan 755 is note used (state B), there is mainly carbon monoxide near separation pipe 760. In other words, as shown by the dotted line in the figure, the hydrogen partial pressure near separation pipe 760 gradually decreases over time. Meanwhile, if the mixed gas in main body 751 is stirred using fan 755, even after a set time has elapsed, about the same amount of hydrogen as when operation started exits near separation pipe 760 (state C), and the hydrogen partial pressure does not decrease. With structure 14, by stirring the mixed gas in main body 751 in this way, it is possible to suppress the decrease in hydrogen partial pressure near separation pipe 760, and it is possible to maintain the hydrogen separation efficiency.

For structure 14, it is also possible to supply raw material gas to separation pipe 760 and to supply purge gas to main body 751. Main body 751 is not filled with a catalyst, etc., so it is also acceptable to omit gauge 754. With this structure, fan 755 exhibits the effect of always maintaining a low state of the hydrogen partial pressure near separation 760, so it is possible to maintain hydrogen separation efficiency.

H15. Structure 15 (Structure that has a Detachable Part)

Figure 42:
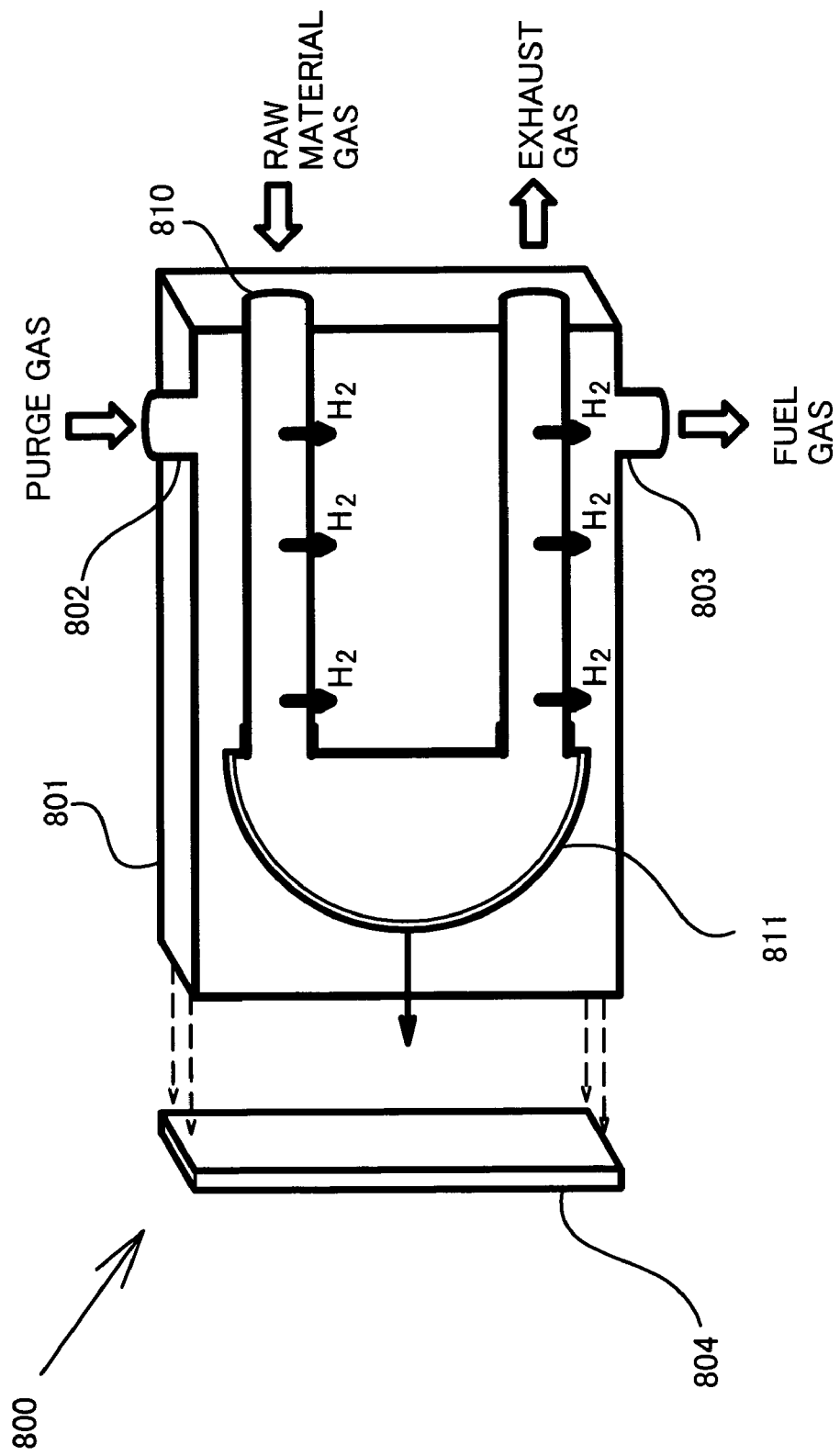
FIG. 42 is an explanatory diagram that shows the structure of hydrogen generating and separation mechanism 800 as structure 15.

FIG. 42 is an explanatory diagram that shows the structure of hydrogen generating and separation mechanism 800 as structure 15. This shows an oblique diagram of the state cut at the symmetric plane. The key points of the structure are the same as those of structure 4. In main body 801, purge gas flows from supply port 802 to exhaust port 803. A reforming catalyst is filled in separation pipe 810, and this reforms the raw material gas. However, with structure 15, the point of difference with structure 4 is that a removable part 811 is provided for maintenance at separation pipe 810. As shown in the figure, the curved part of separation pipe 810 can be pulled out in the axis direction from the juncture with the straight part. By pulling out removable part 811, it is possible to easily perform maintenance such as exchanging the catalyst that fills this part. If removable part 811 is pulled out, it is also easy to exchange the catalyst inside the straight part of separation pipe 810.

Main body 801 has a lid 804 provided on the side at which removable part 811 is pulled out to make this maintenance possible. During maintenance, lid 804 is removed and removable part 811 is pulled out. To keep an airtight state, the space between lid 804 and main body 801 is sealed.

With the mechanism of structure 15, in addition to the same advantages of structure 4 such as increasing hydrogen separation efficiency, there is also the advantage of having excellent maintainability. This is effective for use on structures that have a catalyst filled or supported in separation pipe 810. It is also possible to use this for a structure that flows purge gas to separation pipe 810 and performs reforming at main body 801. Note that structure 15 can also be used on various structures for which removal is possible upstream or downstream from the curved part. With FIG. 42, we showed an example of a structure that pulls out in the axis direction, but the structure in not limited to this.

H16. Structure 16 (Structure that Uses a Thermal Stress Suppression Mechanism)

Figure 43:
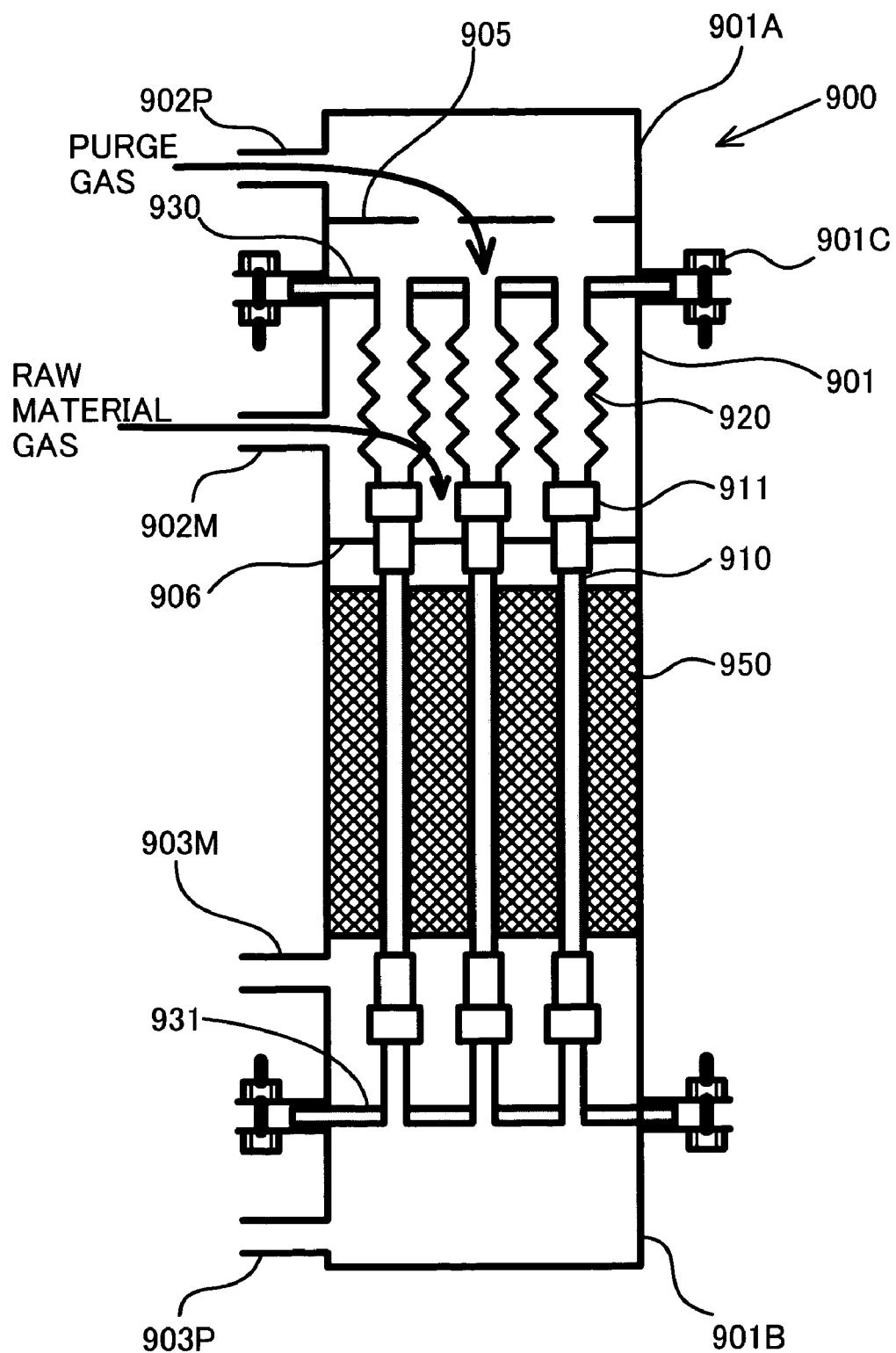
FIG. 43 is an explanatory diagram that shows the structure of hydrogen generating and separation mechanism 900 as structure 16.

FIG. 43 is an explanatory diagram that shows the structure of hydrogen generation and separation mechanism 900 as structure 16. This shows a cross section diagram with the cut at the symmetric plane. We showed an example of using a bellows as a heat stress suppression mechanism to avoid damage to the hydrogen separation pipe due to heat during operation.

Hydrogen generating and separation mechanism 900 is formed by incorporation of a porous monolith 950 and hydrogen separation pipe 910 in a case. Porous monolith 950 has a reforming catalyst supported in it. Hydrogen separation pipe 910 is a pipe formed by a porous support medium in which a hydrogen separation metal is supported. The structures of these are the same as structure 1 (see FIG. 24).

The case is constructed by fastening covers 901A and 901B to both ends of main body 901 which is open at both ends using bolt 901C. Inserted between main body 901 and covers 901A and 901B are separators 930 and 931 that prevent leaks of purge gas and mixed gas. Hydrogen separation pipe 910 has an SUS pipe 911 attached to the opening of both ends, and this is joined to the holes provided on separators 930 and 931. The connection is made via bellows 920 at separator 930 on the side where purge gas is supplied.

The inside area separated by separators 930 and 931 becomes the flow path for the raw material gas. As shown in the figure, the raw material gas supplied from supply port 902M passes through the periphery of bellows 920 and is supplied to porous monolith 950. To suppress bias of the flow volume distribution near the inlet of porous monolith 950, baffle plate 906 which has multiple orifices is provided. The raw material gas that passes through porous monolith 950 is exhausted from exhaust port 903M. Baffle plate 906 achieves a guide function of controlling the specified range of movement of SUS pipe 911. Doing this allows an increase in the resistance to vibration.

The outside area separated by separators 930 and 931 becomes the flow path of the purge gas. As shown in the figure, the purge gas supplied from supply port 902P is supplied to hydrogen separation pipe 910 through bellows 920, and is exhausted from exhaust port 903P. To suppress the bias of purge gas flow volume distribution near the inlet of bellows 920, a baffle plate 905 having multiple orifices is provided. Note that the diameters of the orifices of baffle plates 905 and 906 are set by experimentation, etc. at each site to obtain approximately even flow volume distribution. The orifice diameters do not have to be constant.

With hydrogen generating and separation mechanism 900 of structure 16, it is possible to suppress heat stress by using bellows 920. This mechanism becomes hot during operation, so heat distortion occurs at hydrogen separation pipe 910. When both ends of hydrogen separation pipe 910 are restricted, heat stress occurs due to this heat distortion. In contrast to this, with structure 16, bellows 920 expands and contracts according to the heat distortion, so it is possible to suppress heat stress. Therefore, it is possible to avoid damage, etc. to hydrogen separation 910 due to heat stress.

With hydrogen generating separation mechanism 900 of structure 16, through the effect of baffle plates 905 and 906, it is possible to supply purge gas and raw material gas without bias. When the cross section area of porous monolith 950 and hydrogen separation pipe 910 is greater than the cross section area of the purge gas and raw material gas piping, there are many cases when a difference in easy of gas flow occurs depending on the site. This difference invites bias of the flow volume distribution. This bias can be suppressed by providing baffle plates 905 and 906. By supplying gas approximately evenly, it is possible to increase the efficiency of the chemical reactions and hydrogen separation.

Bellows 920 and baffle plates 905 and 906 of structure 16 can be used selectively as necessary. It is possible to make the structure with bellows 920 omitted, or to have a structure with baffle plates 905 and 906 omitted. With structure 16, in place of bellows 920, it is also possible to use another expansion and contraction mechanism.

H17. Structure 17 (Variation Example of a Thermal Stress Suppression Mechanism)

Figure 44:
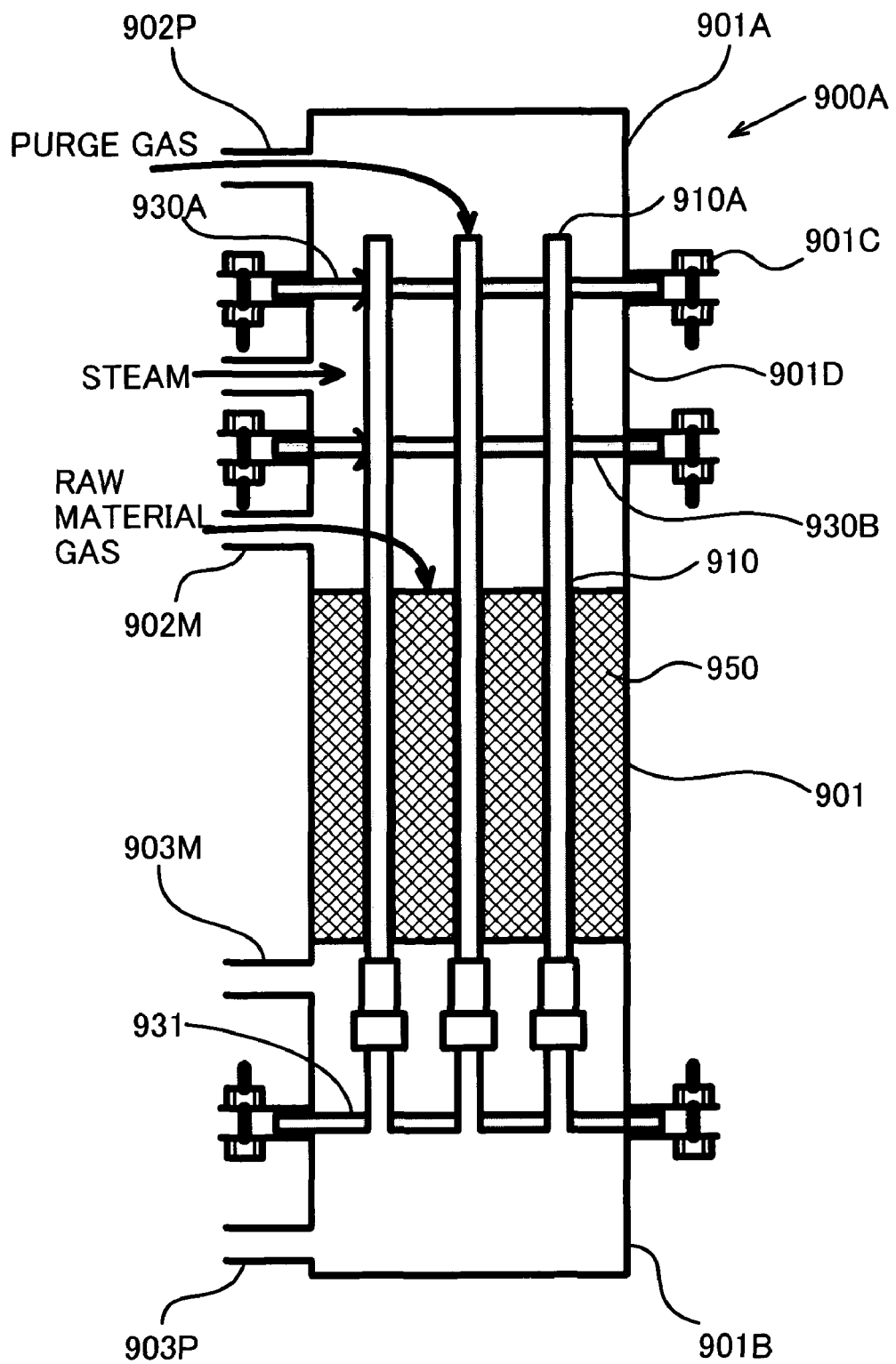
FIG. 44 is an explanatory diagram that shows the structure of hydrogen generating and separation mechanism 900A as structure 17.

FIG. 44 is an explanatory diagram that shows the structure of hydrogen generating and separation mechanism 900A as structure 17. This shows an example of providing a high pressure steam layer as a heat stress suppression mechanism in place of the bellows of structure 16.

Two separators 930A and 930B are provided on the gas supply side for hydrogen generating and separation mechanism 900A. Main body 901 and connector 901D are connected while sandwiching separator 930B. Connector 901D and cover 901A are connected while sandwiching separator 930A. Steam is supplied to connector 901D. The pressure of this steam is set higher than the pressure of the purge gas or raw material gas.

Hydrogen separation pipe 910 is supported held on one side by separator 931 on the exhaust side. The other end is the free end, and this pierces through separators 930A and 930B and is open. As shown in the figure, the purge gas that is supplied from supply port 902P flows into a pipe from each opening of hydrogen separation pipe 910. The structure of the other parts is the same as that of structure 16.

The steam layer of connector 901D works as a separating mechanism that prevents leaks of purge gas and raw material gas together with separators 930A and 930B. Even when there is a gap between hydrogen separation pipe 910 and separators 930A and 930B, the pressure of the steam is higher than that of the purge gas and raw material gas, so these gases do not flow into the steam layer.

With the hydrogen generation of structure 17, one end of hydrogen separation pipe 910 is a free end, so heat stress does not occur. Also, using the steam layer effect, it is possible to easily prevent leaks of purge gas and raw material gas while having one end of hydrogen separation pipe 910 be a free end.

With structure 17, it is also acceptable to connect pipes made of other material to hydrogen separation pipe 910 and to use a length that can pierce through separators 930B and 930A. Various inert gases other than steam can be used at connector 901D. It is also possible to make a seal using a gasket, etc., in place of connector 901D.

With structure 17, we showed an example of a structure with the baffle plate omitted. To make the flow volume distribution even, it is also possible to provide a baffle plate as necessary.

H18. Structure 18 (Variation Example of a Thermal Stress Suppression Mechanism)

Figure 45:
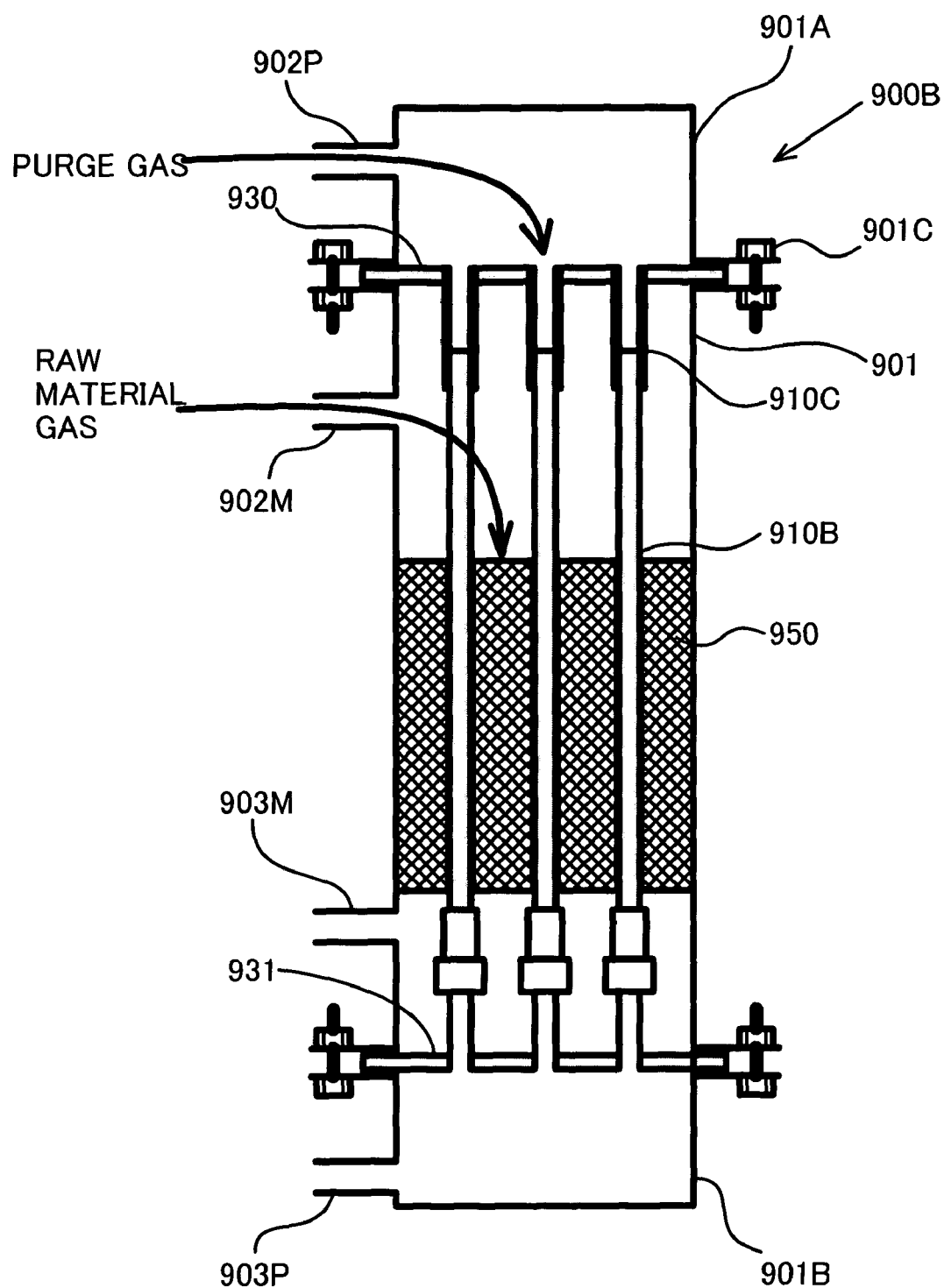
FIG. 45 is an explanatory diagram that shows the structure of hydrogen generating and separation mechanism 900B as structure 18.

FIG. 45 is an explanatory diagram that shows the structure of hydrogen generating and separation mechanism 900B as structure 18. As a heat stress suppression mechanism, instead of the bellows of structure 16, we showed an example of a case using a slide pipe.

As shown in the figure, an outer pipe 910C with a diameter that is slightly larger than that of hydrogen separation pipe 910B is connected to separator 930 that is inserted between main body 901 and cover 901A. For hydrogen separation pipe 910B, one end is inserted in this outer pipe 910C, and the other end is connected to separator 931 on the exhaust side. The space between outer pipe 910C and hydrogen separator 910B is sealed. The material of outer pipe 910C can be the same material or a different material from that of hydrogen separation pipe 910B. The purge gas supplied from supply port 902P passes through outer pipe 910C from separator 930 and is supplied to hydrogen separation pipe 910B. The structure of the other sites are the same as structure 16.

With hydrogen generating and separation mechanism 900B of structure 18, the free end of hydrogen separation pipe 910B can slide inside outer pipe 910C. Therefore, even if heat distortion occurs with hydrogen separation pipe 910B, heat stress does not occur.

With structure 18, we showed a structure that omits the baffle plate. It is also possible to provide a baffle plate as necessary to make the flow volume distribution even.

H19. Structure 19 (Variation Example of a Flow Volume Averaging Mechanism)

Figure 46:
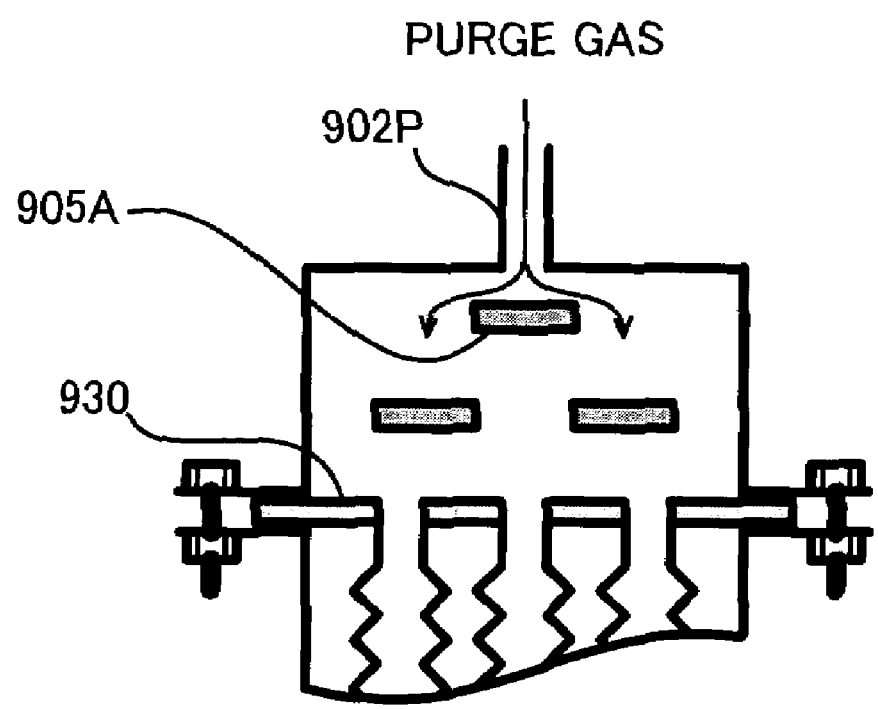
FIG. 46 is an explanatory diagram that shows the structure of a hydrogen generating and separation mechanism as structure 19.

FIG. 46 is an explanatory diagram that shows the structure of a hydrogen generating and separation mechanism as structure 19. The figures shows only the area near the purge gas supply port. The other parts are the same as structure 16.

As a mechanism for averaging the flow volume distribution of the supplied gas, instead of the baffle plate of structure 16, structure 19 is provided with a deflection plate 905A. The flow direction of the purge gas supplied from supply port 902P is deflected from the axis direction in the circumference direction by approximately 90 degrees by deflection plate 905A. Deflection plates 905A are provided at multiple levels, and the flow volume distribution of the purge gas is averaged using these deflection plates 905A. Therefore, approximately equivalent purge gas is supplied to each hydrogen separation pipe.

With structure 19, we showed an example of providing deflection plates 905A in three locations. From the perspective of averaging the flow volume distribution, a variety of settings are possible for the number and position of deflection plates 905A. With structure 19, a deflection plate was provided on the purge gas supply side, but it is also possible to provide one on the raw material gas supply side.

With structure 19, we showed an example of supplying purge gas in the axis direction. It is also possible to use this in a case of supplying from the circumference direction as with structure 16. Conversely, with structure 16, it is also possible to provide a supply port in the axis direction as shown in FIG. 46. For the flow volume averaging mechanism and the heat stress suppression mechanism, it is possible to use suitable combinations of the various mechanisms shown in structures 16 through 19.

Above, we explained various working examples of the present invention, but the present invention is not limited to these working examples, and it is obvious that various structures can be used without straying from the gist of the invention.

INDUSTRIAL APPLICABILITY

The present invention can be used to improve the hydrogen separating performance and to make the device more compact for devices that generate hydrogen-rich fuel gas from specified raw materials that contain hydrogen atoms such as hydrocarbon, alcohol, ether, and aldehyde.

The invention claimed is:

1. A hydrogen separation composite that selectively transmits hydrogen in a gas, the hydrogen separation composite comprising:
   a porous support medium;
   a hydrogen separation metal supported in said porous support medium, said hydrogen separation metal being made to a finer diameter than that of the pores in said porous support medium, and supported in the pores of said porous support medium in a state that substantially fills the interior of said porous support medium; and
   a catalyst that catalyzes a chemical reaction that generates hydrogen from a predetermined raw material supported in the pores inside said porous support medium, wherein
   said catalyst comprises a component different from said hydrogen separation metal; and
   said hydrogen separation metal is supported in said porous support medium in a completely airtight state.

2. The hydrogen separation composite according to claim 1 wherein said hydrogen separation metal is supported in film form inside said pores.

3. The hydrogen separation composite according to claim 1 wherein said hydrogen separation metal and said catalyst are supported in layer form inside said porous support medium.

4. The hydrogen separation composite according to claim 3 wherein said catalyst is supported in a less dense state than said hydrogen separation metal inside said porous support medium.

5. The hydrogen separation composite according to claim 4 wherein the physical structure of said porous support medium differs for the layer in which said hydrogen separation metal is supported and the layer in which said catalyst is supported.

6. The hydrogen separation composite according to claim 3 wherein the layer in which said hydrogen separation metal is supported and the layer in which said catalyst is supported are formed from porous support mediums of different compositions.

7. The hydrogen separation composite according to claim 1, wherein the composite has a bumpy shape in the thickness direction.

8. The hydrogen separation composite according to claim 1, wherein the composite has at least one surface in the thickness direction joined to a porous material that has a thickness that can ensure mechanical strength.

9. A hydrogen separation composite that selectively transmits hydrogen in a gas, the hydrogen separation composite comprising:
   a porous support medium and a hydrogen separation metal supported in said porous support medium, and
   said hydrogen separation metal being made to a finer diameter than that of the pores in said porous support medium, while mainly being supported in the pores inside said porous support medium, and a catalyst that catalyzes a chemical reaction that generates hydrogen from a predetermined raw material being further supported in the pores inside said porous support medium.

10. The hydrogen separation composite according to claim 9 wherein said hydrogen separation metal is supported in film form inside said pores.

11. The hydrogen separation composite according to claim 9 wherein said hydrogen separation metal and said catalyst are supported in layer form inside said porous support medium.

* * * * *